US005206506A

United States Patent [19]

Kirchner

[11] Patent Number: 5,206,506

[45] Date of Patent: Apr. 27, 1993

[54] ION PROCESSING: CONTROL AND ANALYSIS

[76] Inventor: Nicholas J. Kirchner, 250 Del Medio Ave., No. 201, Mountain View, Calif. 94040

[21] Appl. No.: 654,374

[22] Filed: Feb. 12, 1991

[51] Int. Cl.[5] .......................... B01D 59/44; H01J 49/40

[52] U.S. Cl. ........................................ 250/281; 250/283

[58] Field of Search ............... 250/283, 287, 290, 291, 250/292

[56] References Cited

U.S. PATENT DOCUMENTS

| | | | |
|---|---|---|---|
| 2,606,291 | 8/1952 | Wilson | 250/292 |
| 2,768,304 | 10/1956 | Wells et al. | 250/287 |
| 2,939,952 | 6/1960 | Paul et al. . | |
| 3,258,591 | 6/1966 | Blauth et al. | 250/290 |
| 3,501,631 | 3/1970 | Arnold . | |
| 3,621,242 | 11/1971 | Ferguson et al. | 250/287 |
| 3,715,590 | 2/1973 | Auer | 250/389 |
| 3,819,941 | 6/1974 | Carrico . | |
| 4,059,761 | 11/1977 | Dawson | 250/287 |
| 4,066,893 | 1/1978 | Dawson . | |
| 4,105,917 | 8/1978 | McIver et al. . | |
| 4,117,321 | 9/1978 | Meyer . | |
| 4,380,046 | 4/1983 | Fung . | |
| 4,704,532 | 11/1987 | Hua . | |
| 4,727,474 | 2/1988 | Batcher . | |
| 4,755,670 | 7/1988 | Syka et al. . | |
| 4,755,671 | 7/1988 | Friedland et al. . | |
| 4,805,091 | 2/1989 | Thiel et al. . | |
| 4,878,735 | 11/1989 | Vilums . | |
| 4,882,484 | 11/1989 | Franzen et al. . | |
| 4,900,414 | 2/1990 | Sibadis | 204/180.1 |
| 4,914,612 | 4/1990 | Beece et al. . | |
| 5,089,702 | 2/1992 | Allemann et al. | 250/291 |

FOREIGN PATENT DOCUMENTS 03218119 6/1989 European Pat. Off. .

OTHER PUBLICATIONS

Leclerc, G. Sanche, L., "Spreadsheets for Computing Charged-Particle Trajectories in 3-d Electrostatic Fields", Computers in Physics, Nov./Dec., pp. 617-626, 1990.

Schwarzschild, B., "Antiprotons Cooled to 4K and Weighed in a Penning Trap", Physics Today, pp. 17-20, Jul. 1990.

Dehmelt, H., "Radiofrequency Spectroscopy of Stored Ions: Storage", Advances in Atomic and Molecualr Physics, vol. 3, ed. Bates, D. and Estermann, I., Academic Press, New York, 1967, pp. 53-72.

Todd, J., "Ion Trap Mass Spectrometer—Past, Present and Future(?)" Mass Spectrometry Reviews, vol. 10, John Wiley & Sons, Inc., 1991, pp. 3-52.

Cornell, E., et al., "Single-Ion Cyclotron Resonance Measurement of M(CO+)/M(N2+)", Physical Review Letters, vol. 63, No. 16, Oct. 16, 1989, pp. 1674-1677.

(List continued on next page.)

*Primary Examiner*—Bruce C. Anderson
*Attorney, Agent, or Firm*—Wayne P. Sobon; John F. Schipper

[57] ABSTRACT

An ion processing unit (10) comprising a series of M perforated electrode sheets (12), driving electronics (14,16) and a central processing unit (18), allow formation, shaping and translation of multiple effective potential wells (42). Ions, trapped within a given effective potential well (42), can be isolated, transferred, cooled or heated, separated, and combined. Measurement of induced image currents allows measurement and typing of ion species by their respective mass-to-charge ratios. The combination of many electrode sheets (12), each having N multiple perforations (22), creates any number of parallel ion processing channels (26). The ion processing unit (10) provides an N by M massively parallel ion processing system, furnishing means for processing large numbers of ions in parallel in the same manner, but with different ion processes deployed at different sections of each ion processing channel (26). In addition, the space-filling parallel structure of the present invention provides an efficient means for storage of large numbers of ions, including charged antimatter.

36 Claims, 32 Drawing Sheets

OTHER PUBLICATIONS

Gabrielse, G. et al., "Cooling and Slowing of Trapped Antiprotons below 100 meV", Physical Review Letters, vol. 63, No. 13, Sep. 25, 1989, pp. 1360–1363.

Windland, D. et al. "Line Shifts and Widths of Axial, Cyclotron, and G-2 Resonances in tailored, Stored Electron (Ion) Cloud", International Journal of Mass Spectrometry and Ion Physics, 16, 1975, pp. 338-342.

Beverini, N. et al., "Stochastic Cooling In Penning Traps", Physical Review A, vol. 38, No. 1, Jul. 1, 1988, pp. 107-114.

Dahl, D. A., Delmore, J. E., "The SIMION PC/PS2 User's Manual, Version 4.0", Rev. 2, Idaho National Engineering Laboratory, Apr. 1988.

"Linear Ion Trap for Atomic Clock", NASA Tech Briefs, Sep. 1990, p. 44.

ION PROCESSING: CONTROL AND ANALYSIS

BACKGROUND OF THE INVENTION

The present invention relates to ion processing systems and, more particularly, to radio-frequency mass spectrometers and ion storage systems. A major objective of the present invention is to provide flexible apparatus for the processing, storage, and analysis of large numbers of ions in parallel.

Mass spectrometry, or more generally the techniques and apparatus for control and analysis of charged particles or ions, has provided important tools for scientific exploration. Traditionally defined, a mass spectrometer is an instrument which produces ions from one or more substances, sorts these ions into a spectrum according to their mass-to-charge ratios and records the relative abundance of each species of ion present. From its beginnings in the early 1900's, mass spectrometry has become a necessary and integral component of modern science and commerce. Many areas of current research depend upon mass spectrometric techniques to perform crucial experiments. For example, mass spectrometry has found use in the analysis of upper atmospheric gases, detecting and studying ozone depletion processes. Medical research and practice routinely use mass analysis instrumentation for the detailed analysis of protein structures and the genetic coding in DNA. These analytical methods require the precise separation and identification of the mass and quantity of each ion extracted from an initial particle mixture. In many experimental regimes, new laboratory processes rapidly create a large range of molecular species in great quantities, placing ever increasing demands on the rate and fidelity with which mass analysis must occur. Current mass spectrometry technology faces difficult challenges in meeting these experimental needs.

The domain of ion processing encompasses more, however, than just the analytical measurement of distributions of ion mass. Other technologies involve the preparative separation and storage of different ion species. One example would be the separation of isotopes, which vary in atomic mass. The accurate isolation of radioactive isotopes finds use in medicine, nuclear energy and pure physics research. Another use for ion processing techniques involves the separation, buffering and long-term storage of charged antimatter. Most large particle accelerator facilities produce antimatter in the form of anti-protons (positronium) and anti-electrons (positrons). Since the annihilation of matter with antimatter results in the most efficient conversion of matter into energy, extensive efforts are being made, as discussed in report AFRPL TR-85-034, from the University of Dayton Research Institute, toward the trapping, storing and annihilating of positronium. New generations of spacecraft capable of harnessing the energy released in controlled matter-antimatter annihilation could achieve extremely high velocities. Antimatter is highly reactive, however, and must be stored in perfect isolation until final use. The current inability to reliably and effectively cool and store significant quantities of charged antimatter in portable systems is a key factor in preventing practical use of antimatter propulsion. The storage methods used to maintain such antimatter ions comprise another example of potential ion processing techniques.

The explosive growth of mass spectrometric applications throughout science and industry rests on the ability of external and easily controlled electrostatic, magnetostatic and electrodynamic fields to precisely and accurately manipulate charged matter, abilities unequaled by other neutral manipulation techniques. However, all such charged-particle devices suffer from the effects of space charge, that is, mutual coulombic repulsion remains a fundamental physical limit. Yet today, industrial and scientific demands for greater amounts of informative and preparative outputs from smaller samples of matter, and in shorter periods of time, have well exceeded the limits imposed by space charge on device throughput.

All mass spectrometers operate as flow systems. Ions, either captured or created by ionization, are guided through or confined within a volume prior to and during their detection. The mutual coulombic repulsion of like charges, however, makes difficult the production or capture of dense ion fluxes. The maximum output (either in analytical information or in preparative ion production) remains directly proportional to the average number of ions (the ion current) passing through the machine per unit time. The coulombic repulsion from space charge limits this average flow per unit volume. Ultimately, the volume governable by precise ion control limits the throughput of a given device.

Various mass spectrometers, or more generally, tools for the processing, control and analysis of ions, remain currently available. Each device combines unique operation attributes together with particular limitations, suffering more or less from space charge restrictions. Early mass spectrometers were what are now termed magnetic (or magnetic and electrostatic) sector instruments. These devices generally use static magnetic, or magnetic and electric, fields to carefully disperse focused beams of moving charged particles. Depending on the charge-to-mass ratio, the particles' paths bend in different amounts. A mass spectrum for a particle group (that is, a numerical analysis of the mass distribution) comprises measurements taken of the numbers of particles at each focus point.

One form of sector spectrometers disperses the mass spectrum onto a strip of photographic film, forming a mass spectrograph. Photographic means can detect minute components of a substance being analyzed, thus providing a means for accurate mass determination. Photographic techniques, however, are less well suited for relative mass abundance measurements. As an alternative method, then, sector instruments scan their magnetic and/or electric fields such that various masses scan across a narrow stationary slit. Ions passing through this slit can then be detected electronically. The simultaneous photographic approach yields the greatest device throughput; relative abundance measurements through sector scanning are gained at the cost of information through-put. Time-averaging techniques can increase the amount of information collected, but only during relatively short periods due to inherent instabilities in the magnetic and electric confinement fields.

While the sector-type mass spectrometer was one of the earliest instruments in widespread use, it has certain inherent problems. The magnetic fields used to focus the charged particles in one direction tend to defocus ions in the perpendicular direction, requiring further focusing elements. The large magnetic fields required to focus ions often require bulky, heavy and yet precisely machined magnets. As research moves toward larger particle masses (as in biochemical analysis of proteins), the mass ranges of sector instruments must be increased. Yet it is difficult to maintain a highly focused beam over a very wide mass range, thus requiring greater engineering expenditures. A principal drawback of conventional sector mass spectrometers is their expense, in both engineering and fabrication costs.

The changing demands of applied chemistry, physics and medicine have led to radical and innovative changes in all mass spectrometric instrumentation. The diversity of available commercial instruments demonstrates that no single instrument can meet the wide demands of commercial and scientific applications. Sector instruments have in many instances been supplanted by Time-Of-Flight (TOF) mass spectrometers, Fourier Transform Ion Cyclotron Resonance (FT-ICR) devices, Quadrupole spectrometers, triple Quadrupole (Quadrupole-Octupole-Quadrupole), and Ion Trap instruments. These classes of mass spectrometers differ in their approach toward controlling and measuring ion samples (i.e., they have different ion optics), and have particular advantages and disadvantages. The attributes of different devices, including mass range, mass (or energy) resolution, flexibility to detect both positive and negative ions, ion storage, throughput (including scanning rate), dynamic range, ionization methods, simplicity in operation and maintenance, and cost, allow comparisons to be made among them. When other characteristics such as the methods of signal detection, portability, and ease of connection with other equipment are also examined, no single current mass spectrometer device can be best used across a majority of applications.

Time-of-flight (TOF) instruments rely on the fact that ions with equal kinetic energies but with different masses travel with different velocities. Thus, a burst of similarly-energetic ions at one end of a time-of-flight device reach the other end separated in time in a manner related to their respective masses. Time-of-flight mass spectrometers provide excellent resolutions of mass with a very high recording speed, allowing study of fast reactions such as explosions. In addition, the instrumentation is simple and does not necessarily involve complicated magnetic focusing elements.

Problems exist with time-of-flight instruments as well. The total number of ions per initial pulse must usually be limited to prevent a spread in energies by coulombic repulsion, resulting in a loss of mass resolution for the device. In addition, as with the sector devices, the time-of-flight mass spectrometer provides no means for storage or buffering of ions.

One type of device that does provide for ion storage and analysis is an ion cyclotron resonance (ICR) spectrometer. This device (also known as a Fourier Transform ICR (FT-ICR)), uses the principle of a cyclotron. In a cyclotron, a particle can be excited by a high-frequency voltage to move in a spiral, while held within a magnetic field. The angular frequency of motion for the charged particle (the cyclotron frequency) depends upon the magnetic field strength and the mass of the particle. A typical ICR instrument uses an RF voltage to excite ions trapped in a conductive box immersed in the field of a superconducting magnet. The RF voltage is applied to opposing electrode walls of the box. The RF voltage translationally excites the charged particle which, constrained by the magnetic field, moves in a spiral. The ions then orbit on the same radial path, but with different frequencies depending upon their mass. The coherent, orbiting ions induce an image current in another set of detector electrodes. The image current has an amplitude proportional to the number of ions and a frequency proportional to mass, permitting measurement of the relative abundance of ions in a mixture.

Since an ICR device relies on the analogue technique of induction of image currents for measurement of mass, it remains limited in dynamic range. Further, while the instrument exhibits high mass resolution, long acquisition time (due to space charge limitations) and limited information through-put often precludes its use in detection of short-lived ion species, or for events exhibiting rapid real-time fluctuations. Hence, the storage capabilities of the ICR are typically expended for analysis, not for the ion buffering required for large, or high-speed, bursts of ions Perhaps the most widely used mass spectrometers today rely upon radio-frequency quadrupole techniques. Quadrupole mass spectrometers were first explored by Wolfgang Paul and others in the 1950's, and were the subject of a U.S. Pat. No. 2,939,952. The patent presented two principal types of quadrupole devices. The first device, a quadrupole mass filter, generally comprises four electrode surfaces extending longitudinally in space. The longitudinal direction forms the path for ion travel. The device can be seen in FIG. 1 of the Paul et al patent. Ideally, these electrode surfaces cut hyperbolic arcs through a plane perpendicular to the ion motion and have equal and opposite initial voltages applied to neighboring electrode pairs. Thus, the electrostatic potential around the central ion path is quadratic in form. By multiplying the applied electrode potentials with a periodic function of time, the electric fields at a given point can be made to periodically switch directions. The characteristic motions of ions traveling through the mass filter exist in one of two exclusive states. In the first, stable state, ions perform oscillations about the center of symmetry of fields with amplitudes that are smaller than some critical value. In the second, unstable state, the amplitude of oscillation increases rapidly so that, within a short time, the ions impinge upon the field-generating electrodes and remove, or neutralize, themselves. Given an applied potential and a particular periodic function, ions with certain charge-to-mass ratios travel along a stable path, while ions with other charge-to-mass ratios follow unstable trajectories and are lost. Thus, by varying the amplitude, frequency and DC offset of the voltages that determine the periodic function, certain masses of ions are allowed to pass through the mass filter while others are neutralized.

The equations of motion for a quadrupole mass filter device in the x-y plane perpendicular to the ion trajectory path z are given by:

$$x+(q/mr_0^2)\phi x=0 \quad (1)$$

$$y-(q/mr_0^2)\phi y=0 \quad (2)$$

where x and y represent the position of the particle in the plane, q is the charge of the ion, m is the ion's mass, $r_0$ is the closest distance between the center of the device and a hyperbolic electrode and $\phi$ is the applied potential function. On injecting ions into the mass filter with a certain velocity in the z direction, Equations (1) and (2) provide the ion motion in the xz and yz planes. If $\phi$ were merely a constant, all ions would obey paths of simple harmonic motion in the xz plane and ion trajectories would all be "stable", i.e., remain fixed in amplitude. Yet, in the yz plane, the ions would diverge from the z axis (called defocussing) and eventually escape, colliding with the filter electrodes. If, on the other hand, $\phi$ were a periodic function in time, the trajectories in both planes are alternately deflected toward and away from the central zero point. Stability exists in both planes if the periodicity of the potential function $\phi$ is short enough and the ion is heavy enough that it cannot respond sufficiently during the defocussing portion of the cycle to escape the device.

In a further modification, if the potential function $\phi$ combines a direct (or constant) component and a periodic alternating component, light ions are more affected by the alternating component. In the x direction, the light ions would tend to have unstable trajectories whenever the alternating component is larger than the direct component. Ions following unstable trajectories would exhibit oscillations of ever-increasing amplitude. The x direction would therefore provide the equivalent of a high-pass mass filter. Only high masses would be transmitted to the other end of the quadrupole without striking the x electrodes. Simultaneously, in the y direction, heavy ions are unstable because of the defocussing effect of the direct component, but some lighter ions are stabilized by the alternating component if its magnitude and frequency correct the trajectory when the amplitude tends to increase. The y direction is therefore a low-pass mass filter. The two directions together provide a mass filter with a certain pass-band.

When using a mass filter, an ion sample is formed and introduced at one end of the device. Then, while carefully varying the filter's electrical parameters, the quantity of ions emerging at the other end is measured. As discussed, when the function multiplying the applied voltages has both a fixed (time-invariant) component and a periodic component, the device allows only ions within a certain mass range, or pass-band, to have stable paths and emerge for measurement at the output end. The RF amplitude defines the mass stability range for a given DC offset, and ramping the RF amplitude sweeps through a given mass stability range.

The mathematical treatment of ion motion in a quadrupole device, as discussed above, relates the instantaneous motion of an ion with the instantaneous electrostatic field. Another more intuitive visualization of stability in a quadrupole device analogizes a charged ion confined on an instantaneous potential surface to that of a ball rolling on a saddle. As the ball begins to roll down the lower slopes of the saddle, the saddle's surface inverts: what was sloping downhill is now sloping uphill. If the frequency of the inversion is well-chosen, the ball remains trapped indefinitely in the saddle. If trapped in the x-y saddle, a particle traveling through a quadrupole mass filter along the z-axis remains confined within the electrodes and reaches the other end of the device.

Yet another useful conception of quadrupole operation creates a time-average of the instantaneous potential surfaces experienced by a given ion to construct an effective potential surface. Because the ions moving through a quadrupole device move much slower than the quadrupole oscillating fields, the ions experience a time-averaged force that, depending on their charge-to-mass ratios, either keeps them bound or gives them an unstable orbit. A time-averaged potential map for a particle would then show a depression or effective potential well, whose height in energy may either keep a particle bound or allow it an unstable trajectory. The time-averaged effective potential (for a given oscillating field) seen by an ion varies with both its charge and its mass.

An ion trap is the second form of the quadrupole mass spectrometer. The ion trap follows the same general principles as the quadrupole mass filter, but instead of having ions travel along an axis through the device, an ion trap maintains ions at the center of the device cavity. Accordingly, the ion trap takes the hyperboloid form of the electrodes of the mass filter and revolves them about a symmetry axis, forming hyperboloid surfaces of revolution enclosing an inner volume (FIGS. 11 and 12 of the Paul et al patent). Differential voltages applied to neighboring electrode surfaces create a three-dimensional quadrupole field, symmetric about the rotation axis. Again, when a periodic function modulates the applied voltage, the electric fields at a given point within the volume periodically switches directions. Ions caught within the fields are attracted one direction and then the next. As with the mass filter, appropriate selection of the applied modulating function ensures that a field with a pass-band of only a certain range of charge-to-mass ions form stable oscillations within the ion trap. All other combinations follow unstable paths eventually colliding with the electrode cavity walls.

Both the quadrupole mass filter and ion trap have found enormous commercial uses in a variety of scientific and industrial fields. The devices combine sensitivity with adequate resolution in a compact, simple and light-weight apparatus. Especially important benefits are the replacement of cumbersome and expensive magnets with high-speed electronic scanning and linear mass scaling. Still, quadrupole devices entail unique problems. To reproduce quadratic fields within the active device volume, the electrodes must have precise hyperbolic surfaces. Yet it is extremely difficult to machine such surfaces. As a result, mass filter manufacturers often substitute easily manufactured spherical surfaces, which unfortunately introduce errors into the fields and reduce device resolution and precision. In addition, fringing fields from imperfect devices introduce further experimental errors into ion measurements. RF devices are also known to suffer mass discrimination, where the transmission efficiency of particles varies with mass.

As a partial answer to difficult fabrication problems of quadrupole mass spectrometers, alternative methods for duplicating the quadrupole fields have been developed. Arnold, in U.S. Pat. No. 3,501,631, describes methods of replicating quadratic fields by substituting a collection of electrodes held at precisely varied potentials for the single hyperbolic electrodes of a standard quadrupole device. In effect, the second type of quadrupole device imitates the first type. The second type applies potentials to a collection of electrodes in a manner corresponding to the potentials of a quadrupole field. Despite simpler fabrication of electrode surfaces, the long-term stability of the applied potentials (required to duplicate quadrupole action) may offset any economic advantages.

The quadrupole approaches, both the first standard type and the second emulated type, do not completely address the problem of ion separation and control. In quadrupole devices, ions outside the pass-band, those not selected to pass through or stay confined, collide with the outer electrodes, eliminating them from further analysis. In addition, repeated collisions of de-selected ions with the electrodes can create further problems when these adsorbed ions desorb under vacuum, corrupting later samples. While the ion trap allows for storage of ions, it is pulsed, must use a neutral buffer gas, and only a fraction of the stored ions are eventually analyzed, and collisions with buffer gases result in further ion excitation and fragmentation, often changing the observed mass spectrum in unpredictable ways.

While each mass spectrometric approach provides its own benefits and involves its own difficulties, certain general problems persist for all currently-used mass-analytical techniques. The fields used for confining and directing charged particles, whether magnetic as in sector-type and ICR devices, electrostatic as in TOF, or electrodynamic as in quadrupole instruments, all provide generally conservative field environments for the manipulation and analysis of ions. Conservative fields usually are desired, since the total energy of the system, including both the ions and the confining fields, remains constant during the analysis process. The energy continuity provides a high degree of predictability in the experimental process and its resulting spectra. But the constraint that an ion's total energy, both kinetic and potential, remains constant imposes constraints on the fundamental designs of contemporary mass spectrometers.

Because their total energy must usually remain fixed at precise and reproducible levels, the total number of ions that may be processed concurrently is much smaller than the number available in any given sample. To maintain the precise energy levels, the ions must follow spatial paths of small tolerance, in a limited volume. This has two adverse effects. First, the fields that hold ions to the exact paths must be extraordinarily precise, requiring complex, highly-engineered and expensive ion optics. Second, and perhaps more fundamental, space charge effects limit the quantities of ions that may be processed at a given time.

The mutual repulsion of like charges limits the number of same-charge ions that can exist in a given volume of space. The confinement fields counter the space charge repulsion to some extent. But, at greater ion densities ion mutual repulsion overcomes the precise focusing of the ion optics and degrades instrument resolution. To avoid degradation, the number of ions introduced into an instrument must remain below critical limits. But, reducing total ion current reduces the information through-put of the device. For many routine applications, these limits are not significant. Yet, in many other uses, the limitations become severe, especially when attempting measurement of very low abundance ions, and large amounts of the sample must be accumulated before gaining an adequate or meaningful result.

In other applications, it is not the amount of sample available but the time window available for analysis that strains analytic methods. Real-time analysis of atmospheric contaminants may require very rapid mass spectra readings. Mass spectrometers attached to gas chromatography apparatus must analyze ion species from separated peaks as they elute from the chromatograph column. When such peaks follow in rapid succession, analysis time for a given peak may be only a few seconds. If space charge repulsion limits the total number of ions for sampling, reducing through-put and therefore lengthening data sampling time, such high-speed uses may be beyond current mass spectrometric technologies.

An inability to cool ion particles presents a further problem for current mass spectrometer devices. Most spectrometer devices depend upon an initial sample of ions introduced to the device at a somewhat uniform level of energy. However, energetic ion samples often arrive with vastly different energies. Most mass spectrometers handle these particles by simply screening out wrong-energy ions. Other uses for ion processing apparatus, such as storing charge antimatter, depend upon some method for maintaining the kinetic energy of particles within critical limits. Methods of making uniform a collection of ion energies are known as cooling techniques. The conservative fields of current mass spectrometers usually cannot directly cool ions while maintaining their trajectory, since the ion's total energy remains precisely fixed or at worst increases. Thus, researchers deploy other techniques to separately cool ions for subsequent storage or analysis.

One cooling technique introduces a cool neutral gas into the path of the ions. Collisions between the gas and the ions absorbs and makes more uniform the energies of the ion sample. Another cooling technique relies on having each ion induce an image current in an outer conductive wall. The image current can transfer energy from the ion to an external resistance and dissipate it as heat. Application of carefully tuned laser radiation can cool ions, through Doppler-shifting and re-emission effects. However, the required high-power lasers are not yet practical for routine applications such as mass analysis. Another technique involves adiabatic expansion by slowly decreasing the trapping potential, and expanding the trapping volume for the confined particles. The method is equivalent to conventional adiabatic expansion of gases. Any attempt to restore the trapping potential to the original value reheats the confined ions to at least their original energy, if not higher. Stochastic cooling is a variant of image current techniques. In stochastic cooling, electronic feedback monitors the time-coherent motion of ions in storage rings and Penning traps through image current induced at a pick-up electrode. From knowledge of the ion motion, a transient potential applied to a kicker electrode can apply a retarding force for cooling of the coherent collection of ions. The latter method is only useful for coherent groupings of ions, found only in highly specialized applications. None of these cooling techniques allow direct use of the ion confinement fields to cool incoherent groups of ions, while maintaining their trajectory.

None of the methods discussed for mass spectrometry or for ion storage and manipulation provides a complete and flexible system for ion processing. What is needed is an improved method and system for the processing, control and analysis of ions. An improved ion processing system should routinely handle very large samples of ions that, due to space charge limitations, are beyond the capacity of current ion optics. In addition, the method and system should be able to store temporally, or buffer, high-volume bursts of ions for later processing. The method should provide for non-destructive spatial separation of ion species to allow complete analysis of an ion sample, and simultaneously provide an efficient tool for ion/isotope separation. Further, the method should provide cooling for stored ions without the use of neutral gases, laser radiation or any means other than the confining fields themselves. Ideally, the method should allow instrumental access to trapped charged particles, providing feedback to monitor operational status in real time. The method should provide a simple and cost-effective technology for translating, storing, cooling and analyzing ion particles.

SUMMARY OF THE INVENTION

In accordance with the present invention, an ion processing system combines an electrode means for establishing an electric potential field in space, driver means for applying electric potentials to the electrode means, and a control means for changing the electric potential field. The varying electric potential field creates one or more wells of an effective potential. Each effective potential well can confine one or more charged particles to specific regions in space. By gradually adjusting the electrical potential field, the control means can change the position or center of each effective potential well. By allowing elaborate control over the local shape of the effective potential field, charged particles may be translated, cooled, stored, monitored, and separated in large quantities in an extremely flexible manner.

The effective potential wells of the present invention can follow each other successively along a longitudinal path. Thereby, each effective potential well can provide either transverse confinement of a charged particle (generally perpendicular to the path), or longitudinal confinement of a charged particle (confinement from well-to-well along the path), or both. Thus, when the control means gradually adjusts the electric potential field and the positions of each effective potential well, the position of a charged particle trapped in a well can be changed either transverse to the direction of the longitudinal path, or longitudinally along the path, or in some combined direction. As an alternative arrangement, the effective potential wells can provide isotropic confinement of a charged particle and can be arranged independently at various points in space. Even so, the control means can adjust the position in space of these effective potential wells and the positions of the trapped particles. The invention provides both storage, or trapping, of charged particles and spatial translation.

In one embodiment of the present invention, the electrode means comprises a series of M perforated electrically conductive sheets, spaced and extending along a longitudinal path. The perforations can be hexagonal for efficient packing and aligned to provide a plurality of N processing channels for ion travel and containment. A driver means applies a series of oscillating electrical potentials to each of these electrode sheets, creating oscillating electric fields within each processing channel. The time-averaged potential of the electric fields, as discussed, creates an effective potential field. By employing computer control over the applied potentials, a variety of effective potential maps can be deployed to trap charged particles within effective potential wells within the channels. Varying the applied potentials changes a given potential map and allows the ion processor to translate either transversely or longitudinally the position of trapped charged particles. In addition, a single potential well may be smoothly broken into two or more separate wells, allowing for separation of an ion sample into smaller groups.

To handle the rapidly oscillating potentials applied to each grid, voltage amplifiers are attached to the electrode sheets. The radio frequencies of the applied potentials are typically between 0.5 and 5 MHz, and the applied voltages typically range between ±500 volts. A central computer controls the waveform output of each amplifier, changing its potential amplitude and frequency at proper times to change the effective potential map. The grids are thin, with little volume taken by the electrode wires, leaving mostly free space broken into a plurality of parallel processing channels. Each processing channel, as described, forms a virtual cavity for applying a variety of potential maps for controlling and processing charged particles. The availability of high-speed computers and high-voltage amplifiers enables the present invention to execute the rapid and precise changes in potential required during operation.

The parallel deployment of many processing channels within the electrode sheet structure furnishes the means for processing large numbers of ions in parallel in the same manner. While the transport path through each processing channel is subject to space charge limitations, the device comprises many such channels shielding each group of ions from the mutual charge effects of adjacent groups of ions. Parallel processing of ions overcomes previous space charge difficulties, allowing rapid analysis of sizable numbers of charged particles simultaneously. In addition, the parallel structure of the present invention provides an efficient means for the storage of large numbers of ions. The present invention provides an ideal system for long-term containment of charged antimatter particles.

In addition, the present invention furnishes apparatus and methods for cooling charged particles confined within an effective potential well. Previous mass spectrometers for the most part provide conservative fields for the control and separation of charged particles. Ions interacting with such fields undergo elastic collisions in which the total energy and momentum of the system (both the ions and the field) is conserved. Conservative fields do not couple the translational energy of the contained charged particles to the exterior environment, since kinetic energy merely converts into potential energy and vice versa. Net cooling requires a controllably non-conservative field, one that provides an extra degree of freedom by which ion energy can be coupled to and dissipated in the surrounding environment. The present invention, by furnishing means for rapidly and accurately changing the local characteristics of the effective potential field, provides a controllably non-conservative field that allows controlled directional transfer of energy from or to a trapped charged particle, without significantly changing the volume of the trapping well. A particle-field system will be said to be "non-conservative" herein if the total system energy may be partitioned so that the sum of particle energy and electromagnetic field energy is less than or greater than the initial total system energy of particle and field. The invention can simultaneously confine a particle and controllably lower or raise the translational energy by a cooling process or heating process, respectively, using only the particle confinement fields themselves.

The present invention supplies means for mass separation as well. The virtual cavities of each processing channel can emulate an ion trap at an arbitrary position along their length. The same mathematical treatment presented above for ion containment and separation in conventional ion traps applies to charged particles trapped in virtual ion traps. A representative ion processing routine could include the following steps: introduction of an ion sample into each virtual cavity processing channel, possibly from a high-volume ion production source, buffering and cooling each sample somewhere along the processing channel for later analysis, separating and translating a portion of the sample to another section of the processing channel for monitoring the ions, further translation of the ion sample to a virtual ion trap for extraction and measurement of relative amounts of each mass present, and then acceleration and ejection of the ion samples from the apparatus, either for disposal or for further processing.

The present invention provides apparatus and techniques for handling orders-of-magnitude more charged particles, and for higher through-put in experimental measurements, than are available from conventional ion processing technologies. Also, the increased ion volume and through-put do not require highly engineered and bulky ion optics. The present invention allows buffering of high volume bursts of incoming ions (that is, for temporarily storing streams of charged particles for subsequent processing) without risking interactions between the charged particles and large containment surface areas or requiring expensive, complex ion optics. In addition, the invention provides for the storage and cooling of highly energetic ion particles without using outside agents such as neutral gases or laser radiation. The present invention furnishes apparatus and techniques for the spatial separation and translation of charged particles in a controlled, non-destructive manner, by charge-mass ratio. Additionally, the present invention provides apparatus for executing all the above-described features in a compact, readily manufactured and flexible system. These and other features and advantages of the present invention are apparent from the description below with reference to the following drawings.

BRIEF DESCRIPTION OF THE DRAWINGS

FIGS. 12A through 12J show three-dimensional plots of a contiguous series of potential wells undergoing successive translations inside an ion processing channel.

DESCRIPTION OF THE PREFERRED EMBODIMENTS

Figure 1:
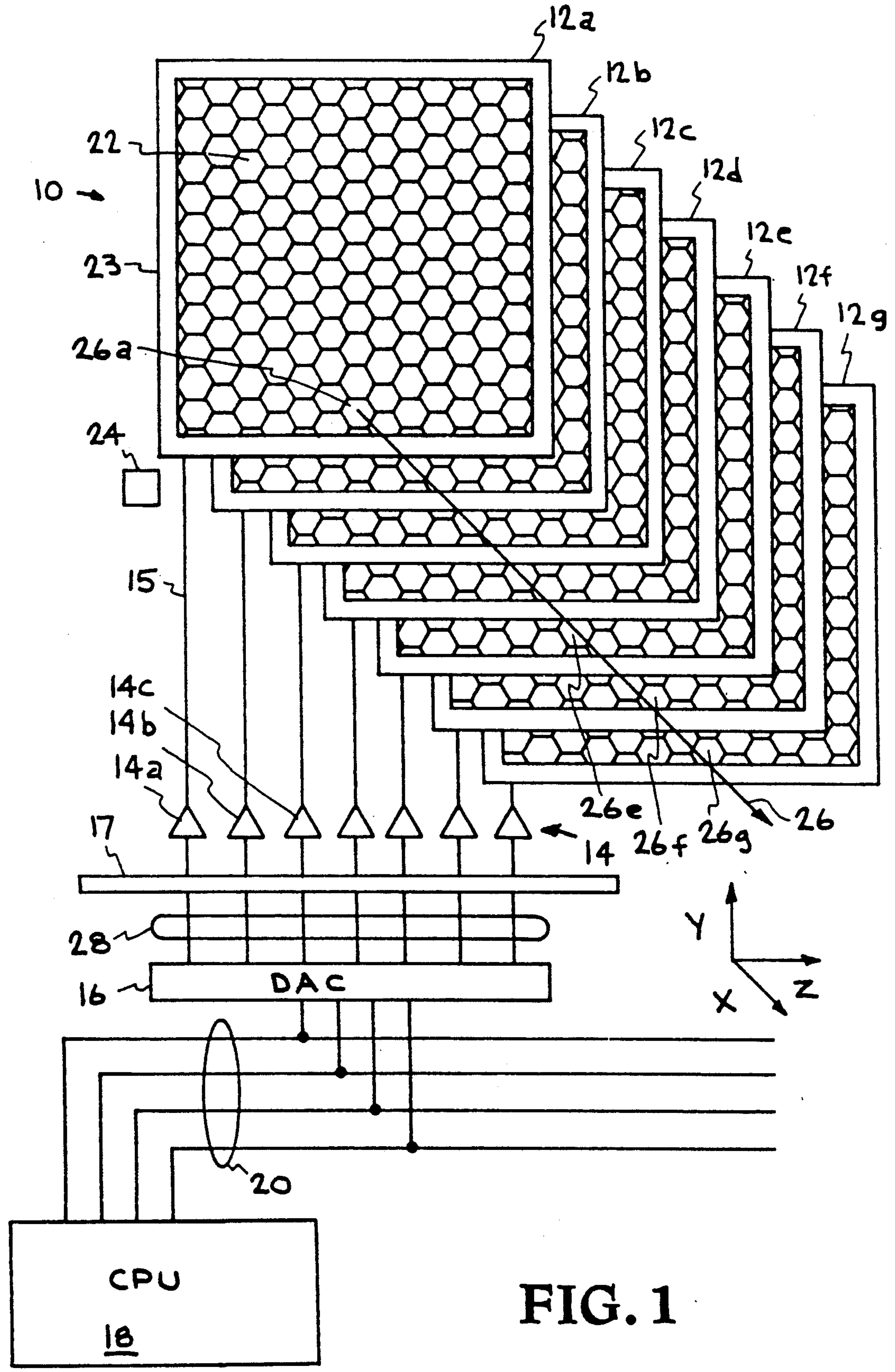
FIG. 1 shows an exploded view of an Ion Processing Unit in accordance with the present invention.

In accordance with the present invention, FIG. 1 shows apparatus for the processing, control and analysis of ions. Throughout the present description, "ion" and "charged particle" are used interchangeably to refer any form of electrically charged matter. A series of M planar electrodes **12*a*, 12*b*, 12*c*, etc. are arranged longitudinally along the x-axis, separated by spacers 24. Each electrode sheet 12 connects to a high voltage amplifier 14*a*, 14*b*, etc., which form an array 14 of independently operable amplifiers. A programmable digital-to-analog converter (or DAC) array 16 governs the operation of the amplifiers 14 and receives program signals from a central processing unit 18 along a data bus 20. The central processing unit 18** thereby has complete control over the applied potentials at each electrode plane, enabling rapid and accurate changes in the effective potential fields experienced by charged particles travelling through the invention.

Each electrode can be fabricated by photochemically masking and etching an electrically conductive sheet, preferably from a high-tensile strength conductive metal. In the preferred embodiment, each electrode comprises a mesh of thin metal, arranged in an array of N hexagonally shaped holes 22. Hexagons are self-packing polygons having the greatest area-to-perimeter ratio; the hexagonally shaped holes allow the greatest channel area to electrode perimeter ratio. In the preferred embodiment, each hexagonal hole 22 in the electrode sheet 12 measures approximately 2 centimeters across, the system contains $M \approx 100$ perforated electrode sheets and each electrode sheet contains $N \approx 400$ holes. Each perforated electrode sheet 12 comprises a series of N hexagonal electrode rings connected electrically and mechanically together. Those skilled in the art will recognize that different dimensions and numbers of electrodes can be chosen to implement the present invention.

The thin electrode sheet 12 can be fixed taut in a supporting frame 23, while each electrode sheet can be stacked on the next sheet, separated by small ceramic spacers 24. The electrodes are stacked such that successive holes in each sheet align with each other to form hexagonal processing channels 26 in the x direction through the device. One such channel 26 is shown by the highlighted respective hexagonal holes 26*a*, etc. In normal operation a vacuum enclosure surrounds and protects the entire array of electrodes. Each electrode array element connects to an edge connector, that in turn connects in vacuo to an amplifier array 14, that in the preferred embodiment, applies rapid and relatively high voltage changes to each electrode 23. The base of the vacuum housing 17 (shown in FIG. 21) serves as a heat sink for the array, while amplifier power and control signals enter the vacuum area via standard high-vacuum feedthrough devices. As described, the control signals for the amplifiers 14*a*, 14*b*, etc. travel through a shielded bus 28 driven by the DAC array 16, which in turn is driven from signals carried by dedicated bus 20 and generated by the central processing unit 18.

Figure 2:
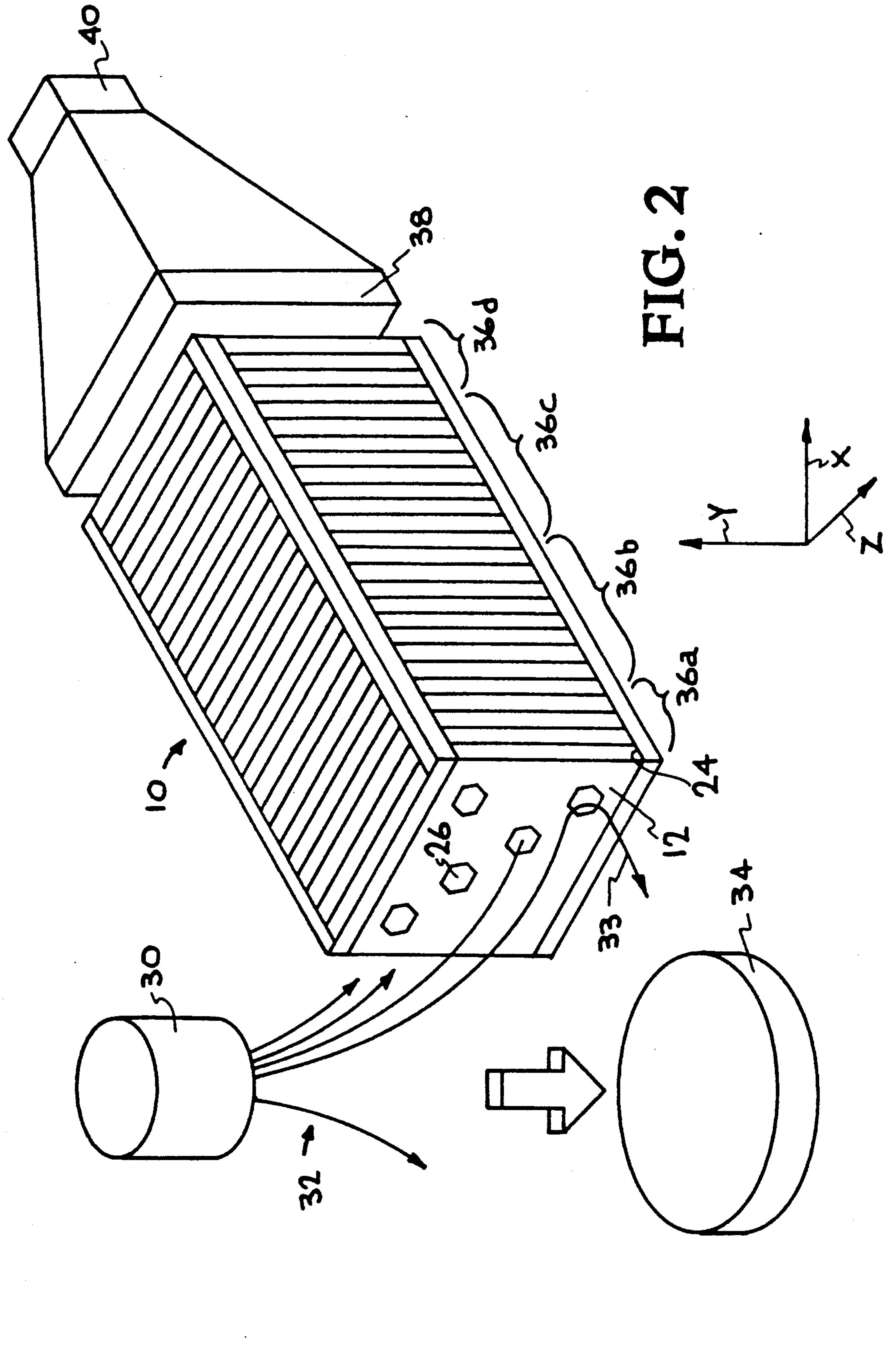
FIG. 2 shows an assembled view of an Ion Processing Unit configured as a high-volume mass spectrometer in accordance with the present invention including ion generation and detection.

FIG. 2 illustrates a typical application of an N by M ion processing unit (N×M IPU) 10 for high-volume mass analysis. Ions formed in a separate, differentially pumped ion chamber 30 are gently accelerated into an injection vestibule 32 surrounded by one or more ion processing units 10. Only ions of a certain energy range and direction are successfully captured by the effective potential supported by a given channel 26 in an ion processing unit 10; ions outside this direction and energy window (such as ion 33) deflect back into the injection vestibule 32 to be swept out by diffusion pump 34. In a preferred embodiment, ions pass through distinct processing regions of the IPU 10: first, an injection region 36*a*, then a bulk cooling and temporary storage region 36*b*; second, a mass selection region 36*c*, an acceleration region 36*d* and finally a collision of the ion species onto a large-area photocoupled ion detector sheet 38. All collisions can then be recorded by a CCD array 40, or a photomultiplier channel tube, a reticon array, or a similar device, for tabulation. In the preferred embodiment, CPU 18 (FIG. 1) controls and monitors the ion processes in the ion array 10, and stores final analysis results from CCD array 40.

Figure 3:
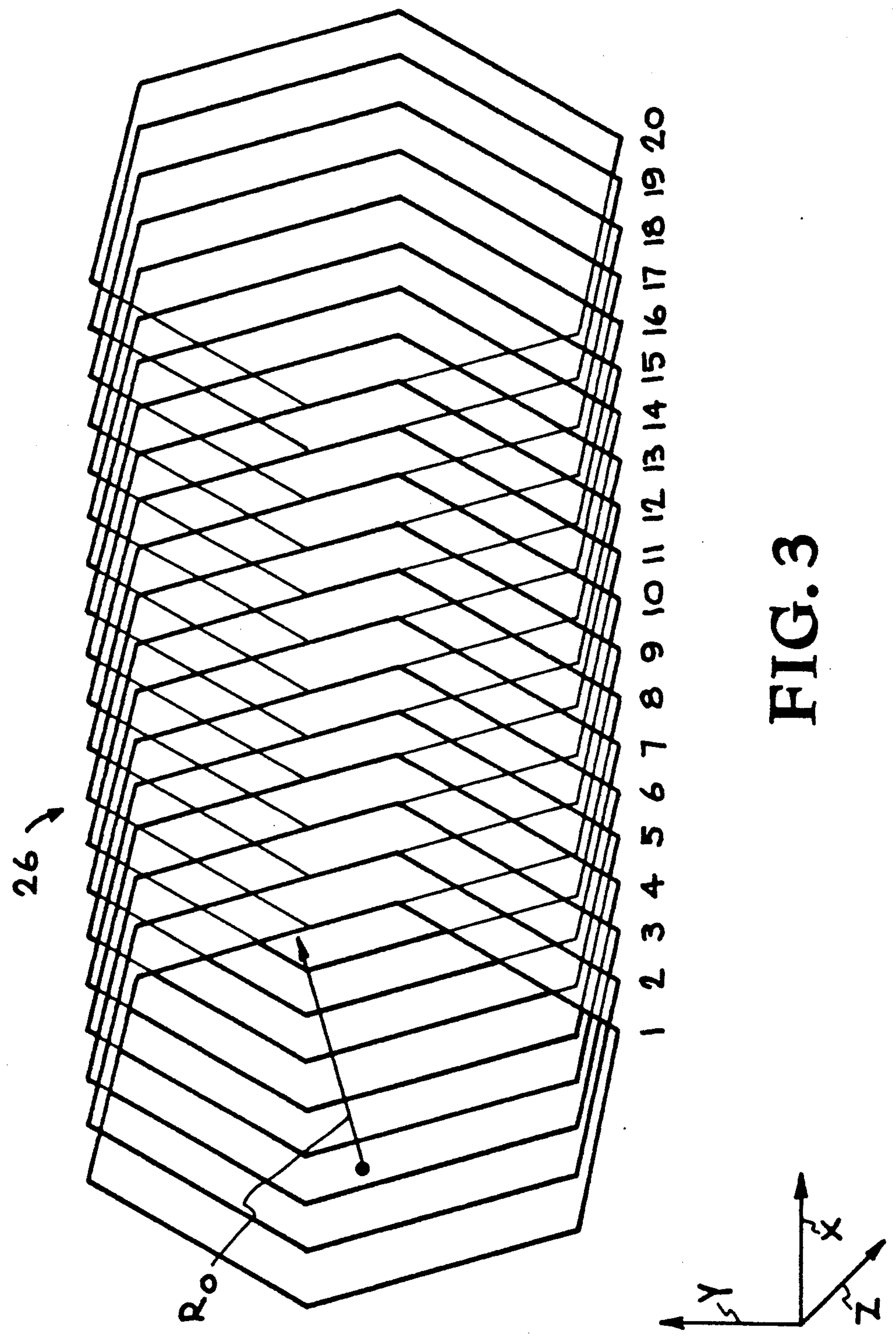
FIG. 3 illustrates a wire-frame model of a portion of an ion processing channel comprising a series of hexagonal electrode elements.

FIG. 3 illustrates a wire-frame model of a single processing channel 26 composed of an array of hexagonally-shaped electrode rings 22, labeled 1, 2, 3, etc. Charged particles travel through the center of processing channel 26, which has a characteristic radius $R_0$. As mentioned, the preferred embodiment uses hexagonally-shaped areas for the electrodes, approximately 2 cm in diameter. Calculations made for the preferred embodiment assume an electrode-to-electrode spacing of $R_0/13$ (i.e., approximately 13 electrodes per cm). As the spacing between electrodes decreases, each electrode requires less applied power to reproduce the same field, and this allows use of more finely constructed field shapes. The fields supported by the present invention can be created and transformed without using elaborately constructed, fixed electrode shapes, as in the prior art. The following analysis and examples show how the present invention can control barrier heights, translate charged particles, and achieve ejection, cooling and heating of ion groups. The methods refer to a multi-variable equation of completely general form to describe these processes. Various processes can be combined to create multiple concurrent effects. For example, the translation of trapping wells along the longitudinal path of a processing channel can be combined with the selective cooling of a particular packet of ions within one potential well. Any number of field configurations can be superimposed.

As indicated, the present invention combines both translation control and energy control over ions and groups of ions. Translational control and energy control need not be linked together; for simplicity, the two topics are discussed separately. However, the present invention allows the two processes to combine to provide powerful and efficient techniques for controlling, analyzing and mass-selectively separating ions.

Net translation of trapped ions in the present invention adds energy to these ions. If the cooling (or energy-altering) aspects of the present invention are not employed, either in theoretical discussion or in actual practice, some other method should be used to dampen this added energy. As in some prior art ion trap applications, a neutral collision gas (such as helium, He) can be introduced in the invention; ion collisions with this background gas can uniformly remove energy from groups of trapped ions. Therefore, when the translational aspects of the invention are first discussed, it may be assumed that a sufficient pressure of He buffer gas is present in the IPU region 10 of the invention to provide collisional damping. The buffer gas can later be replaced by the active cooling functions that the fields of the present invention provide, as discussed below.

THEORY OF OPERATION

Electro-Dynamic Field Calculations

Several widely used and understood techniques can establish the operating characteristics of radio-frequency devices, and the behavior of charged particles in these devices. The most commonly used description refers to the exact solutions of the class of Mathieu differential equations. Solutions to these equations describe ion stability and instability in quadrupole devices, ion traps and other similar instruments. Early descriptions of the theory and operation of traditional quadrupole devices, interpreted by Mathieu equation, were given by Paul et al in U.S. Pat. No. 2,939,952 and have been repeated with variations by others (such as U.S. Pat. Nos. 3,501,631, 4,755,670), see *Quadrupole Mass Spectrometry and Its Applications*, ed. P.H. Dawson, Elsevier, Amsterdam, 1976, *Quadrupole Storage Mass Spectrometry*, R. E. March and R. J. Hughes, eds., John Wiley, New York, 1989, and the references within. These sources may be consulted for analytical methods and results.

Another, approximate technique, constructs a time-averaged effective (or pseudo-) potential. Ions which would have stable trajectories predicted by exact solutions to Mathieu equations, would be confined within surfaces defined by the effective potential. Dehmelt and others cited in *Advances in Atomic and Molecular Physics*, Academic, New York (1967) Vol. 3, p. 53, and discussions in *Mechanics*, 3rd Ed., L. D. Landau and E. M. Lifshitz, Oxford, New York, 1976, have used an analytical approximation of the effective potential for systems of quadratic symmetry. For a hyperbolic multipole, one can write:

$$U_{eff}(r) = \left(\frac{n^2q^2V^2}{4m\omega^2r_0^2}\right)\left(\frac{r}{r_0}\right)^{2n-2} + U_s \quad (3)$$

where n is the number of sets of poles (which in quadrupole devices is two), $r_0$ is the closest distance between the center of the effective potential and the electrode surface, r is the ion distance from potential center, q is the ion charge, m is the ion mass, V is the maximum applied voltage to the electrodes, $\omega$ the frequency of the applied field and $U_s$ is the DC offset. The equation is valid for $\omega >> 1/\tau$ where $\tau$ is the transit time across the distance spanned by an effective potential well for an ion species of a given kinetic energy in the absence of the RF field. Because this analytical equation applies only to devices of quadratic symmetry, it is too restrictive for use in the present invention. However, it provides an important intuitive picture of the behavior of charged particles in radio-frequency fields which can be applied to the present invention. Namely, the shape of the time-averaged fields which confine, trap or guide ions in radio-frequency fields is proportional to the amplitude of the oscillating voltage at that point divided by the frequency of oscillation, squared. The ion mass scales the effective potential, determining the intensity but not the shape of the field. Hence, various values of frequency and voltage can generate a similar trapping effective potential for a given charge-to-mass ratio.

Generalized Effective Potential

The operation of the present invention can be explained by reference to a broader, more general description of the effective potential. Rather than being constrained to the quadratic functions required by conventional RF mass spectrometers, the local electric potential for the present invention arises from the interaction of the potentials applied to a large number of parallel electrodes. The potentials applied to each electrode can be changed arbitrarily and independently in time and amplitude. Thus, to adequately encompass the variability of the fields generated by the present invention, the local electric potential can expressed as a numerical, three-dimensional electrostatic array $\phi(x(i),y(i),z(i)$ composed of n points. The potential array $\phi$ arises from a set of potentials $P_j$ applied to the M electrodes in the electrode array 12. Using numerical techniques to calculate and express local field quantities has two advantages. First, as described, the present invention is capable of creating an infinite variety of effective potential maps, through the sequential application of distinct sets of potentials to the electrode array 12. The fields created would defy closed-form analytical solution, but are calculable to any specified degree of precision by digital numerical methods. Second, a high-speed computer 18 applies calculated potentials to the electrode array 12 in rapid succession, and a numeric decomposition of the potentials ideally suits a digital control means.

Techniques for numerical analysis of RF fields and charged particle behavior is broad and well-understood. The numerical relaxation methods and computer simulation techniques used by the preferred embodiment to determine the local electric potential $\phi$ from the potentials applied to the electrostatic array are found in the Simion PC/PS2 User's Manual, Version 4.1, by D. A. Dahl and J. E. Delmore, Idaho National Engineering Laboratory, Idaho Falls, ID, 1988. See also *Quadrupole Storage Mass Spectrometry*, R. E. March and R. J. Hughes, John Wiley, New York (1989), generally and at pages 67-69, and G. Leclerc and L. Sanche, *Computers in Physics*, Vol. 4, p. 617, (1990). The SIMION PC/PS2 V. 4.1 electrostatic field methods and programs, as one approach among many, model a set of electrodes and the resultant RF field as a two-dimensional numerical array. A subject of array points are designated as electrodes while the remaining points represent the electric field points. A three-dimensional electrode array and fields can be indirectly modeled using symmetry, by rotating the two-dimensional array about a common axis.

Computer simulation programs such as SIMION PC/PS2 V. 4.1 can provide several important categories of information, to predetermined levels of precision. First, they can predict the static electric field arising from a specified electrode structure. Second, simulations can predict the spatial and temporal trajectories of particles of given mass and charge injected into the predicted static field. Thus, the focusing, or ion-optical, properties of the electrode structure can be described. Third, superpositions of the calculated fields can be made, yielding complex and sophisticated electrodynamic fields which can change through time. In other words, parameter maps can be constructed summarizing field shapes and electrical characteristics. And fourth, the complex trajectories of ions injected into these complex time-dependent fields can also be evaluated. Thus, for a given ion, the parameter maps of Step Three can be evaluated for regions of mass stability and mass instability. These calculations provide a method of the present invention for evaluating ion-specific properties of a particular electrode configuration, of storing sets of evaluation results as parameter maps, and of real-time control of the inventive apparatus by both real-time calculation and look-up tables.

The electrostatic field in the present invention is modeled as a boundary-value solution to Laplace's equation. In general, to calculate the potential at a given point (x,y,z), one forms a weighted sum of the potentials applied to the electrode surfaces, where the weights are calculated by relaxation methods (see the Leclerc et al. article cited above). In a three-dimensional space composed of cubic cells of dimension $\Delta^3$ (where $\Delta$ is a small interval), Laplace's equation can take the following form:

$$\phi(i,j,k) = \frac{1}{6}[\phi(i+1,j,k) + \phi(i-1,j,k) + \phi(i,j+1,k) + \phi(i,j-1,k) + \phi(i,j,k+1) + \phi(i,j,k-1)] \quad (4)$$

where (i,j,k)$\equiv$($x_n/\Delta$, $Y_n/\Delta$, $Z_n/\Delta$) is the coordinate, in $\Delta$ units, of the grid point characterizing cell n.

The computational process occurs in two steps. First, the field contributions of each electrode in a particular array of electrodes 12 are calculated. A reference voltage is applied to those array points corresponding to the $i^{th}$ electrode 12*i*. Iterative relaxation of array points around electrode 12*i*, according to Equation (4) (or some similar manner), provides an approximate solution to Laplace's equation. The greater the number of iterations, the closer the solution approximates the actual result. The process continues until the difference between calculations at each array point (i,j,k) is less than some threshold value. More sophisticated iterative methods can be applied in practice to achieve the identical result but in a shorter amount of time. For instance, the SIMION PC/PS2 V. 4.1 system describes and implements a dynamically self-adjusting over-relaxation method that can save computational time. The result of the computation is a map of weights. These weights encapsulate the contribution a potential on electrode 12*i* makes to each arbitrary array point, scaled to the initial reference voltage.

For each electrode, there is a similarly calculated weighting map, scaled in the preferred embodiment to the same reference voltage. Solutions to Laplace's equation are additive; to calculate the voltage at an arbitrary point, the weighting maps for each electrode, multiplied by the applied potential at that electrode, can simply be added at the arbitrary point. If the $\Phi_j$(x(i),y(i),z(i) represents the weighting map for adding a time-variant potential P(j,t) from the $j^{th}$ electrode surface to an arbitrary $i^{th}$ point in space (x(i),y(i),z(i), then the time-dependent numerical potential at an arbitrary point (from an array of M electrodes) can be written as:

$$\phi(x(i),y(i),z(i),t) = \sum_{j=1}^{m} \Phi_j(x(i),y(i),z(i))P_j(t) \quad (5)$$

Thus, the time-variant field created by the array of electrodes 12 can be modeled to any degree of precision using relaxation methods and Equation (5).

The analytical solution of the effective potential for the prior art quadrupole and ion trap devices requires that the fields in the devices obey an ideal quadratic equation such as:

$$\phi(x,y,z)=f(t)(\alpha x^2+\beta y^2-\gamma z^2) \quad (6)$$

that is shown in Equation (1) of the Paul et al Patent, where $\alpha+\beta=\gamma$. The present invention uses a more general and flexible expression for the fields it may generate (Equation (5)). The force exerted on a test charge q inserted in such a numerically-calculated field can be expressed as:

$$F(x,y,z,t)=qE_n(x,y,z,t) \quad (7)$$

where the electric field $E_n$ is found by taking a numerically-evaluated gradient of the potential field:

$$E_n(x,y,z,t)=\nabla_{num}\phi(x,y,z,t) \quad (8)$$

It has been shown that the effective potential expressed in terms of the position-dependent force can then be written as $$U_{eff}(x,y,z) = \frac{|F_{max}(x,y,z)|^2}{4m\omega^2} + U_s \quad (9)$$

or more generally as $$U_{eff}(x,v,z) \propto |F(x,y,z)|^2 \quad (10)$$

where all variables except the maximum force at a given point are constant. See the Landau and Lifshitz reference, the Dehmelt reference, both cited above.

Equations (7) through (9) provide a method for numerically calculating an effective potential map for a given set of applied time-dependent potentials $P_j(t)$ applied to each electrode. The placement of a test charge at various locations in space allows one to map the shape of the effective potential. These maps illustrate formation of effective potential trapping wells when the conditions of oscillation frequency, voltage amplitude and ion energy correspond to a stable, confined trajectory. In other words, the maps provide the shape of the trapping effective potential well when the ion is bound. The maps described and shown in the present invention were calculated using this method.

To find the stability and trajectory of a given ion of particular mass and initial kinetic energy, a further numerical simulation of its motion through the calculated time-dependent fields can be made, through conventional trajectory calculations. Operation of the present invention can be thought of as resulting from the action of the time-averaged effective potential on a given ion at a given point. Thus, for a given frequency and voltage amplitude, the relative shape of the effective potential is calculated with respect to a given charge. The absolute depth of that effective potential is determined by the mass of the stable ion, irrespective of the ion's energy. The ion's energy can either be sufficiently low to trap the ion, or sufficiently high to allow the ion to escape over a particular effective potential barrier.

The mass-dependent stability of an ion trapped in a particular effective potential well is governed by the local DC offset, frequency and voltage amplitude. If an ion is unstable in a well (as opposed to a stable ion being sufficiently energetic to overcome a local effective potential barrier), then the ion irreversibly gains energy from the trapping field until it either: a) penetrates a confining effective potential barrier and strikes an electrode, or b) escapes over a local barrier into a new region where it is stable (i.e., does not irreversibly gain energy from the field).

The confinement of a charged particle can be with respect to one or more dimensions. The position of confinement refers to the total volume of confinement, including both its shape and location. For convenience in discussing translations of wells, the midpoint of similarly shaped wells can be used as the trapping center position. Thus, translation (as used throughout this discussion) includes both the enlargement and shrinkage of a trapping well (while keeping the trapping center stationary), as well as the movement of a well's trapping center in space.

To summarize thus far, the present invention combines a series of electrodes 12 with a central processing unit 18, whereby potential amplitudes are applied to each electrode. As with the prior art, each applied potential can be modulated in time by an amplitude function V(t). In addition, CPU 18 can rapidly change each applied potential, altering the shape of the effective potential in space, and allowing for a much greater variety of trapping potentials than available in the prior art. These changes in shape of the effective potential barrier allow confinement, translation and energy removal from charged particles moving within the present invention. These changes can also be used to locally govern a given ion's mass-dependent stability or instability.

Translational Control

Numerical methods for calculating the fields of the electrode array in accordance with the present invention do not involve any analytic field formulations, as do the Mathieu equations or effective potential equations of the prior art. Ion motion through the calculated field maps can be numerically evaluated from initial conditions (ion position, velocity, initial potentials on the electrodes) and the subsequent timing sequence of potentials applied to each electrode.

Each sequence of applied potentials can create different effects for the same ions, and the same sequence can cause different results for different ions. To effectively use the infinite number of possible sequences, one can exploit the ability to rapidly compute numerical maps of parameter space, i.e., parameters describing the timing of potentials in the electrode array can be progressively changed and the results can be summarized, as is shown below. Examining these maps pinpoints regions in parameter space to perform desired processing operations. The accumulation of these parameter maps represents an important achievement of the present invention, allowing the continual discovery, storage and reuse of useful parameter sequences.

Instead of an analytic expression for the electric field, the present invention substitutes a general expression containing relatively few variables. The general expression can be slowly altered to generate a timing diagram that describes the sequence of applied potentials. The description of those portions of parameter space containing useful operations can then be summarized in terms of these variables. In addition, the algorithms or program codes that control the apparatus of the present invention can also be summarized by the general expression.

Figure 4:
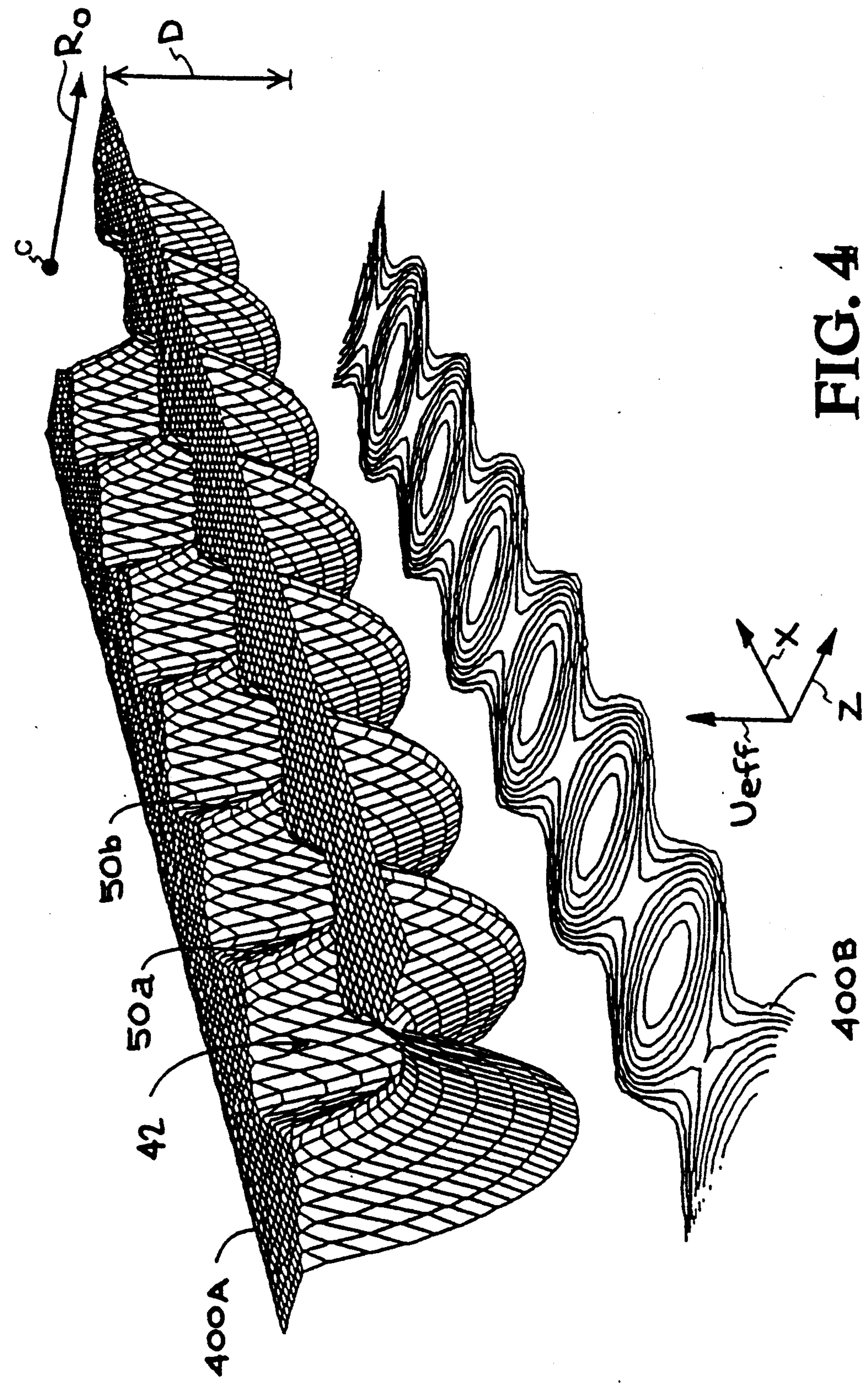
FIG. 4 shows a series of effective potential wells formed within a field inside an ion processing channel.

FIG. 4 shows a computer simulation of simple effective potential wells formed along a path within a processing channel 26 of the present invention. FIG. 4 provides two mappings. The upper mapping 400A, as indicated, reveals the height D in effective potential units, of the effective potential barrier in the x-z plane. Since the processing channel 26 is rotationally symmetric, the same plot would apply in the y-z plane. As a particle moves from the center C of the channel outwards along a radius $R_0$, the effective potential barrier grows larger, trapping the particle within a given well, such as well 42. The lower mapping 400B, provides a topographical rendering of the same effective potential barrier surface.

In the computer simulation creating these wells, the potentials applied to the array of electrodes 12 as shown in FIG. 3 are given by the general expression:

$$P(j,t)=p(j,t)V(t)=\mathrm{Sign}[A(j,t)]\,|A(j,t)|^{s(j,t)}V(t), \quad (11)$$

where $$A(j,t)=\cos[f(j,t)2\pi w(j,t)-k(j,t)], \quad (12)$$

and where p(j,t) is an electrode-specific time-dependent potential, $V(t)=\phi_0\sin(\omega t)$ is an overall applied modulating function as in the prior art, and the Sign[A] function merely provides the sign of its argument. The rest of Equations (11) and (12) represents one of a number of possible representations for conveniently mapping the relative potentials of successive electrodes. The particular functions used in Equations (11) and (12) are arbitrary and place no limitation on the generality of the applied potentials and array concepts of the present invention.

A cosine function is used to straightforwardly map a sinusoidally-varying potential to electrodes along the x-axis, creating the series of wells 42 as shown in FIG. 4. The exponent s(j,t) changes the slope of the cosine function, increasing the barrier slope from well-to-well. The electrode assignment function f(j,t) also changes the slope of the cosine function and represents the time dependent application of the cosine function to each successive jth electrode. In the first simulation shown in FIG. 4, f(j,t) is given by:

$$f(j,t)=\frac{e(j,t)-1}{29} \quad (13)$$

where $$e(j,t)=1,2,3,4,5\ldots 28,29,1,2,3,4,5\ldots \quad (14)$$
$$\text{for } j=1,2,3,4,5\ldots 28,29,30,31,32,33,34\ldots$$

w(j,t) is a pole multiplicity function which can stretch or contract the wavelength of the cosine function as applied to a series of electrodes. The example in FIG. 4 has w(j,t) as a constant equal to 1, and an f(j,t) given by Equations (13) and (14) such that electrode 1 and electrode 30 both have an electrode assignment $f(j,t)=(1-1)/29=0$. Given that the shift-control function $k(j,t)=0$ in the current example, and the barrier slope $s(j,t)=1.5$, the potential applied to these two electrodes is the same and equals $\cos(0)^{1.5}=1$. The potential applied to electrode $j=15$(or 45, etc.) represents the opposite node of the cosine wave and therefore equals $\mathrm{Sign}[\cos(\pi)]\times|\cos(\pi)|^{1.5}=-1$. Given the notation of Equation (11), and the selected parameters, the applied potentials repeat (i.e., pass through a 360° cycle) every 30 consecutive electrodes. With an overall barrier slope $s(j,t)=1.5$, this information can be summarized as (360/30/1.5). The resulting instantaneous potential surface is shown in FIG. 6 and a topographical map of the potential is shown below the potential surface in FIG. 6 and more explicitly in FIG. 5. As discussed above, the electrodes are spaced $R_0/13$ apart.

The maximum applied potential $\phi_0$ is 500 Volts and the charged particles are assumed to be singly charged so that $q\phi_0=500$ eV for the simulations. At an applied frequency of 1 MHz, the sinusoidal function $\sin(\omega t)$ uses an angular frequency $\omega=2\pi(\mu\mathrm{sec})^{-1}$, where the time t is measured in microseconds. $\mathrm{Sin}(\omega t)$ attains a maximum value when $t=0.25$, 1.25, etc., a minimum when $t=0.75$, 1.75, etc., and is zero when $t=0.0$, 0.5, 1.0, etc.

Figure 5:
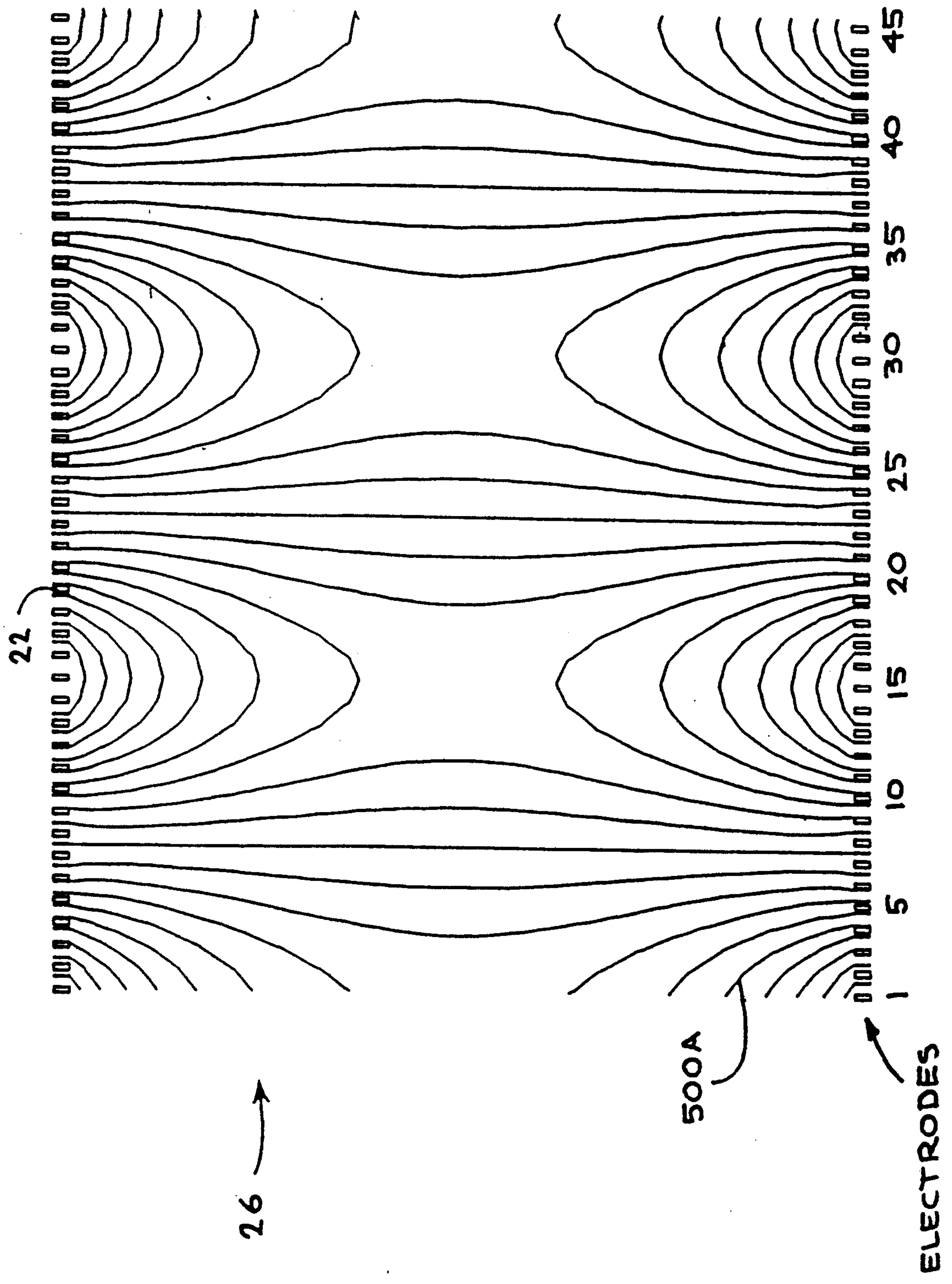
FIG. 5 shows a two-dimensional topographical plot of the electric field inside an ion processing channel.
Figure 6:
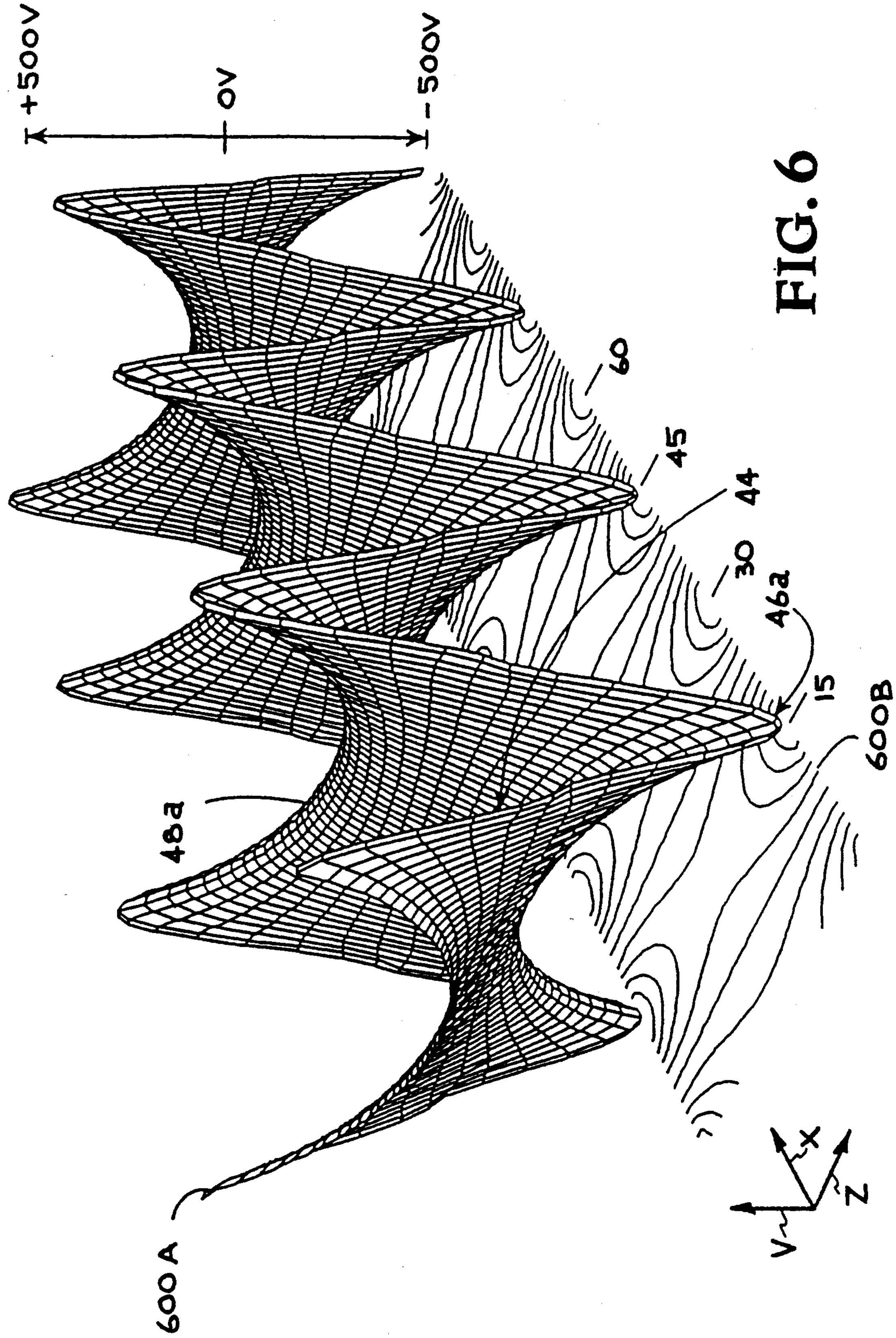
FIG. 6 shows a three-dimensional plot of the instantaneous electric potential formed inside an ion processing channel at one point of the RF cycle.
Figure 7:
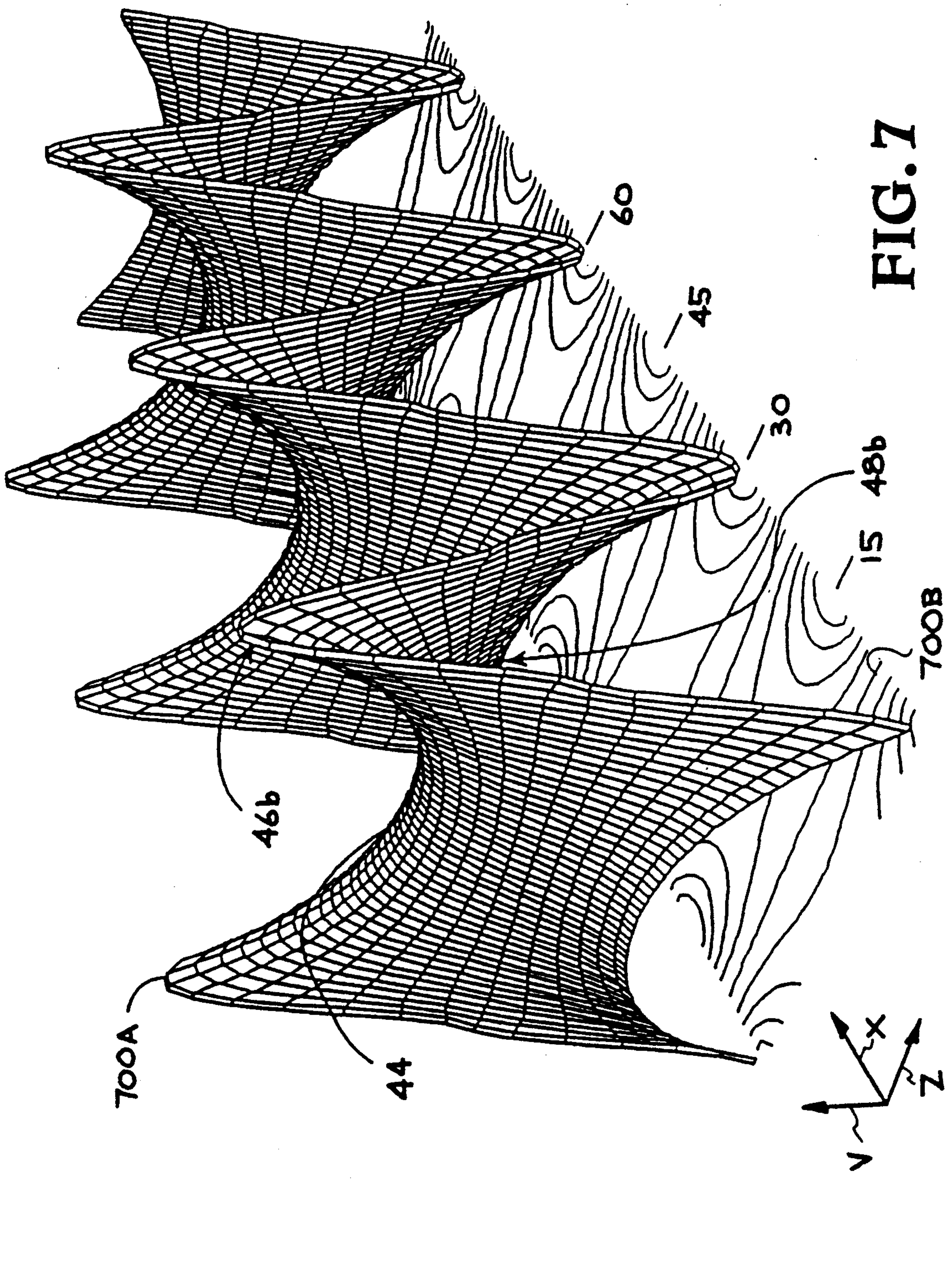
FIG. 7 shows a three-dimensional plot of the instantaneous electric potential formed inside an ion processing channel at the opposite period of the RF cycle as that in FIG. 6.

FIG. 5 reveals the electric potential lines 500A within the processing channel 26 at a maximum point in the applied amplitude modulation function V(t), while FIG. 6 shows three-dimensional map 600A of the instantaneous electric potential. Representative electrodes 1, 15, 30, etc. are shown along the x-axis of the maps. The instantaneous electric potential lines give rise to the instantaneous electric potential map. A charged particle could be represented by a marble on the saddle 44 of the electric potential map 600A of FIG. 6. As the marble rolled down the hill and into one of the low points 46*a*, the entire map would switch directions: what was low 46*a* would become a hill 46*b*, what was a hill 48*a* would become low 48*b*. The resulting inverted potential map 700A is shown in FIG. 7, for t=0.75. Thus, if timed correctly, a marble (i.e. the charged particle) could be trapped at the saddle point 44 of the instantaneous potential. That trapping effect is represented by each successive well 42 in the time-averaged effective potential map 400A shown in FIG. 4. The time-averaged cycle of potential surfaces 600A and 700A as shown in FIGS. 6 and 7 give rise to the effective potential barrier 400A shown in FIG. 4.

Figure 8:
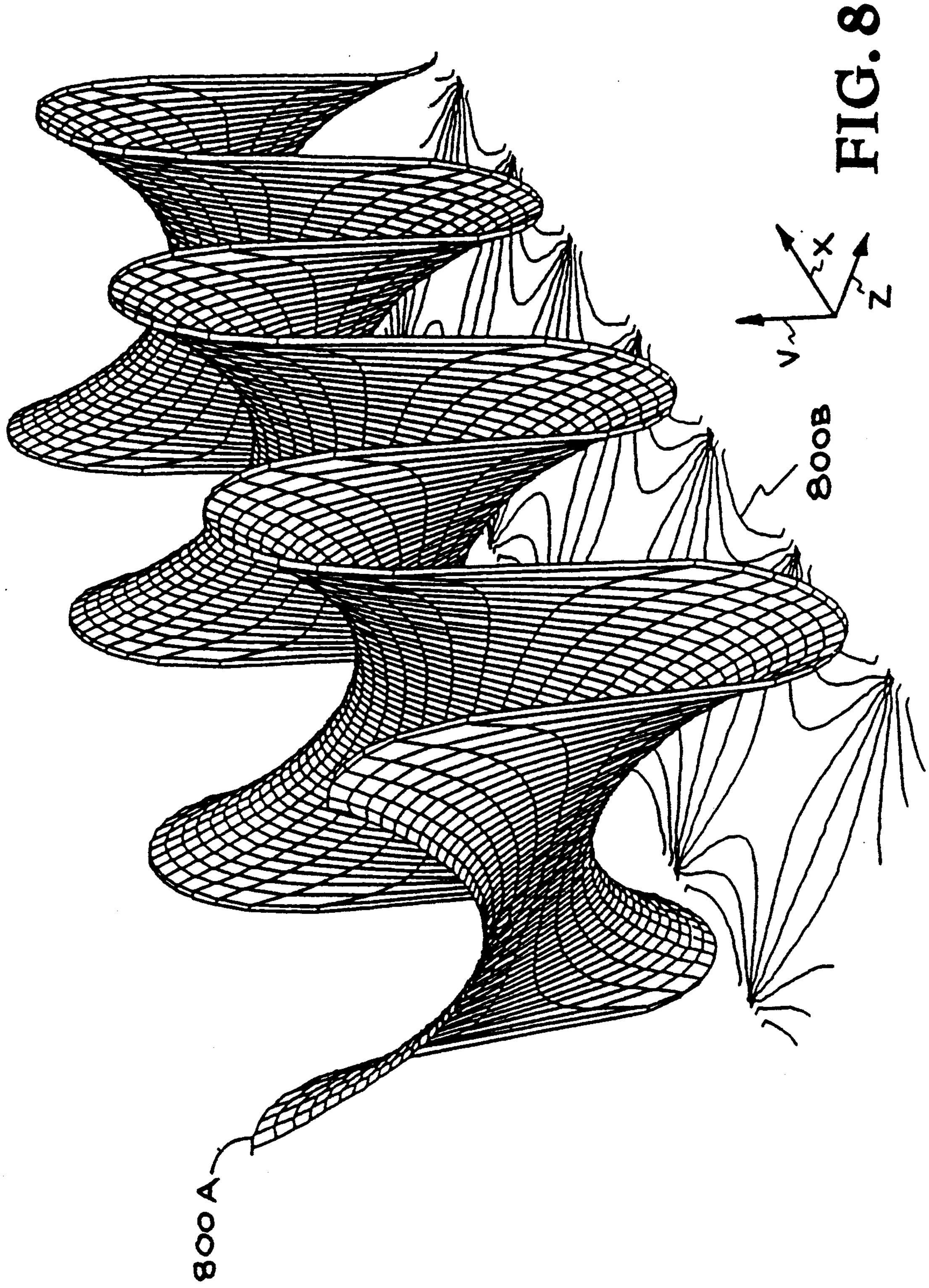
FIG. 8 shows a three-dimensional plot of the instantaneous electric potential formed inside an ion processing channel with a particular configuration of electrode parameters, different from those in FIGS. 6 and 7.
Figure 9:
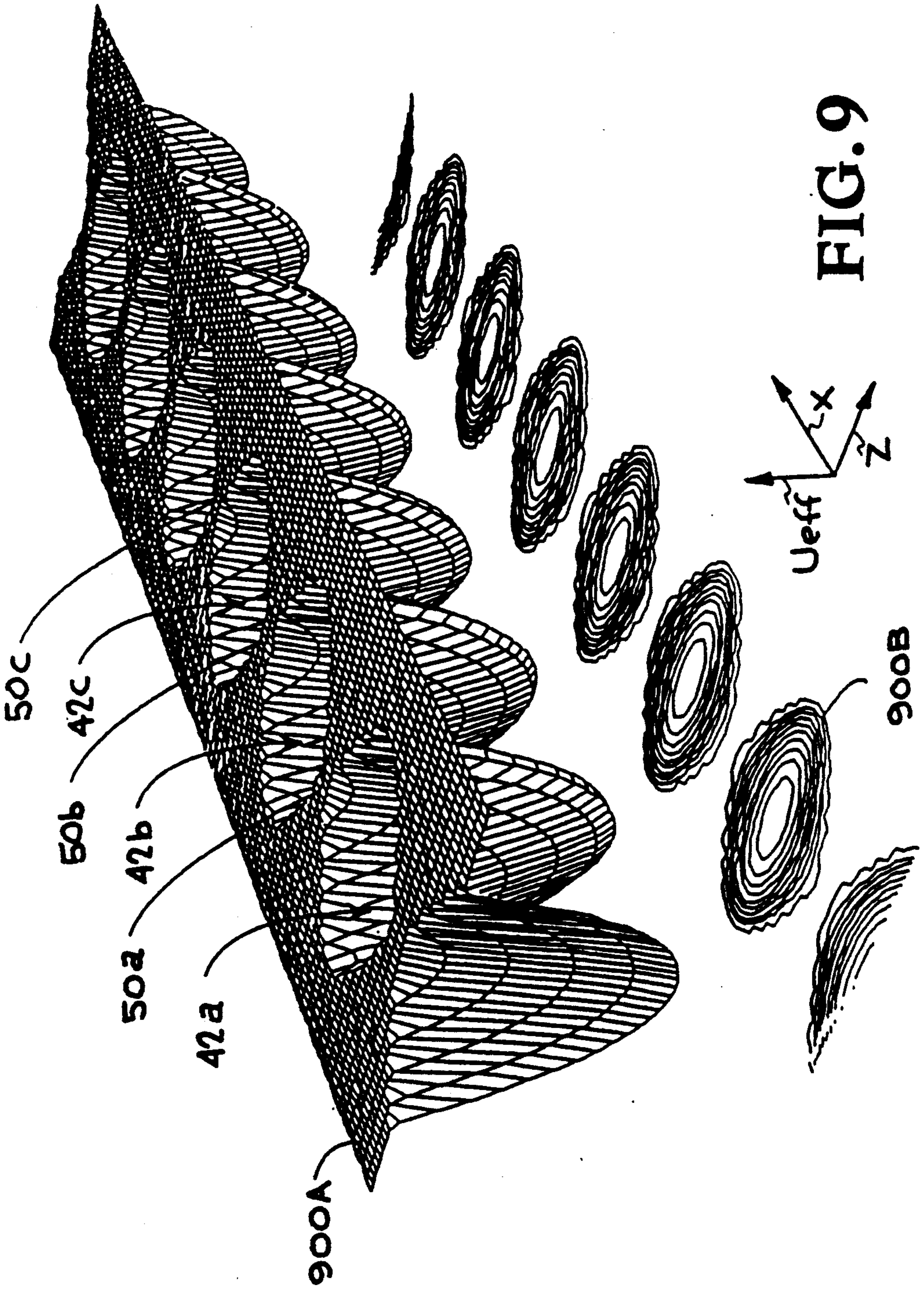
FIG. 9 shows a three-dimensional plot of the effective potential formed inside an ion processing channel with the particular configuration of electrode parameters used in FIG. 8.

The effect of changing several of the parameters of Equation (11) can be seen in FIGS. 8 through 11. FIGS. 8 and 9 illustrate the effects of changing the barrier slope function s(j,t). While s(j,t)=1.5 for the first examples shown in FIGS. 4 through 7, the example in FIG. 8 changes only parameter s(j,t) to 0.25 (i.e., taking the fourth root of the cosine function). FIG. 8 represents the instantaneous field voltage, and FIG. 9 represents the time-averaged effective potential. While the overall depth D of the wells 42 remains the same in FIG. 9 as in FIG. 4, the longitudinal barriers 50*a*, 50*b*, 50*c* have risen to better separate the individual trapping wells 42.

Figure 10:
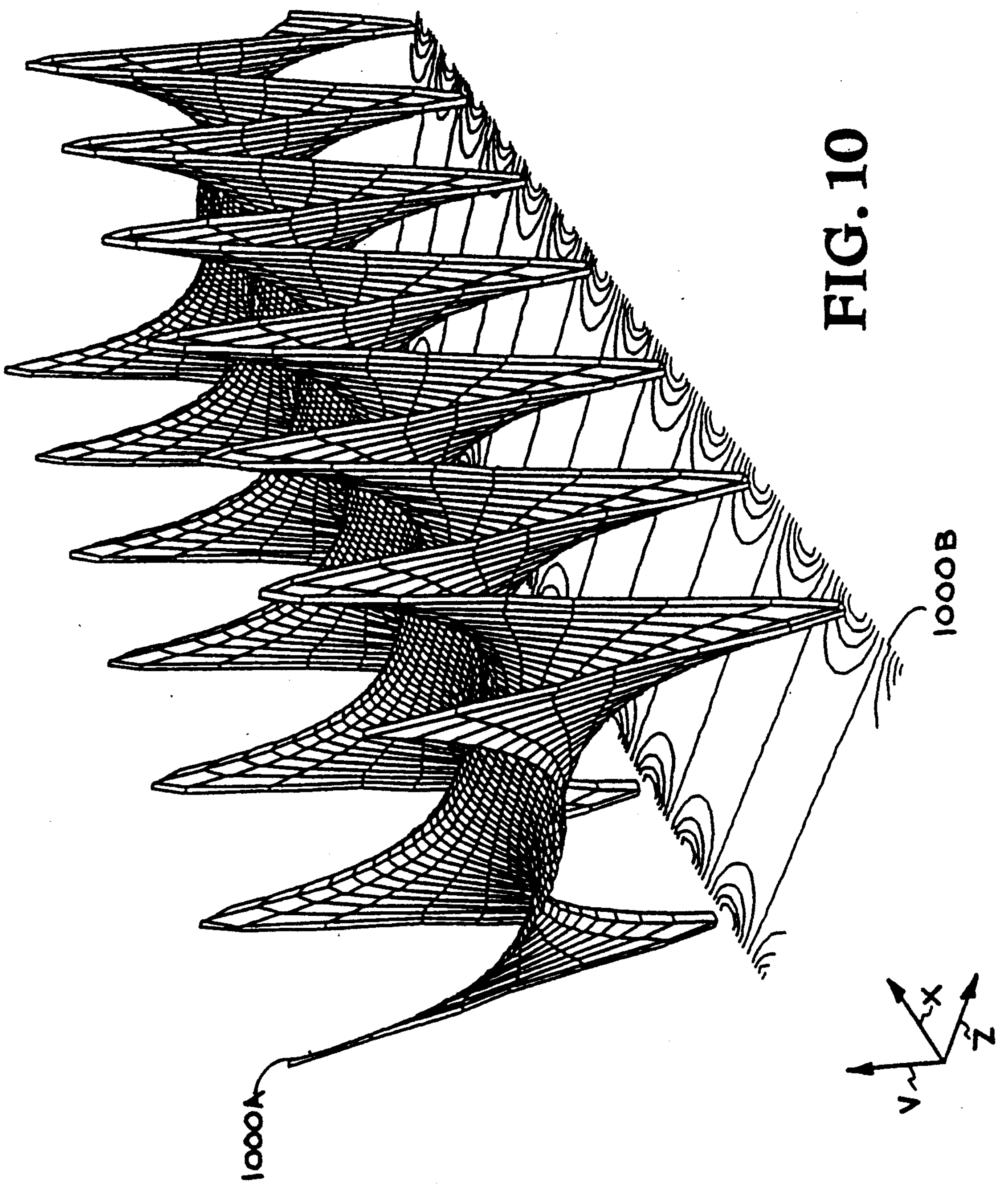
FIG. 10 shows a three-dimensional plot of the instantaneous electric potential formed inside an ion processing channel with a particular configuration of electrode parameters, different from those in FIGS. 6, 7 and 8.
Figure 11:
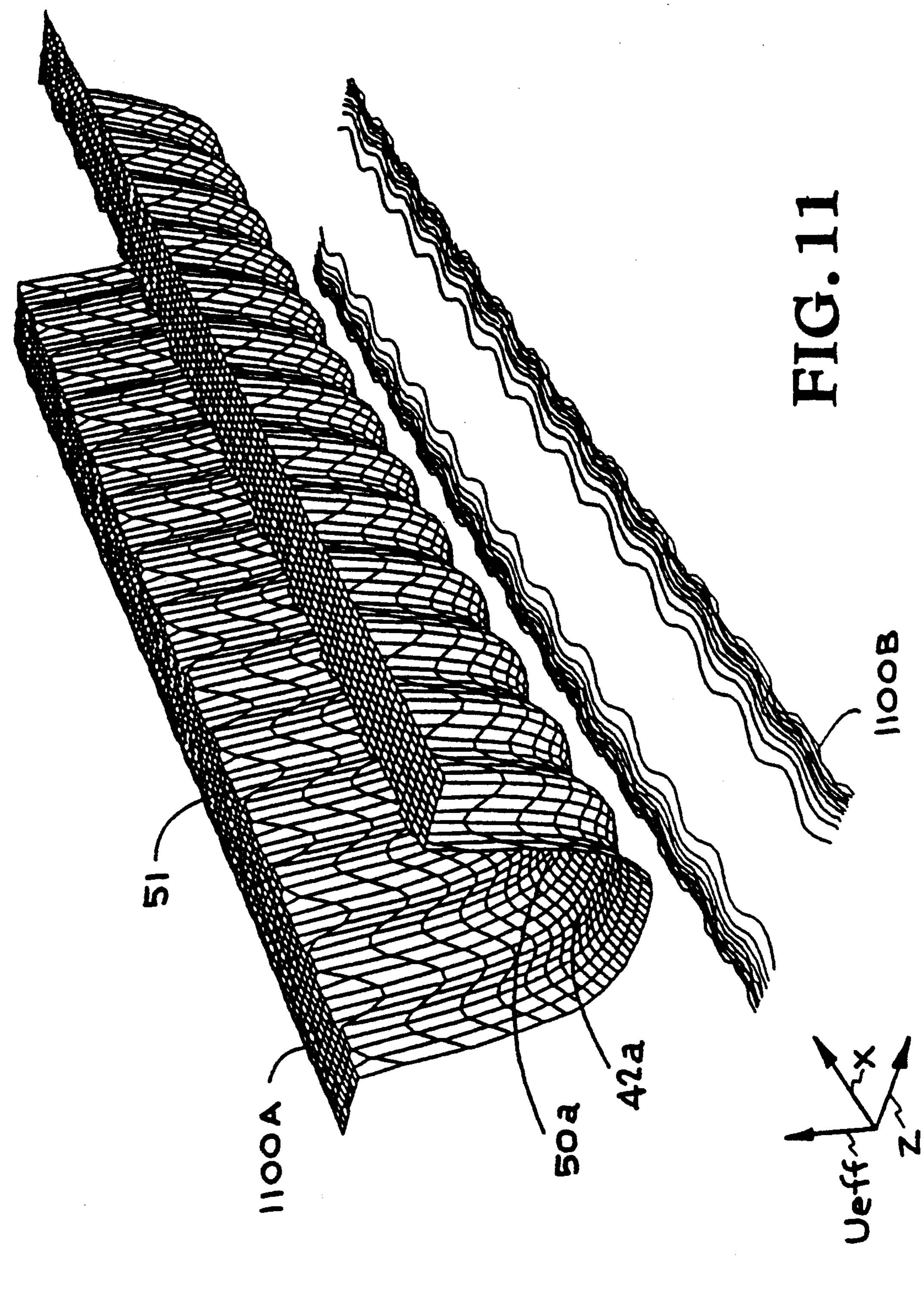
FIG. 11 shows a three-dimensional plot of the effective potential formed inside an ion processing channel with the particular configuration of electrode parameters used in FIG. 10.

The height of longitudinal barriers 50 can also be changed by altering the relative node spacing determined by w(j,t). The example shown in FIGS. 10 and 11 was created by changing only w(j,t), from 0.5 to 2.5. Again, FIG. 10 represents the instantaneous field voltage, while FIG. 11 shows the time-averaged effective potential. There is now very little difference in effective potential between the wells 42 and the longitudinal barriers 50. The transverse barrier 51, confining charged particles in a direction perpendicular to the axis of the ion processing channel, however, has become rather high.

Having illustrated how the present invention can be used to trap a particle in an effective potential well, the higher-order functions of the invention can also be illustrated. That is, both linear momentum operations (including both the imparting of momentum and the translation of a trapping potential well) can be shown, and, also, functions capable of cooling energetic charged particles can be illustrated as well, in a section on cooling below.

Figure 12A:
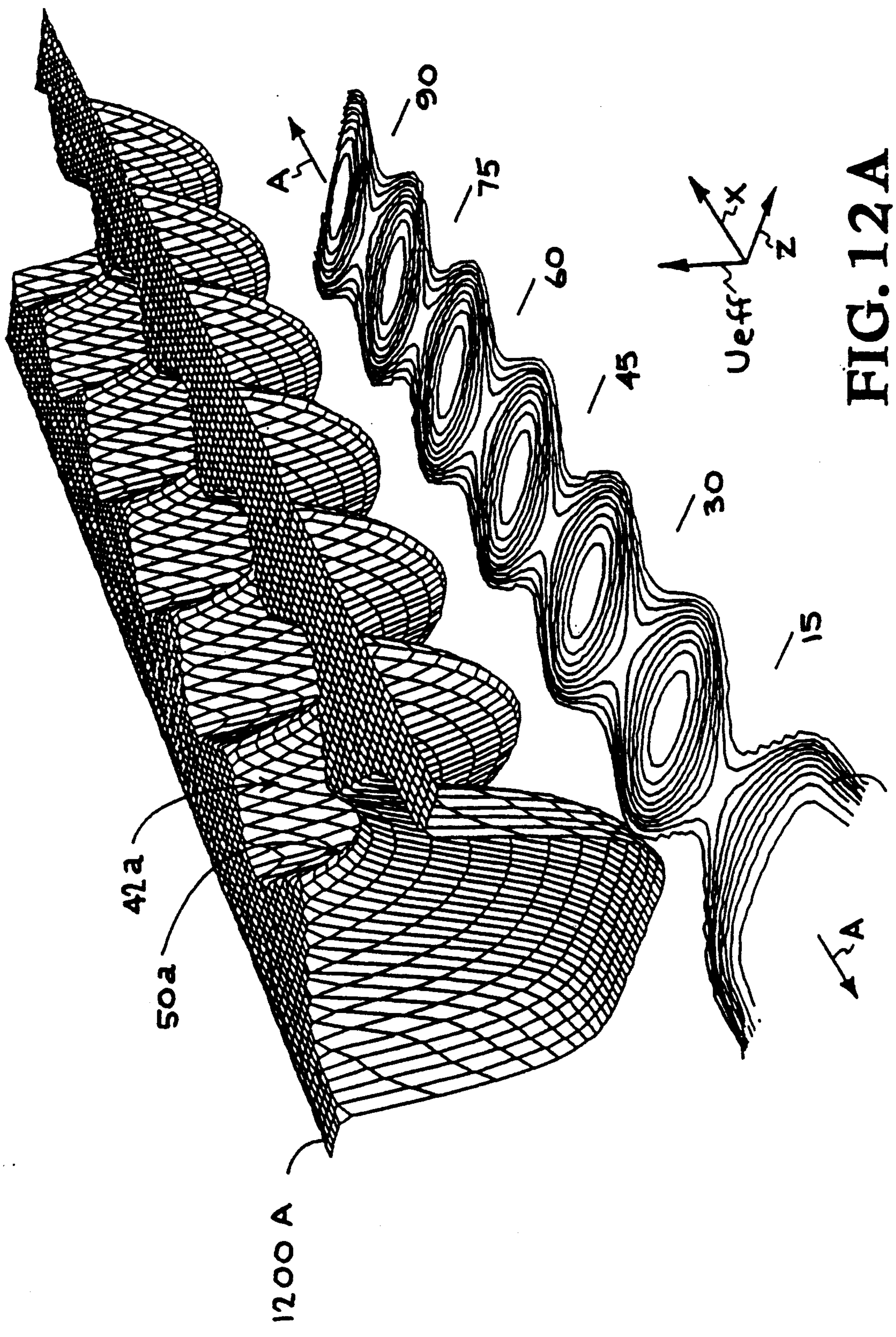
Figure 12B:
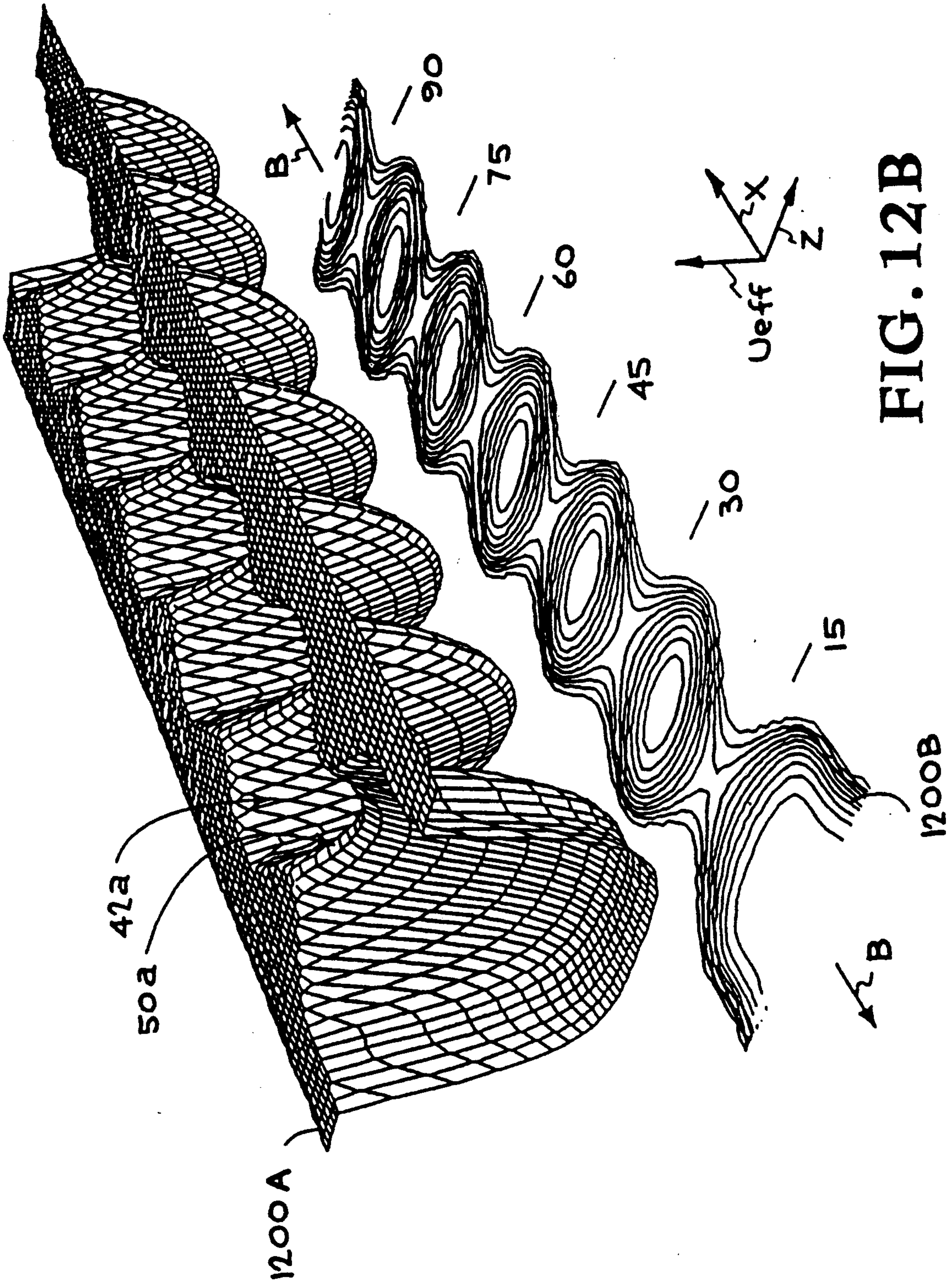
Figure 12C:
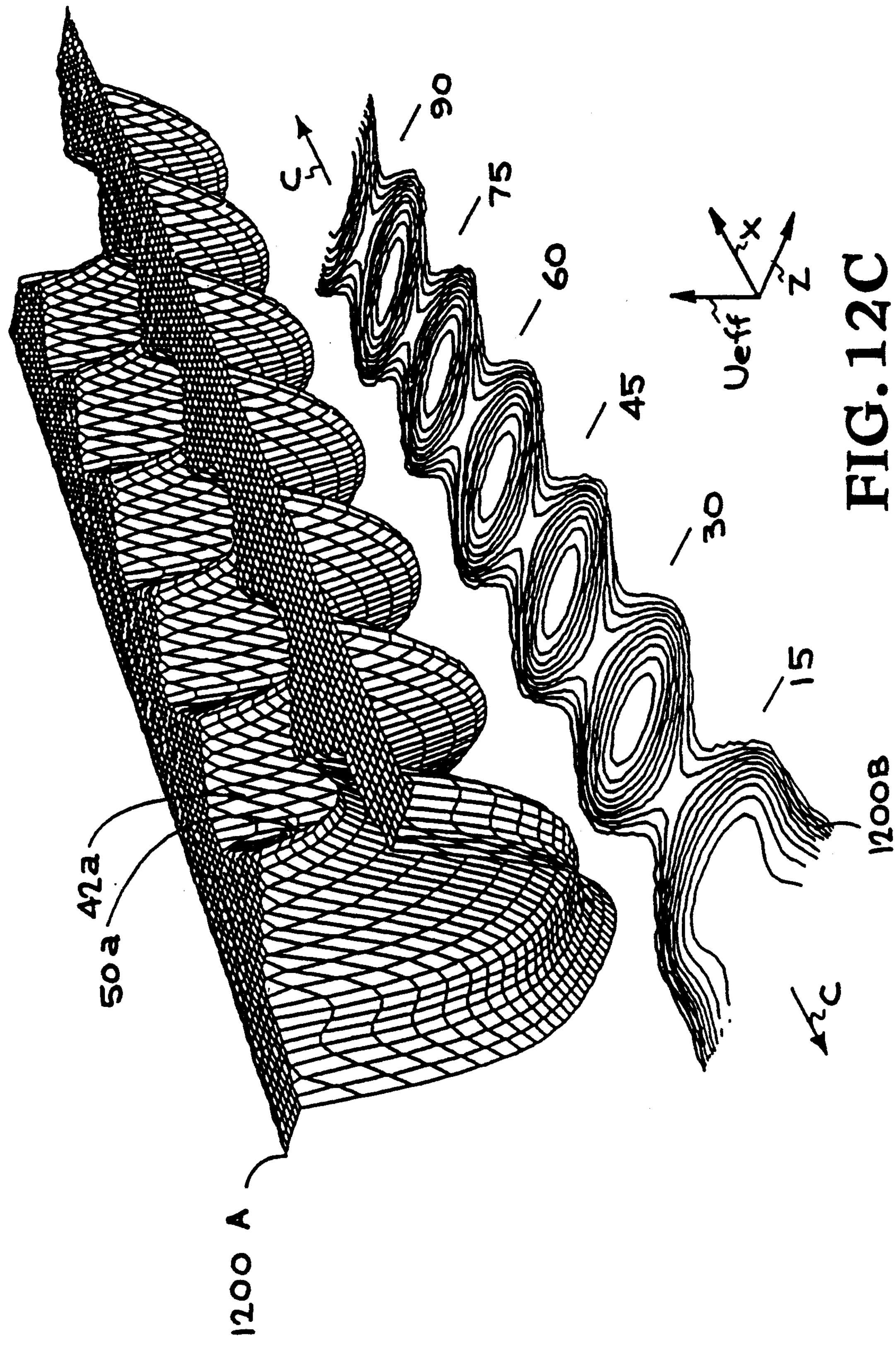

A computer simulated example of the point-wise translation of a series of potential wells 42 can be seen in FIGS. 12A through 12J. The effective potential surfaces 1200A (and two-dimensional topographical mappings 1200B) were created using the same parameters for Equation (11) as in the first example of FIG. 4. However, for each successive FIGS. 12A through 12J, the shift control function k(j,t) increases by 15° (or by 30° in certain steps) so that k(j,t)=180° for FIG. 12J. The result is a shifting of the center of each potential well 42 along the x-axis as one passes from one figure to the next consecutive figure in the sequence FIGS. 12A–12J. Comparing in sequence each effective potential surface 1200A, FIG. 12A shows an effective potential well 42*a* starting near electrode number 1. Electrode 1 is the closest electrode to the external environment, particularly the injection vestibule 32 containing a preliminary sample of ions. Effective potential well 42*a* separates its trapped charges from the external environment with effective potential barrier 50*a*.

Figure 12D:
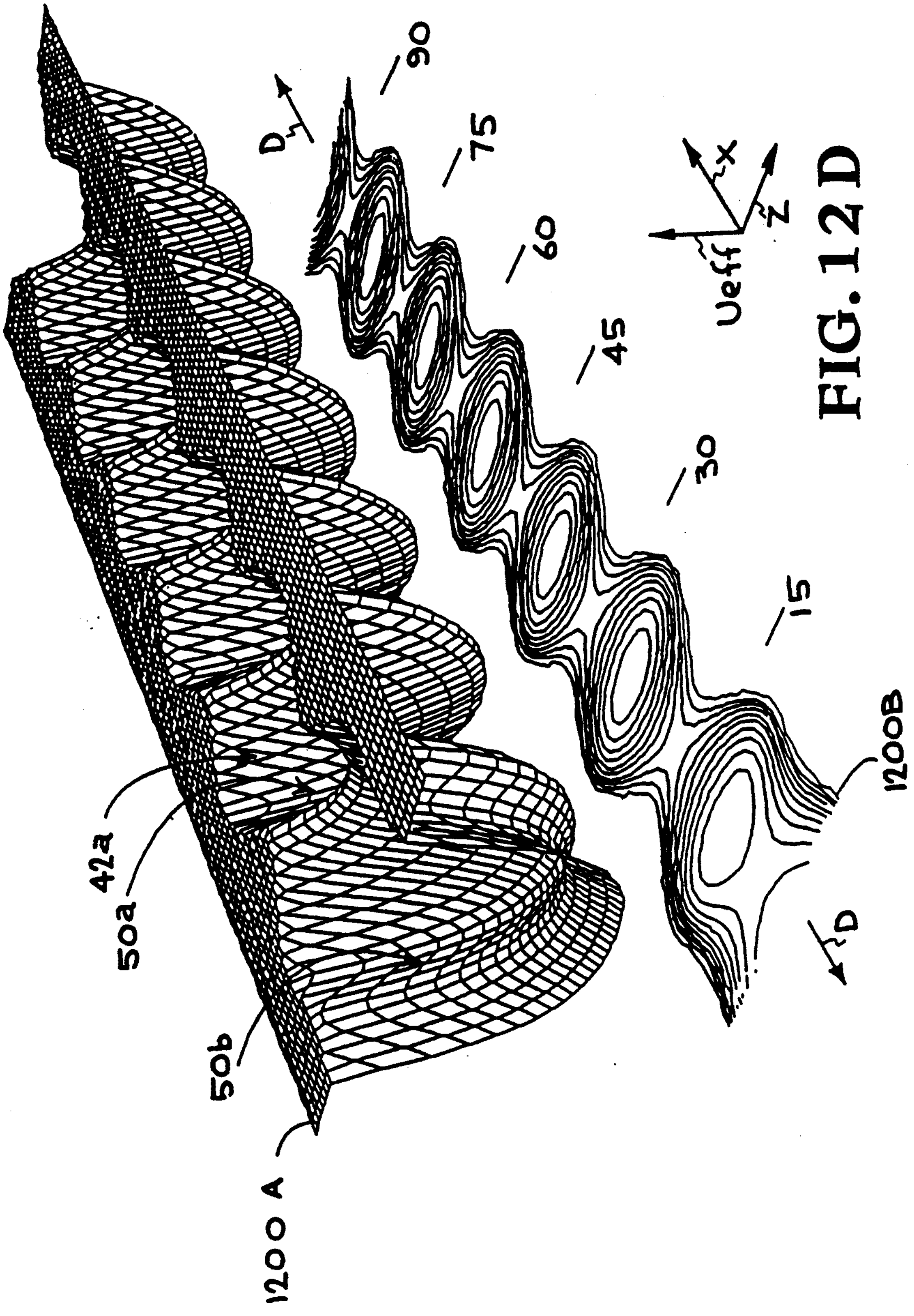
Figure 12E:
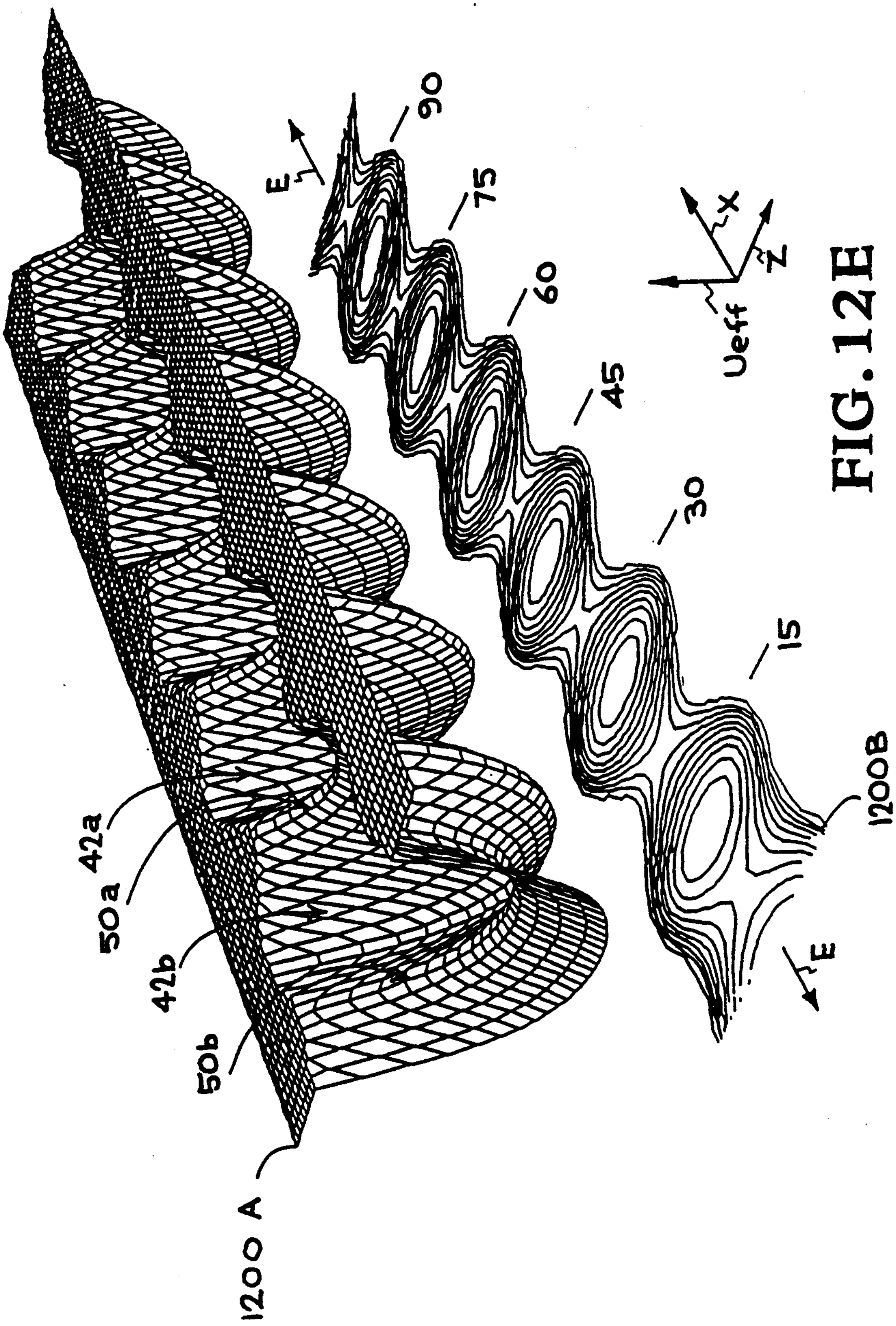
Figure 12F:
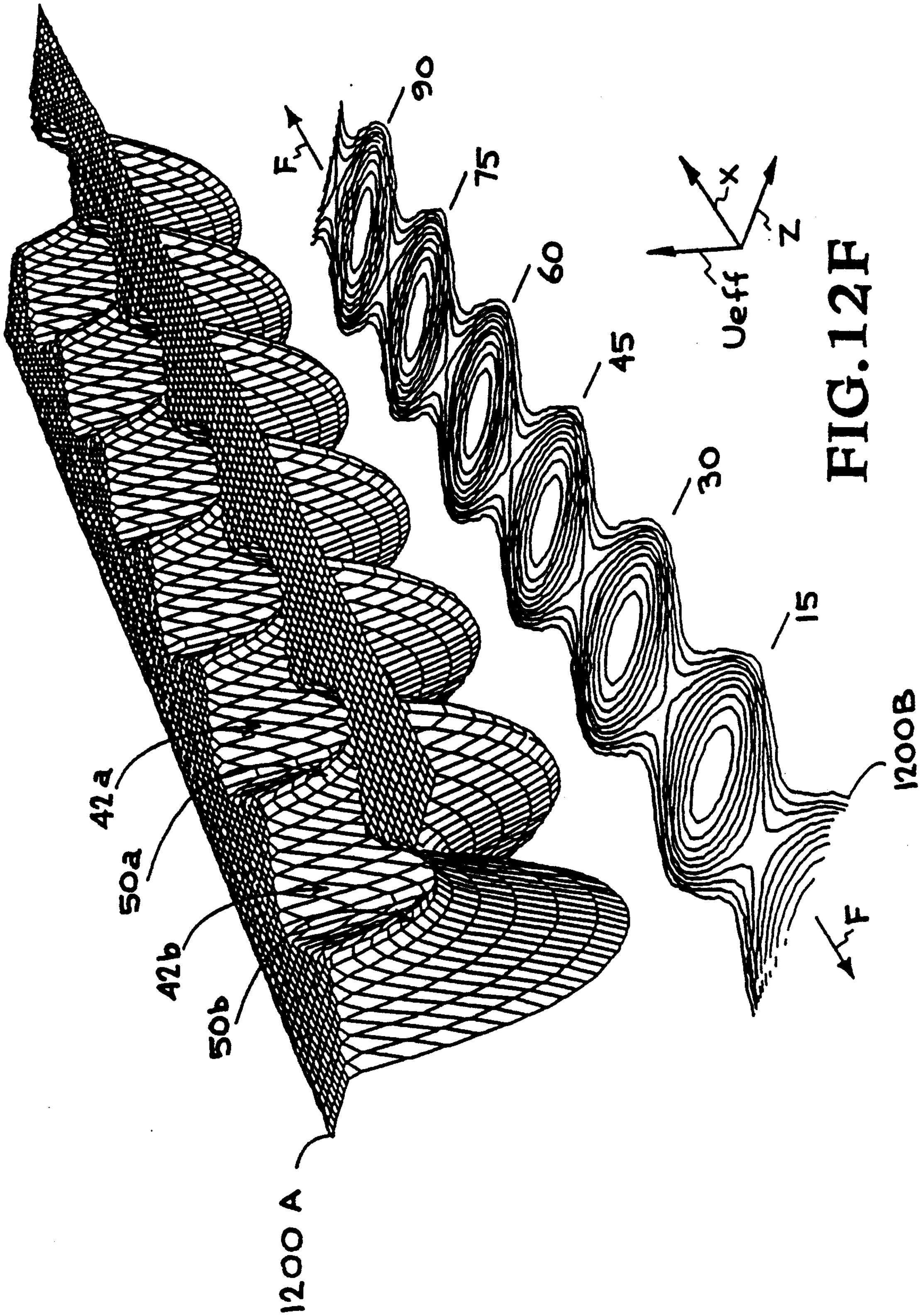
Figure 12G:
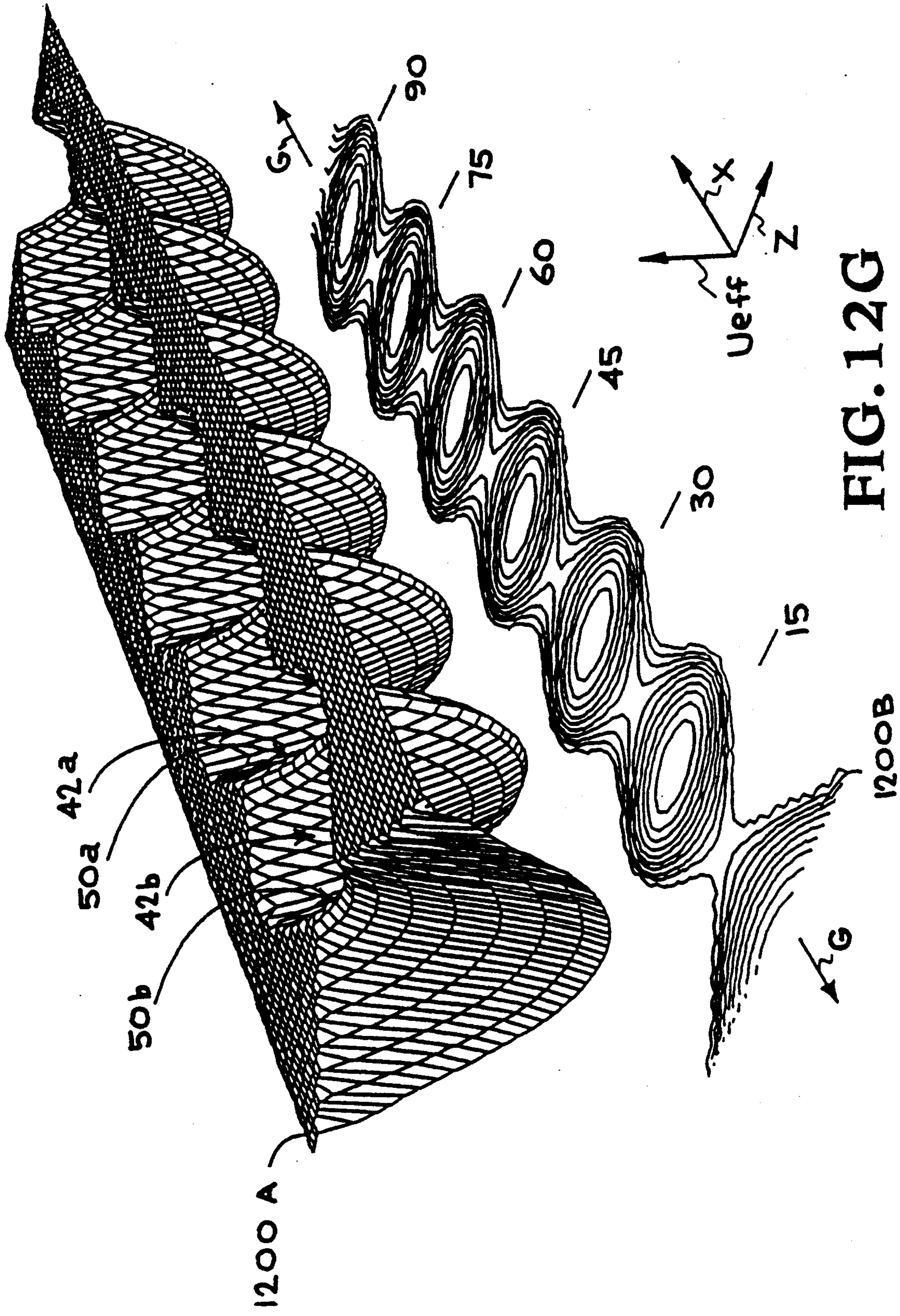
Figure 12H:
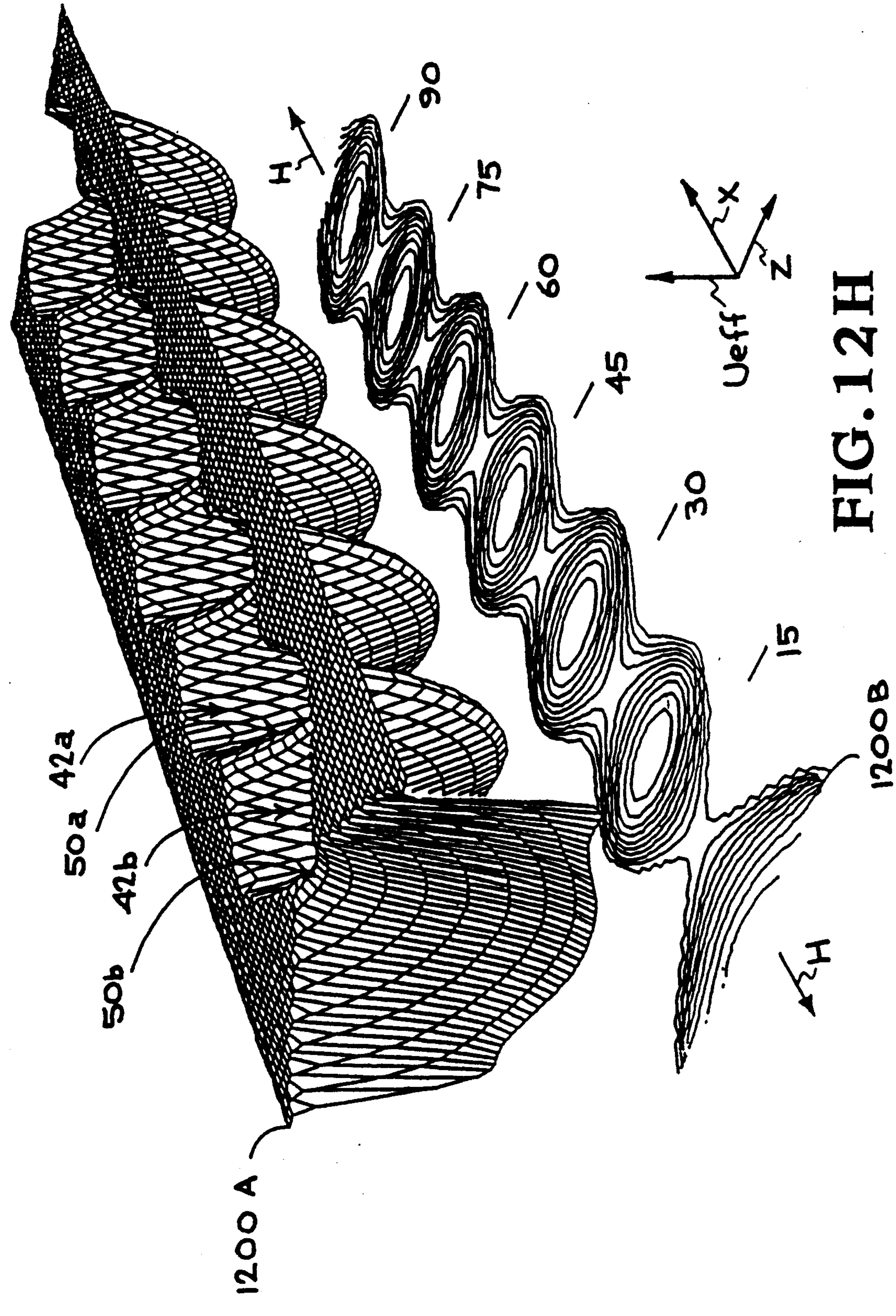
Figure 121:
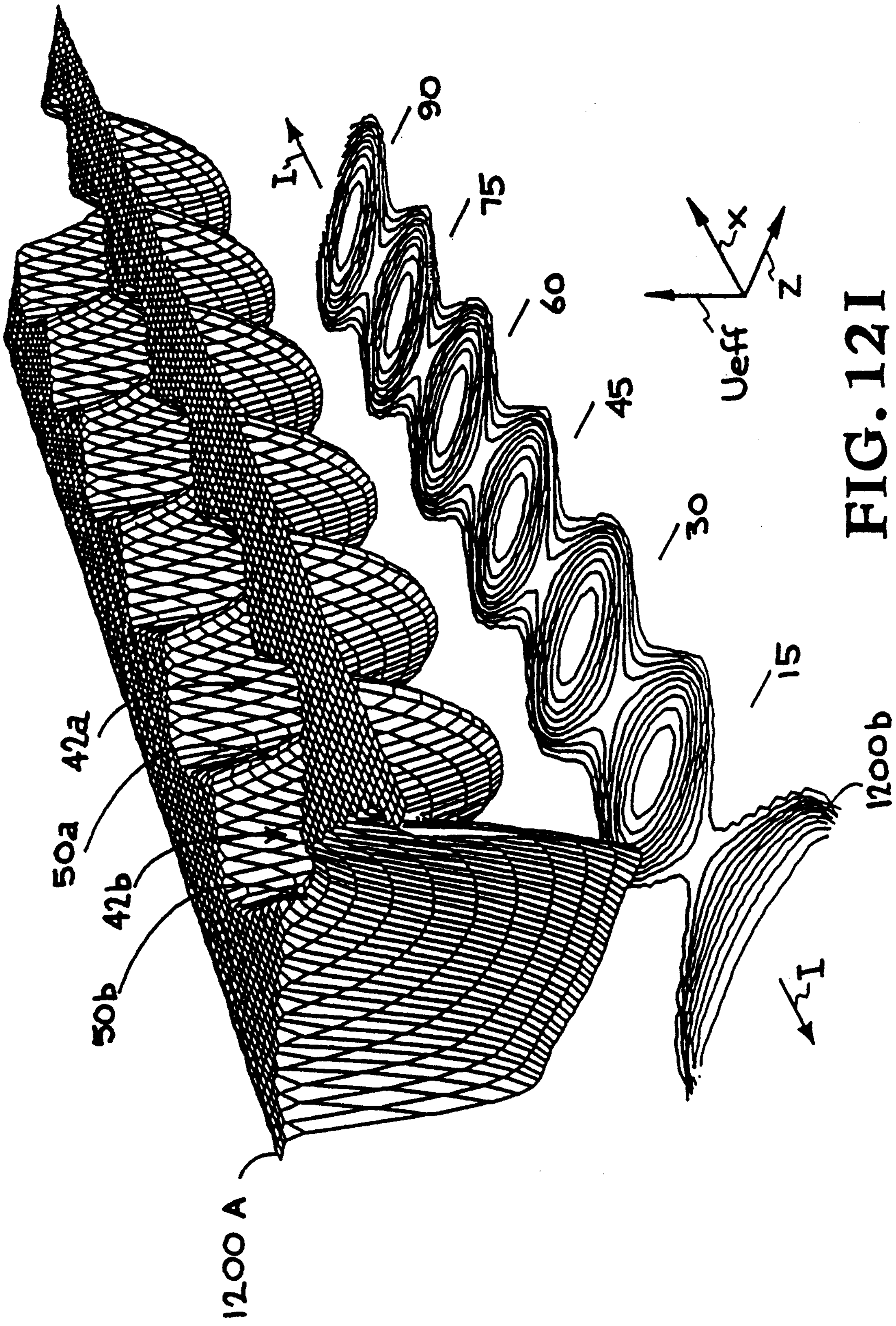
Figure 12J:
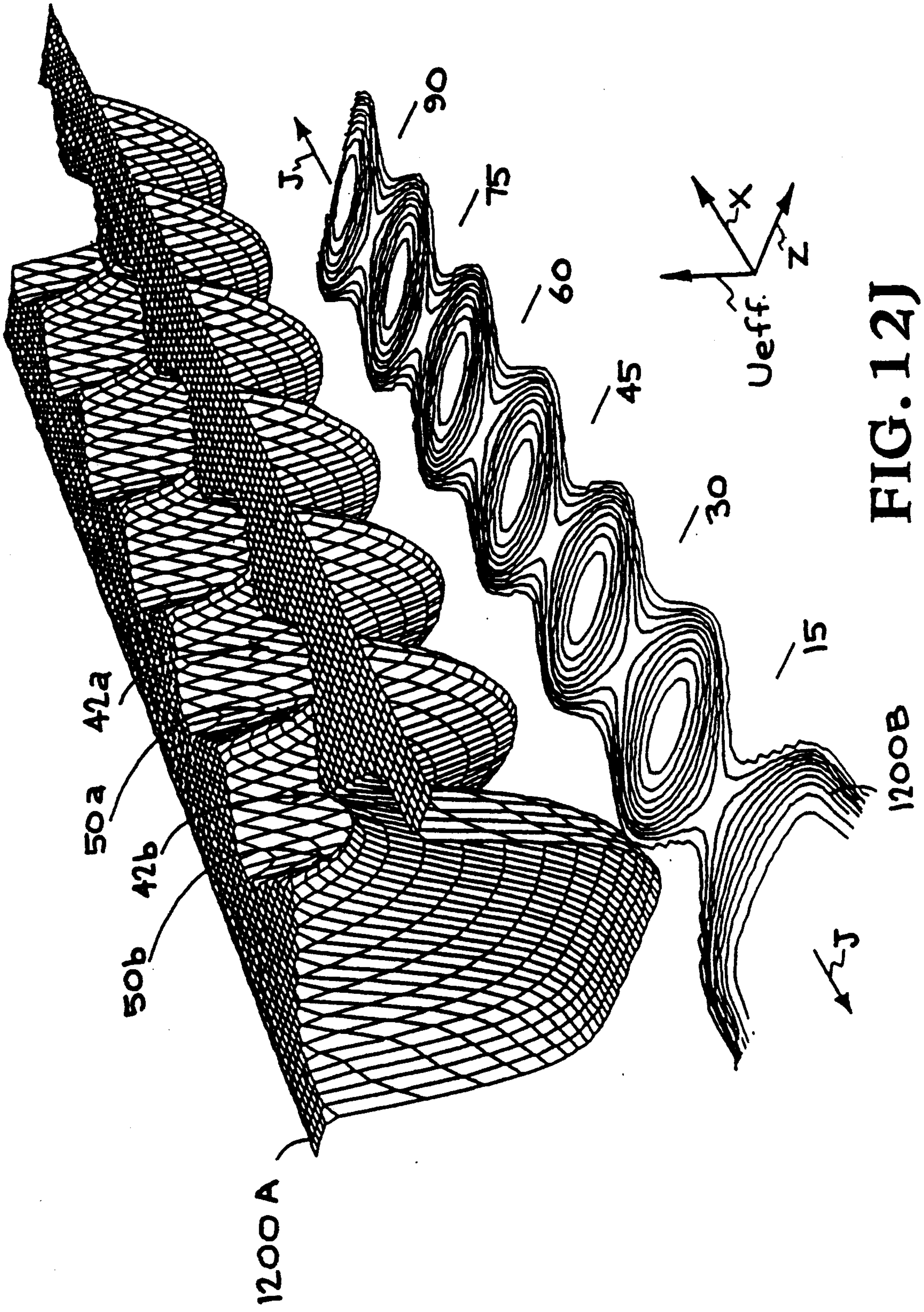
Figure 13A:
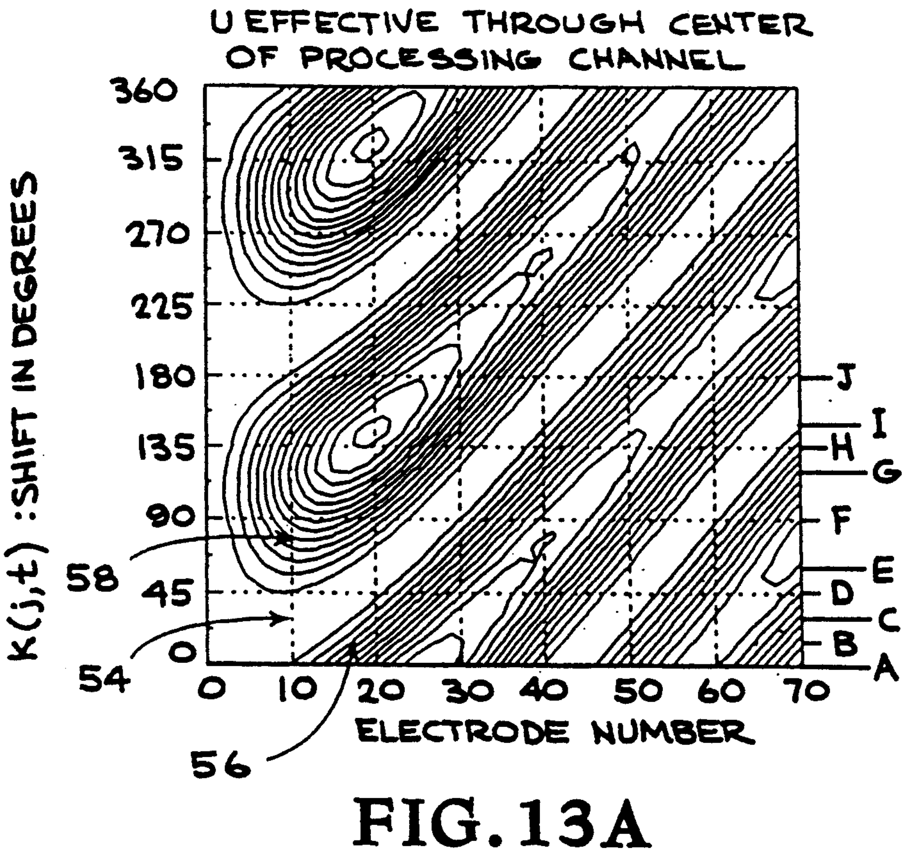
FIG. 13A illustrates a two-dimensional mapping of slices through the series of potential wells shown in FIGS. 12A through 12J, and the parameters characterizing each slice.
Figure 13B:
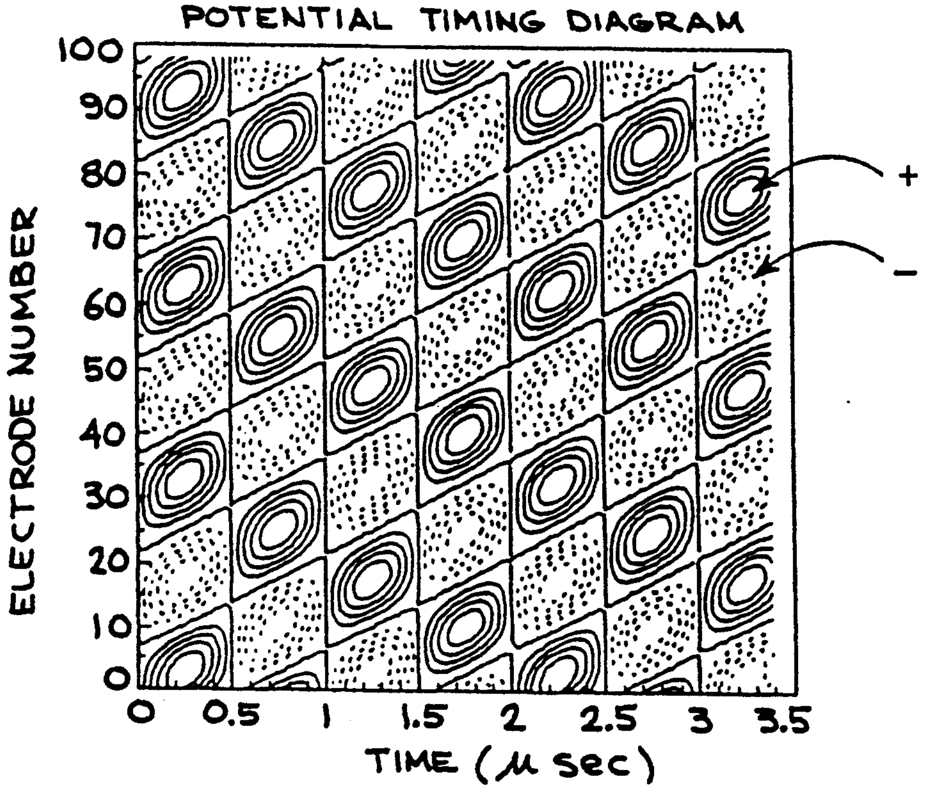
FIGS. 13B and 13C show two-dimensional timing diagrams for translating and stationary potential wells inside an ion processing channel.
Figure 13C:
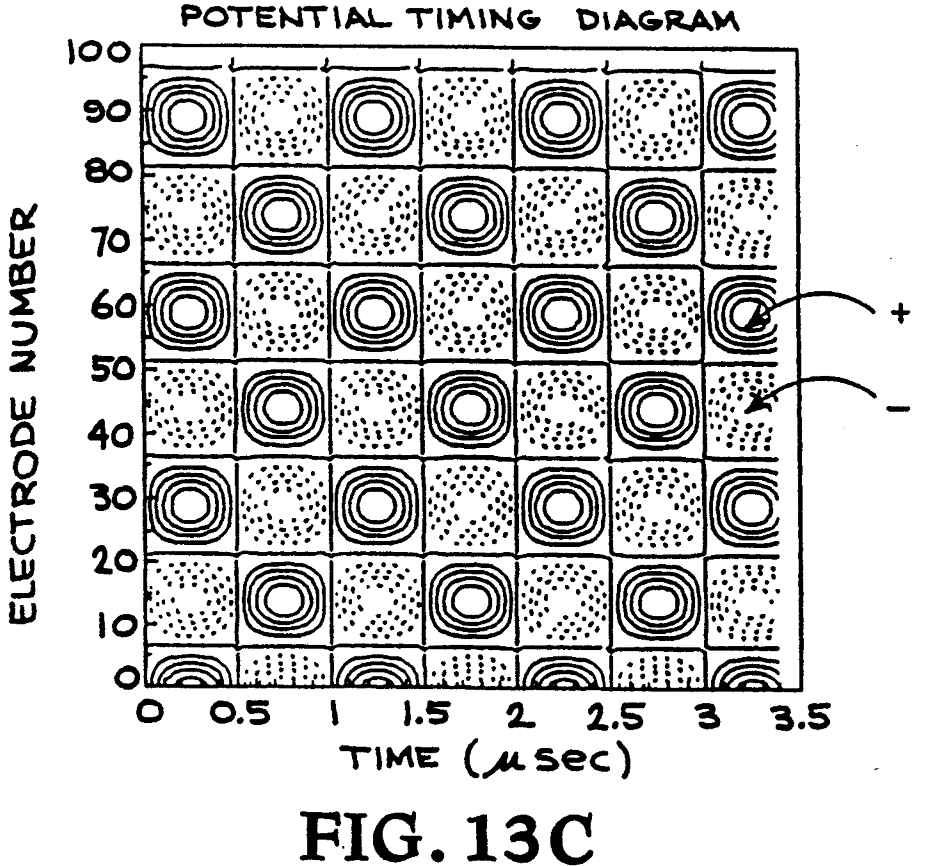

By FIG. 12D, potential well 42*a* has been translated along the x-axis, while a new longitudinal barrier 50*b* has begun to rise near the opening to processing channel 26. By FIG. 12F, the new longitudinal barrier 50*b* has risen so far as to create a new potential well 42*b*. FIG. 12J shows the process having come full circle, such that new potential well 42*b* and longitudinal barrier 50*b* occupy the spatial positions of old potential well 42*a* and longitudinal barrier 50*a* in FIG. 12A. The process simulated in FIGS. 12A through 12J allows a sample of ion particles to be swept into the processing channel 26, and then captured within a nascent potential well by a newly formed longitudinal barrier. The same process may be used at the end of the processing channel, during the acceleration and ejection cycles, to eject an analyzed sample from the array. Translation of the potential well center may be seen in a different manner by examining slices along the axis of the topographic maps of FIGS. 12A through 12J. For example, FIG. 12A has a line AA cut through the center of effective potential map 1200B. Similarly, FIG. 12B has line BB and so on. FIG. 13A summarizes all such slices through the center of the topographical mappings for each value of the shift-control function k(t). The graph's x-axis provides the electrode number along the x-axis of processing channel 26, while the y-axis gives the phase-shift of k(j,t) in degrees. The particular slices for A through J are also noted. The blank areas 54 represent the trapping wells 42, while the areas of dense lines 56 represent steepening of the effective potential (i.e., the longitudinal barriers). As k(j,t) sweeps through the values in time, a horizontal line sweeps upward in the map of FIG. 13A. The line represents a slice down the center of processing channel 26. The changes in effective potential, represented by the shifting line, allow an opening 54 into the channel of processing channel 26 which then closes off from a new longitudinal barrier 58. A timing diagram of applied potentials at each electrode corresponding to these process steps is shown in FIG. 13B. The timing diagram of FIG. 13B shows topographical contours of constant voltage, in 100 volt increments, where solid lines represent positive voltage, and dashed lines represent negative voltage. FIG. 13B illustrates how the applied voltages at each electrode change in time, providing a topographical equivalent to the information given in Equation (11). Thus, one can see that the sequence of applied potentials repeats every 30 electrodes, and that the frequency of the applied RF voltage is a cycle every 1 μsec, or 1 MHz. Also, the pattern of potentials is shifting along the electrode array in time, in FIG. 13B, exactly as the effective potential wells shown in FIGS. 12A through 12J. The rate of the shift k(j,t) can be determined from the drawing as well. FIG. 13B can be compared with the static case shown in FIG. 13C. The timing diagram shown in FIG. 13C summarizes the applied potentials that yield the potential field shown in FIGS. 6 and 7, and the stationary effective potential wells shown in FIG. 4.

The examples of FIGS. 4 and 12 illustrate operations on many local effective potential wells in unison along the entire longitudinal path of a particular processing channel 26. Complex operations were executed by controlling the parameters of Equation (11). No counterpart exists in the prior art for the flexible control of fields and the resulting effective potentials as provided by the present invention. Even more complex operations can be performed upon individual groups of ions. These operations may be superimposed upon the overall translation of groups through the processing channel.

Figure 14A:
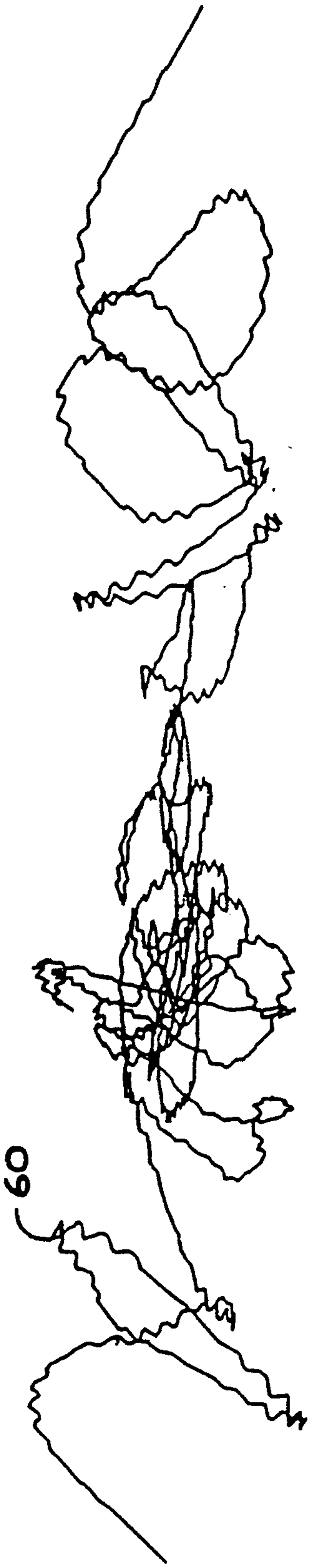
FIG. 14A shows a time-lapsed trajectory of a charged particle trapped within a translating effective potential well, comprising injection and capture, translation, storage, translation and ejection.
Figure 14B:
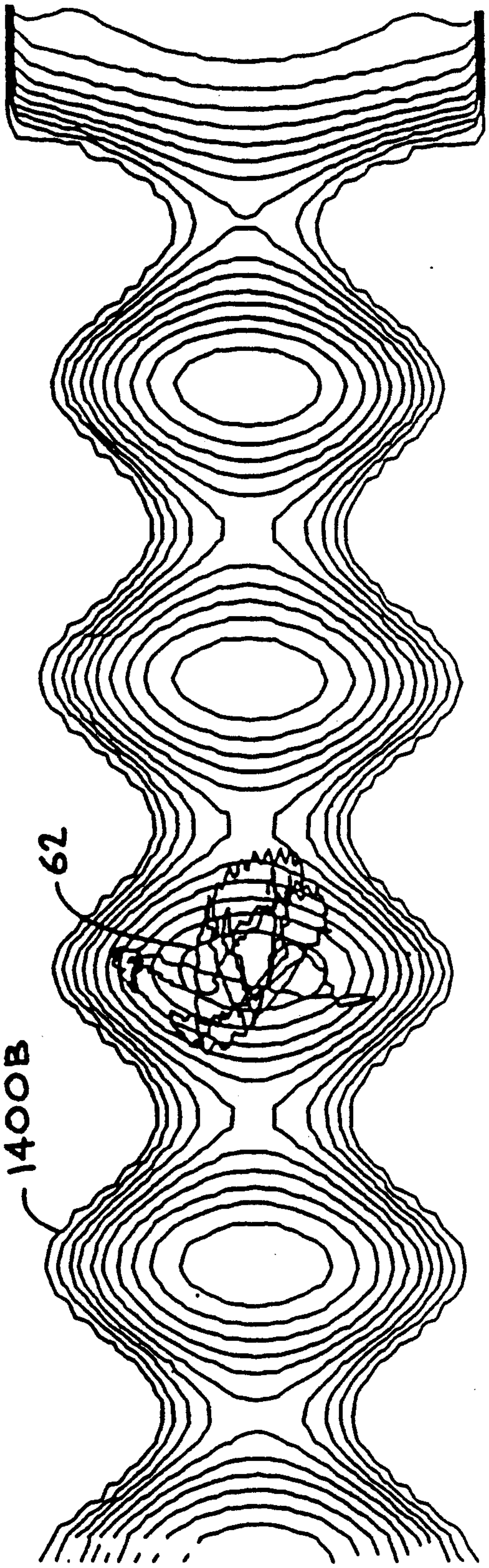
FIG. 14B shows a portion of the trajectory shown in FIG. 14A when the trapping effective potential remains stationary, during the storage phase.

FIGS. 14A and 14B illustrate a combination of the operations of the present invention. FIG. 14A shows a time-lapsed trajectory 60 of a charged particle of Argon+(39.94 AMU) being captured, translated, stored and ejected from a charged particle processing channel. The trapping potentials used to perform these operations are the same as used above in the translation of FIGS. 12A through 12J but where the principle electrode parameters are 360/30/0.25, the maximum applied voltage is 500 volts at an applied RF frequency of 3 MHz. The ion had an initial kinetic energy of 5 eV, with 45° initial orientation to the channel axis. The capture and translation rate of the effective potential wells, $\Delta k(j,t)/\Delta t = 7°/\mu sec$. The overall movement of the particle from left to right, similar to the operations shown in FIG. 12, represents the particle trapped within a particular translating well. The translation was halted for 50 μsec as shown in FIG. 14B to illustrate the relationship between the trajectory 62 of the trapped particle and the effective potential 1400B. The total translation from beginning of the channel to ejection at the end took 180 μsec.

Control over the shape, location and structure of the effective potential barrier, as well as control over applied DC offsets to the electrode array 12, allow emulation of ion trap confinement. Ion trap emulation can cause ion instabilities that select ions by their mass. The present invention does not require a net loss of ions from a particular processing channel undergoing mass selection operations. By preferentially lowering one transverse barrier a mass-selective partitioning between two successive wells can occur, where the ion group splits into two or more groups on the basis of their mass. If the altered trapping potential were the last potential well in the particular channel, the process would yield a mass-selective ejection from the apparatus. Registration of the ejected ions on the single-ion detection device 38 provides accurate accounting of the ion mass spectra in an efficient and rapid manner. The apparatus can be configured thereby as a very-high-volume throughput mass spectrometer. The device has the capability of buffering groups of ions, to accommodate the high-volume ion bursts common in gas chromatography mass spectrometry (GC-MS) applications. The buffering capability of the present invention corresponds to the burst mode operation used in video and computer architectures. The lengthwise buffering of ions groups within each processing channel 26, combined with the replication of processing channels 26 across the face of the present invention, allow a great increase in the ion mass under analysis. The parallel processing and buffering features of the present invention allow the device to overcome the space-charge limitations of conventional mass spectrometer instruments of a similar size.

Ion Cooling

The discussion given above for the trapping, linear translation and mass selection operations of the present invention assumed the presence of a buffer gas to cool ions heated by the action of the confining fields. As discussed above, other methods of cooling trapped ions exist (such as laser cooling). The present invention is distinct from previous energy transfer techniques in that the trapping fields themselves can remove or add energy to the confined ion groups, without any internal perturbation or excitation of the ion, as occurs in collisional damping or laser excitation. In collisional damping (as with a neutral gas), collisions result in electronic, rotational and/or vibrational excitation. Internal excitation can cause structural rearrangement and even molecular fragmentation. Laser cooling requires use of intense laser fields, and can also cause molecular fragmentation from multiphoton absorption. Processes involving Fourier transform techniques, as in FT-ICR spectrometry, and analogous techniques applied to ion trap and quadrupole devices (see, for example, U.S. Pat. No. 4,755,670, issued to Syka et al.), require substantial translational excitation to induce a coherent ion group. The coherent group passes sufficiently close to a conductive surface to induce image currents that can be analyzed. The dissipation of the image current through external resistance relaxes the ions to their initial state, but usually results in no net cooling. Fourier transform detection requires coherent motion of the ions, which in quadrupole or ion trap methods is normally chaotic.

One of the principle characteristics of the present invention, the physical method in which an electrode array generates the RF field, allows novel control over the energy of trapped particles, in addition to their position and trajectory. In general, the prior art often creates RF fields through large conductive electrode elements, having a single conductive surface that runs either parallel to or bounds completely one or more trapping coordinates. The independently controlled electrodes of the present invention allow for greater control over ion energy, position and velocity.

The energy control of the present invention arises from the "pseudo-conservative" properties of the rapidly oscillating (and completely changeable) electromagnetic field which the electrode array provides. As discussed and illustrated above, the electromagnetic fields generated by these electrodes can create one or more trapping wells formed in an effective potential barrier. The complex physical system comprising the electrode array 12, the injected ions and the laboratory frame conserves energy. However, energy partitions itself among various constituents of the system. The operation of the present invention creates several mechanisms for removing energy controllably from trapped ions to the external laboratory, allowing cooling of the ion groups.

Figure 15A:
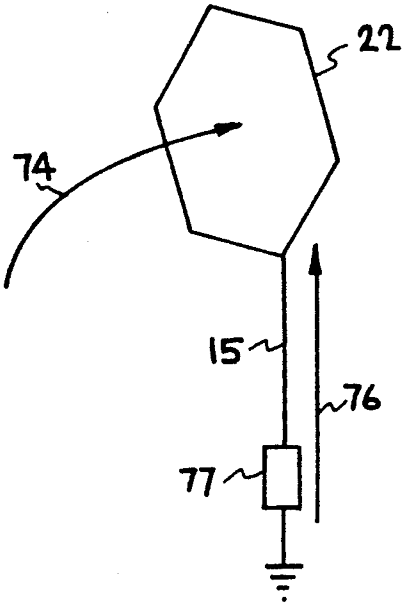
FIGS. 15A through 15E illustrate the creation of induced electrostatic and electrodynamic currents in electrodes by the motion of ions in the present invention and by which ion cooling is controllably achieved.

The cooling mechanisms are best illustrated in a succession of FIGS. 15A through 15E. The present invention involves a complicated interplay between the electrodynamic fields generated by the electrodes 12 (and their associated electronics 14, 16 and 18), the trapped ion groups, and secondary fields generated by the moving ions. The first case to be examined is that of one or more ions trapped in a stationary potential well. FIG. 15A illustrates the action of a single ion 74 and a local electrode ring 22, being the portion of an electrode 12 assigned to one processing channel 26. The schematic system resembles any conductive object connected in some manner to a source of charge (or to ground). As the charged ion 74 approaches the conductive plane 22, image charge 76 is drawn to the local electrode loop 22 to balance (and thereby neutralize) the approaching ion's charge. As the ion recedes, the image charge through its mutual repulsion, retreats to ground again. This electrodynamic flow of charge creates a small but measurable current 76 in the leads 15 to the electrodes. If the voltage of the loop is dropped across a resistance 77 in the leads, this current can dissipate energy in the form of heat. Because the image charge and the approaching ion charge form a connected electrostatic system, the loss of energy of the image charge can dissipate heat from the ion, slowing it down.

Secondary electrodynamic effects can occur as well. The moving trapped ion charge 74 creates a supplemental electromagnetic field, which combines with the field created by the electrodes themselves, to form a resultant field shown as B in FIG. 15B. This field rapidly oscillates, trapping the ion group in an effective potential well, but also causing image charge 76 brought into the local electrode loop 22 by the trapped ion to experience oscillating electromotive forces. These forces can cause circulation 78 of the image charge around the local electrode loop.

While the image current and its circulation can dissipate ion energy in the form of heat, the local nature of the dissipation does not allow these currents to provide much useful information about the trapped charges. A further cooling mechanism can allow experimental access to the induced electrode currents and to information about the trapped ions. FIG. 15C illustrates two neighboring electrode loops *22a* and *22b* experiencing the resultant induced magnetic field B produced by the electrode array and ion motion. FIG. 15C also shows the resulting electrostatically and electrodynamically ion-induced currents. The two loops *22a* and *22b* are connected in the external laboratory by a resistive load 82, which can also be an ammeter or similar electrical device. In general, both the ion motion and the electromagnetic fields have components perpendicular to the x-axis of processing channel 26 (i.e. in the in the y-z plane). These components can generate an electromotive force around the loop comprising the local electrode loops 22, the leads to these loops 15, and resistive load 82. The induced electromotive force thereby can cause circulation current 80 to flow around the loop comprising the electrical leads, and through device 82, allowing both resistive damping of ion energy and measurements of the induced damping. Each ion species reacts in different ways to the trapping field, and induce different current signatures that can allow ion mass typing of the trapped ion groups.

Figure 15B:
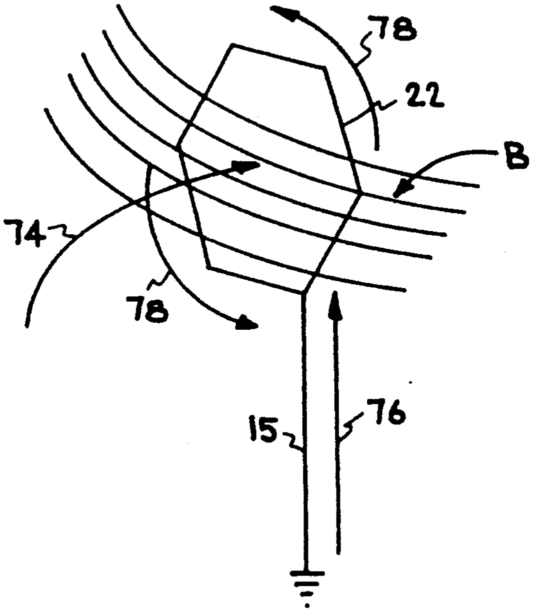
Figure 15C:
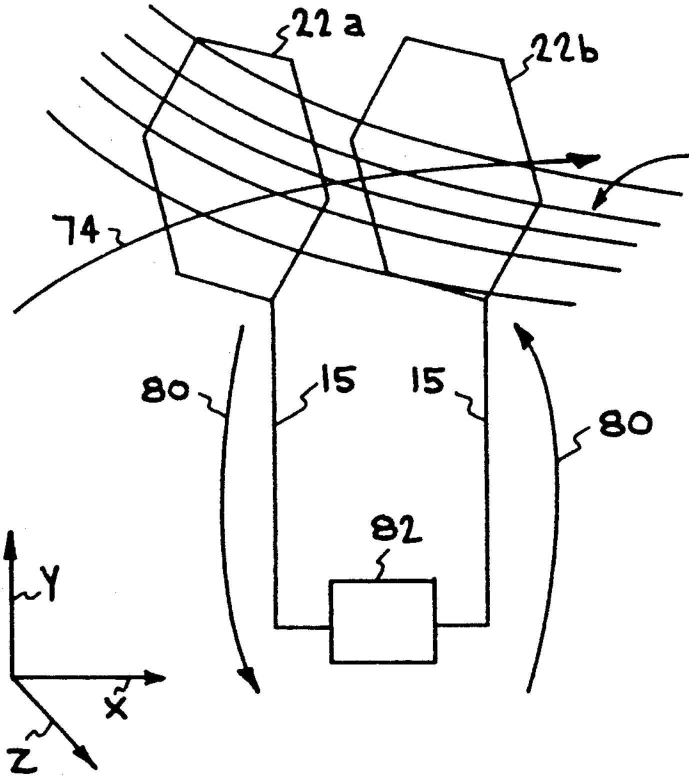
Figure 15D:
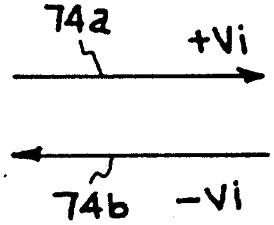

Both the electrostatic image current 76 and the electrodynamic circulation currents 78 and 80 shown in FIGS. 15B and 15C can cool the trapped ion charge 74. The resulting cooling occurs for a single ion because the ion forms a naturally coherent charge bundle (comprising only one charge), and the cooling is analogous to the action of FT-ICR techniques described above. However, the efficiency of such cooling decreases as the number of trapped ions goes up. As the number of ions becomes large, there no longer is a preferred direction for overall ion motion. The statistical movements of large numbers of trapped ions results in a mutual cancellation of the electrostatically and electrodynamically ion-induced currents. FIG. 15D shows equal and opposite ion velocities $\vec{v}_i$ (*74a*, *74b*). Such a degeneracy in the externally measurable individual ion-induced currents greatly reduces the efficiency of the cooling mechanisms.

Figure 15E:
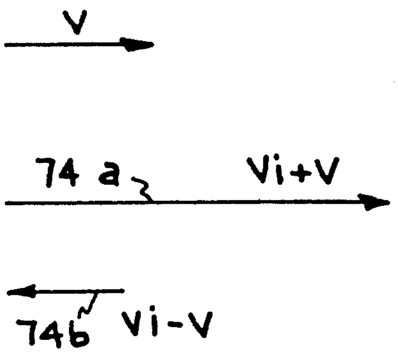

The present invention, however, provides techniques for translating ion groups along each processing channel 26. The net velocity $\vec{v}$ applied to each ion splits the degeneracy of ion motion as seen by the stationary electrodes. As illustrated in FIG. 15E, ions within a trapped group (centered about a "trapping center") moving with the overall translational motion *74a* exhibit an increased velocity $\vec{v}_i+\vec{v}$ relative to the electrode loops 22. Ions moving against the translational drift of the group *74b* exhibit a decreased velocity $\vec{v}_i-\vec{v}$ relative to the electrode loops 22. The resulting velocity can induce the electrodynamic image current 76 and the subsequent current circulations 78 and 80 in order to cool the trapped ions. Hence, the second case, comprising a trapped ion charge group being translated along a processing channel, allows for cooling of larger groups of ions.

Figure 16A:
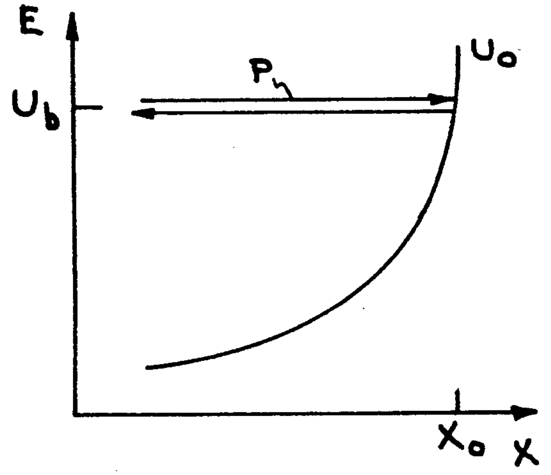
FIGS. 16A through 16D illustrate schematic diagrams of the interaction of a moving ion and an effective potential barrier, showing the difference between pointwise constant vs. pointwise differential barrier motion.

The present invention provides a third, and more deliberate, scenario for cooling groups of trapped ions. Motions of the effective potential barrier walls can impart and remove energy from ions trapped within them. FIG. 16A represents a one-dimensional effective potential barrier where the x-direction represents a single spatial dimension (for an actual device, there would be three dimensions) and the vertical axis represents the energy or $U_b$ of the effective potential barrier at each point x. A charged particle colliding with the barrier $U_0$ is stopped at that point $x_0$ where its total energy is equal to the potential energy of the barrier, $U_b(x_0)$.

In the case of a static effective potential barrier, as shown in FIG. 16A, and as characteristic of conventional RF quadrupole trapping devices, the shape of the field and the maximum RF amplitude remains constant. Referring to Equation (11), the potentials p(j,t) applied to each electrode are held constant. FIG. 16A starts with a system where a bound ion travels from the center of the potential well $U_0$ toward a confining wall. Since the wall does not move with respect to the electrodes, the total energy of ion/field system is conserved. To say it another way, the particle's motion is stopped and reversed at that point $x_0$ where the effective potential $U_b$ is equal to the particle's own energy. After collision, the particle's direction is reversed and upon colliding with an opposing wall remains confined.

Figure 16B:
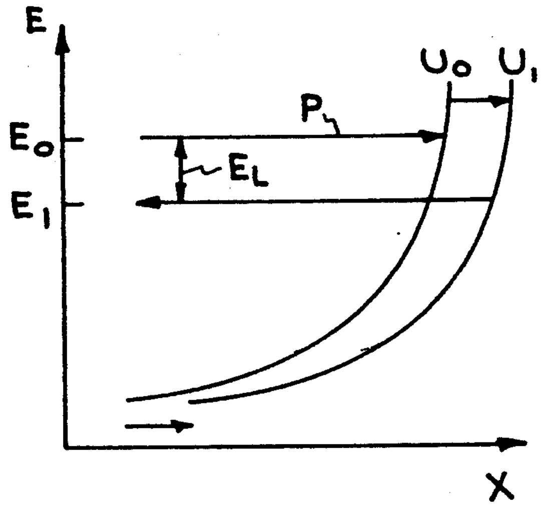

As discussed, the present invention, however, allows the potential barrier to move together in a locally connected fashion, or "piecewise", with respect to the local electrode. This motion is diagrammed in FIG. 16B, where the barrier $U_0(x)$ shifts parallel to itself along the x-axis to form barrier $U_1(x)U_1$. This motion of the barrier is one consequence of allowing the potential amplitudes applied to each electrode, p(j,t), to vary relative to one another in time. With point-wise movement, the field can possess linear momentum so that, during interaction and turn-around, the particle loses energy $E_L$ equal to the kinetic energy transferred by the field. FIG. 16B shows qualitatively the loss in energy from the approaching particle and the receding particle, as a drop from energy level $E_0$ to $E_1$. The rest of the energy has been absorbed by the traveling barrier. If the interaction is reversible, then closing the barrier back from $U_1(x)$ to $U_0(x)$ would impart kinetic energy to the ion and return the ion energy to its initial level $E_0$. The expansion and contraction of the fields in a reversible way would provide an adiabatic expansion and contraction of the confining potential well. The movement of a longitudinal barrier wall, while keeping the trapping center stationary, is similar to the second cooling scenario described above, where the entire ion group moved relative to the electrodes. In both, the cooling effects are made possible by dropping the induced currents in the electrodes across a resistance. It is the ability of the present invention to add resistances to the induced current flows that allows the present invention to create a controllably non-conservative trapping field. In such a controllably non-conservative field, trapped ions can be made to lose or gain energy as desired.

The interaction of the field's linear momenta and the particle's linear momenta can also be irreversible, where a continuous linear acceleration of the field during collision does work on the particle, adding additional kinetic energy into the system. After an irreversible process, the kinetic energy of the particle would always be higher when the barrier returned to its initial location. Thus, using only linear momentum attributes of the potential field, the particle's thermal energy increases with completion of each expansion and contraction cycle. Therefore, a collision between a particle and the potential well confining barrier that conserves total energy does not provide a mechanism for removing energy from the particle while confining it to a particular volume in space.

Figure 16C:
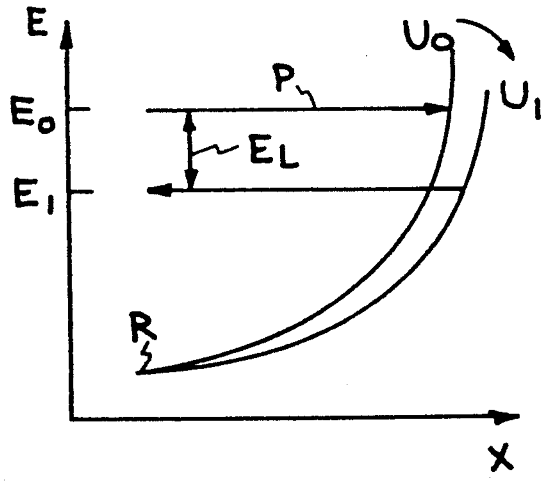
Figure 16D:
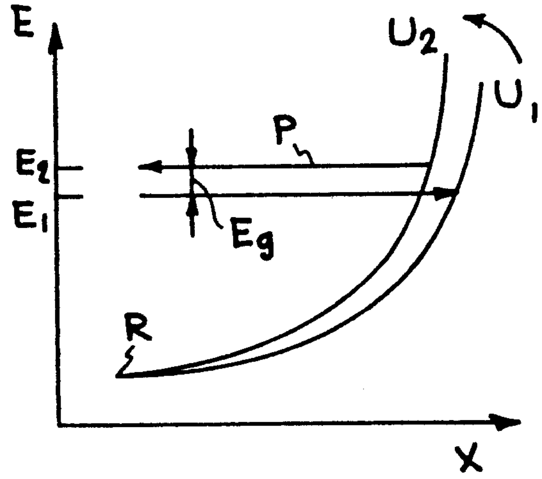

FIGS. 16C and 16D show the effects of allowing the potential barrier to move in incrementally and discontinuously. In FIG. 16C, the points defining the local potential barrier move around the point R as effective potential well center. As shown, the particle enters the collision with an energy $E_0$ and leaves the collision with a lower energy $E_1$. Differential motion of the effective potential barrier furnishes a method whereby the confining fields alone can cool and confine a trapped particle. This cooling ability is shown in FIG. 16D. Certain changes of the effective potential barrier can make the relative velocity of the barrier at a higher energy (for example, $E_0$) greater than that at a lower energy ($E_1$). Therefore, the energy transfer would be greater for particle collisions at higher energy than at lower energy.

If the barrier is restored to its former location, creating the same confinement space as before the collision in FIG. 16C, particle collides with the barrier at its lower energy $E_1$. As the barrier moves back from $U_1(x)$ to $U_2(x)$ the amount of energy conferred to the particle $E_G$ is considerably less than the energy that the particle originally lost. The particle now possesses an energy $E_2$ less than $E_0$, its original energy. The return of the barrier should (and, with the present invention, can) be accomplished sufficiently quickly that the trapped ions cannot recover their original energy. The differential motions described by FIGS. 16C and 16D produce a particle that has less energy but is confined to the same spatial volume. Providing energy non-conserving collisions with a potential well barrier, for example through use of a resistive element as illustrated in FIGS. 15A, 15B and 15C, allows removal of translational energy from the particle. The present invention, through its complete control over the effective potential shape, provides for field cooling of trapped particles. Again, the important transfer is between the ion/IPU system and the outside world. Providing resistance across the flow of currents induced by the motions of trapped ions provides a critical method of the present invention to controllably transfer energy to or from ions within the apparatus.

Figure 17A:
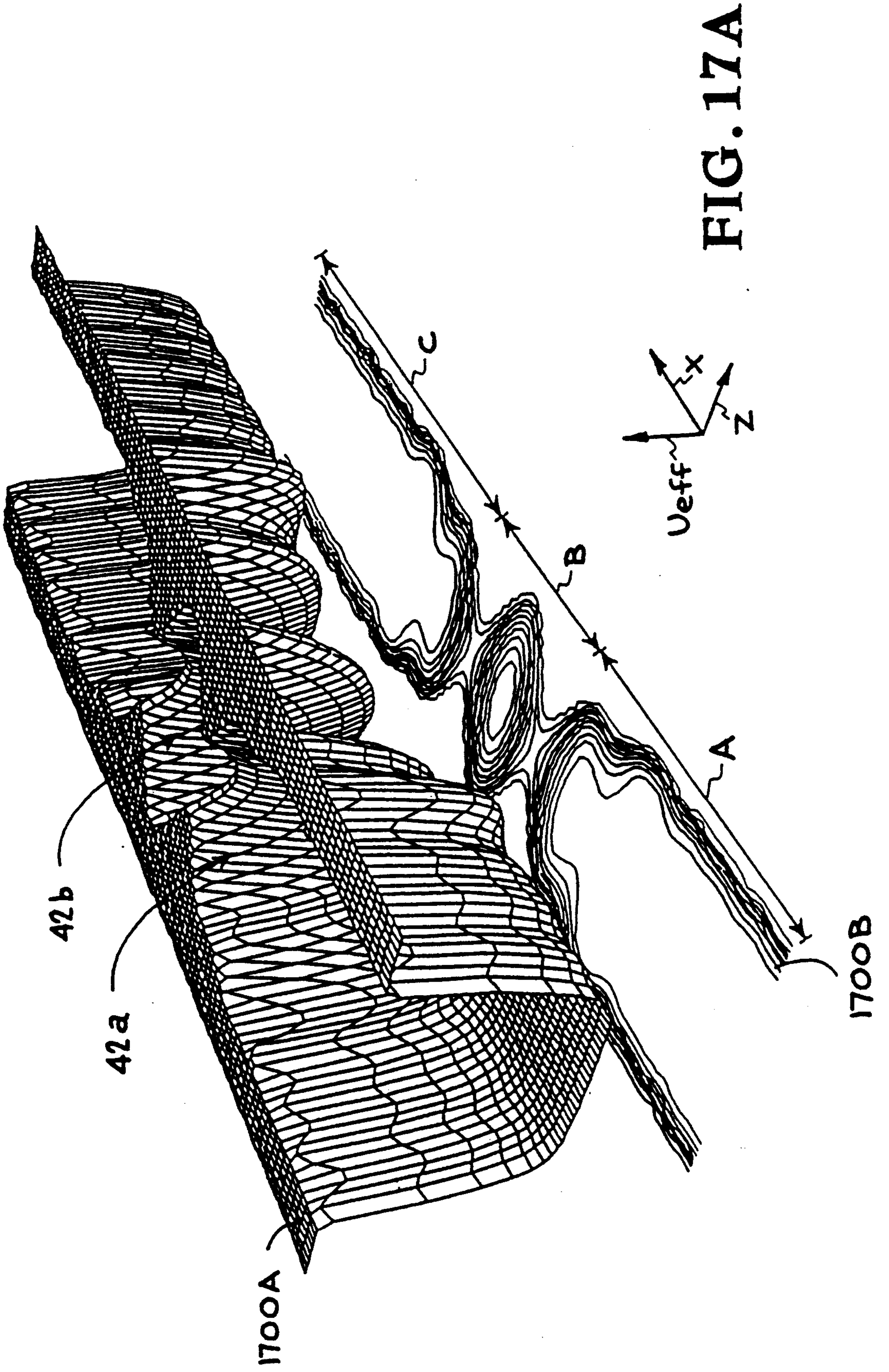
FIGS. 17A through 17D show three-dimensional plots of an ion transfer mechanism employing a moving potential well between stationary trapping chambers inside an ion processing channel, illustrating the operations of merging, splitting, directional ion transfer and mass-selective directional ion transfer.
Figure 17B:
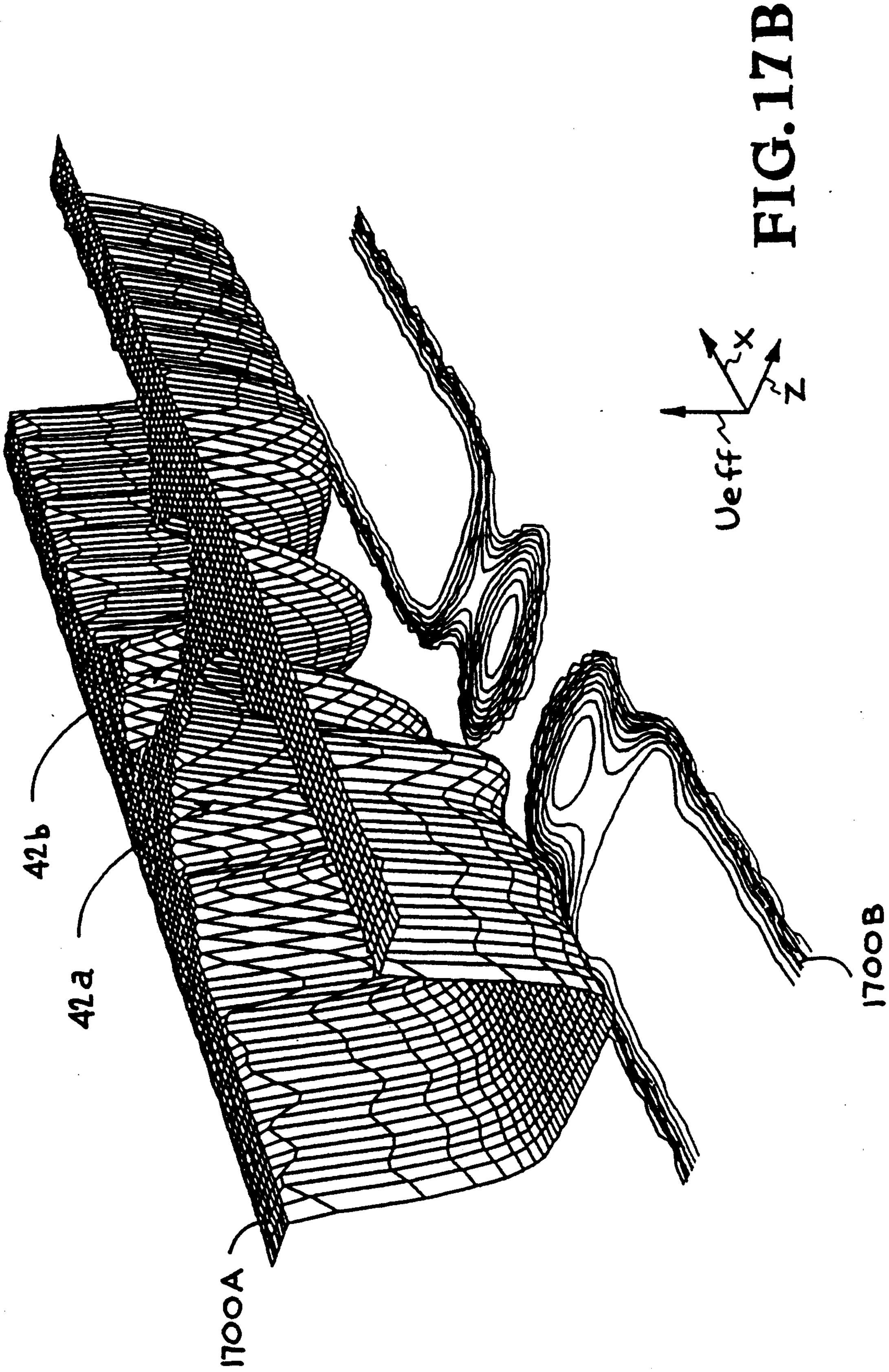
Figure 17C:
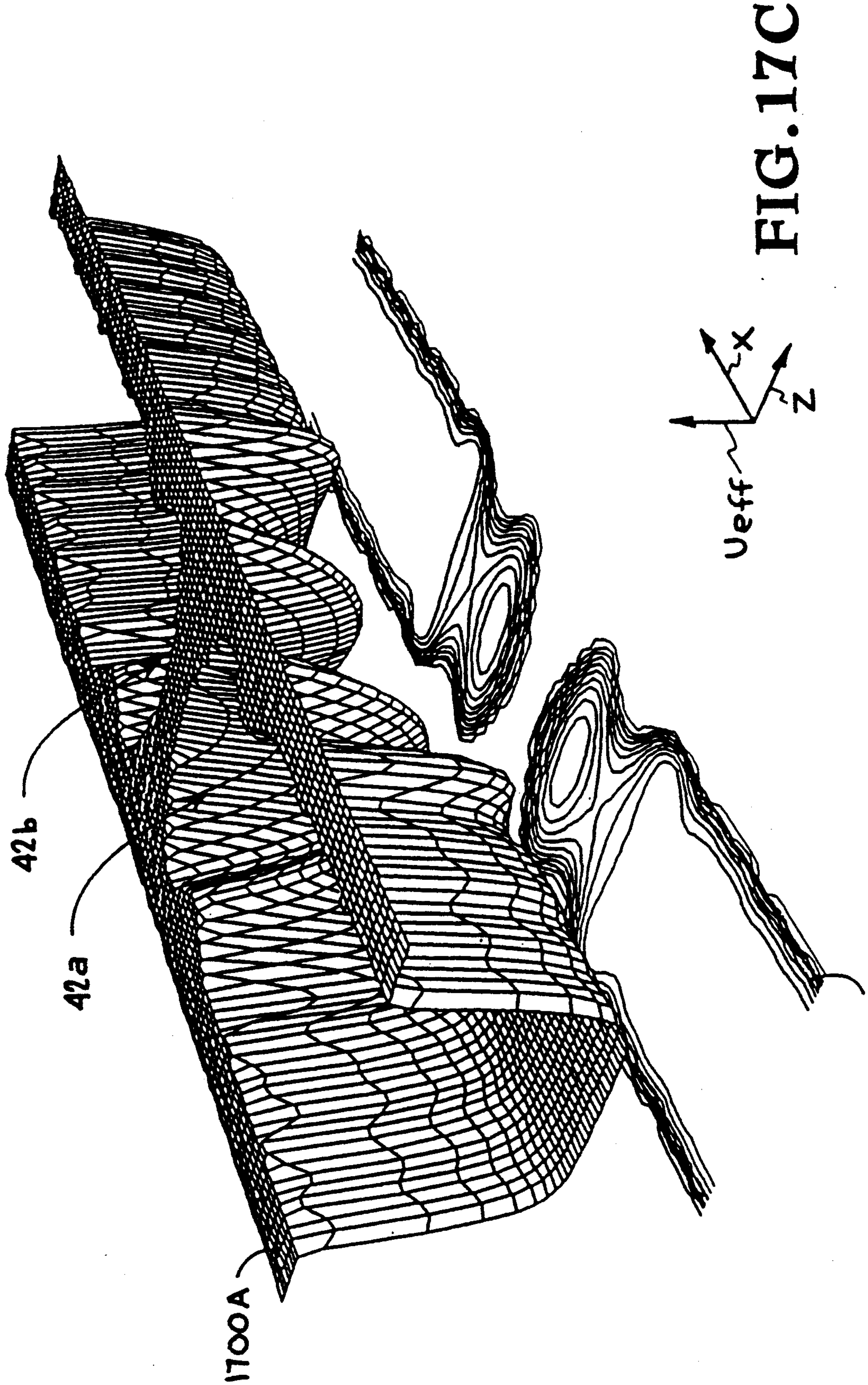
Figure 17D:
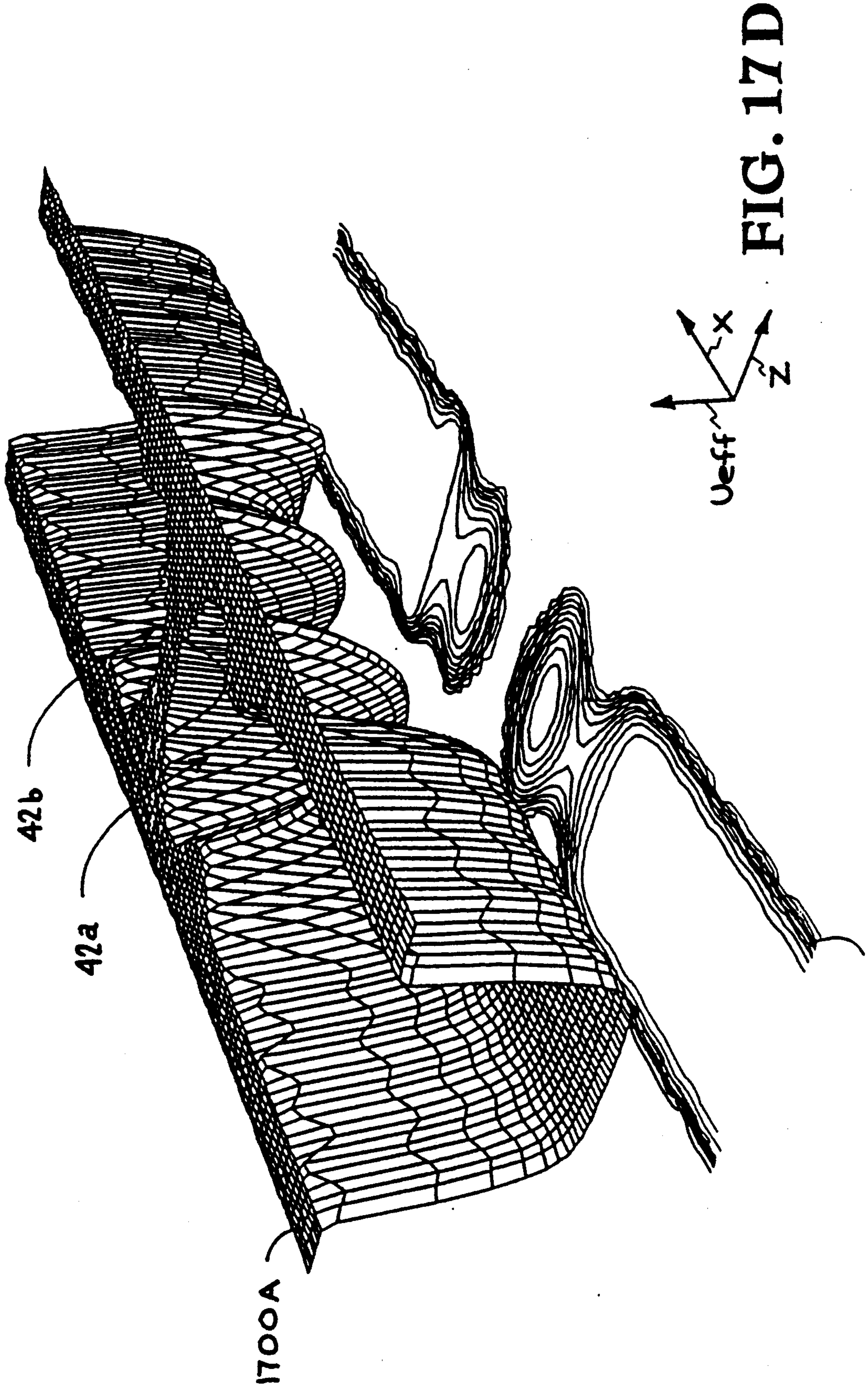

The preceding examples and analysis show how the present invention can control barrier heights, translation, injection, ejection, cooling and heating, by employing an equation (Equation (11)) of completely general form. Piecewise or barrier displacements can be combined to create multiple effects. As a simple example, the translation of a sequence of wells 42A, 42B, etc. along a longitudinal path through a processing channel 26, as shown in FIG. 17A, may be combined with selective cooling of a particular packet of ions within one effective potential well. Any number of superpositions of fields can be achieved. An example might be superimposing a longitudinal barrier 50 with a potential well 42, allowing ions to transfer out of a localized group.

Other Ion Processing Operations

Combinations of successive potential maps can provide the confinement and cooling effects described above, and also furnish other "building blocks" for basic ion processing. Altering the applied potentials to each electrode in precise ways can alter the basic confining potential well. As shown above, the potential well can be translated in space, either along the processing channel longitudinal x-axis or transverse to the x-axis, or in some combined direction. Thus, particles trapped within the well can be relocated in a controlled manner within the processing channel.

Figure 19:
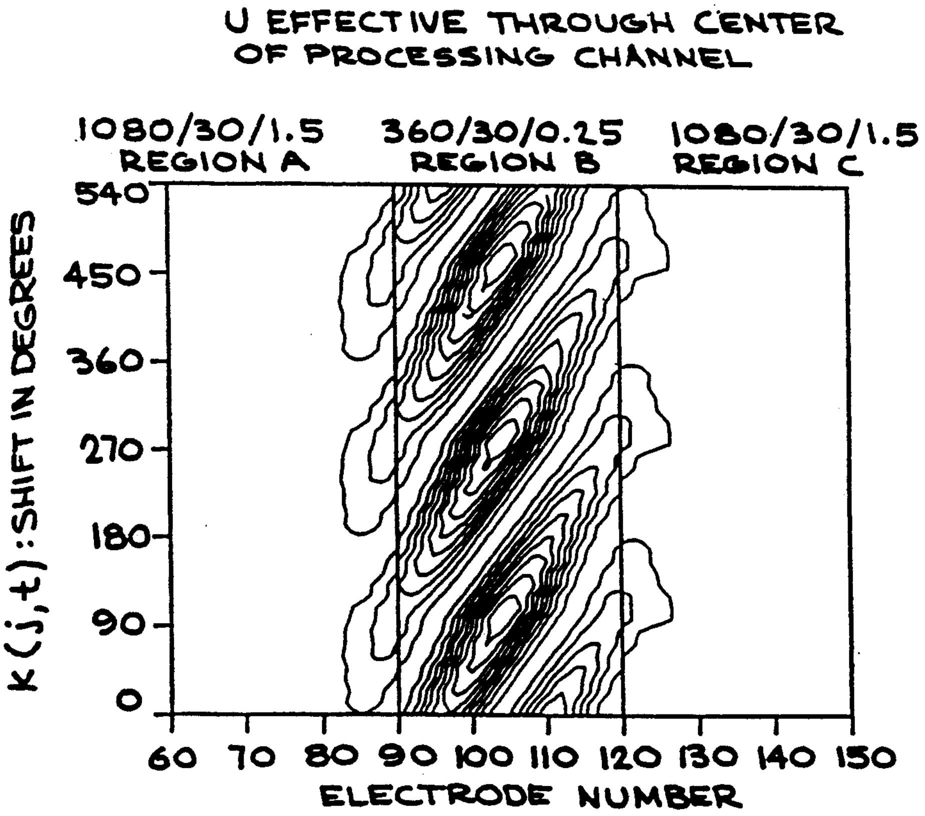
FIG. 19 shows a two-dimensional mapping of slices through the series of potential wells shown in FIGS. 17A through 17D, and the parameters corresponding to each slice.

In addition, a single well can be made to split into multiple wells. This allows a single group of ions to be split into several groups. FIGS. 17A through 17D show the result of varying parameters to gradually split well **42*a* from a larger effective potential well (or chamber) A and transfer the split well 42*a* to another larger chamber C. FIGS. 18A through 18I summarize the two-dimensional topographical mappings of the effective potentials and reveal the controlled transfer of an effective potential well 42*a* (and any ions trapped within) along a line of transfer 85 between one larger chamber and another. FIG. 19 summarizes the time-varying parameters used to construct the illustrated effective potentials. As discussed above, the two large chambers, section A of the ion processing channel (comprising electrodes 1 through 90) and section C (comprising electrodes 120 through 200), employ the parameters 1080/30/1.5 (a 1080° cycle for every 30 consecutive electrodes with a slope s(j,t)=1.5). The central B region, where the transfer potential well 42*a* is created and translated, employs parameters 360/30/0.25. The shift function k(j,t) changes to effect the transfer as indicated in FIG. 19**.

Figure 18:
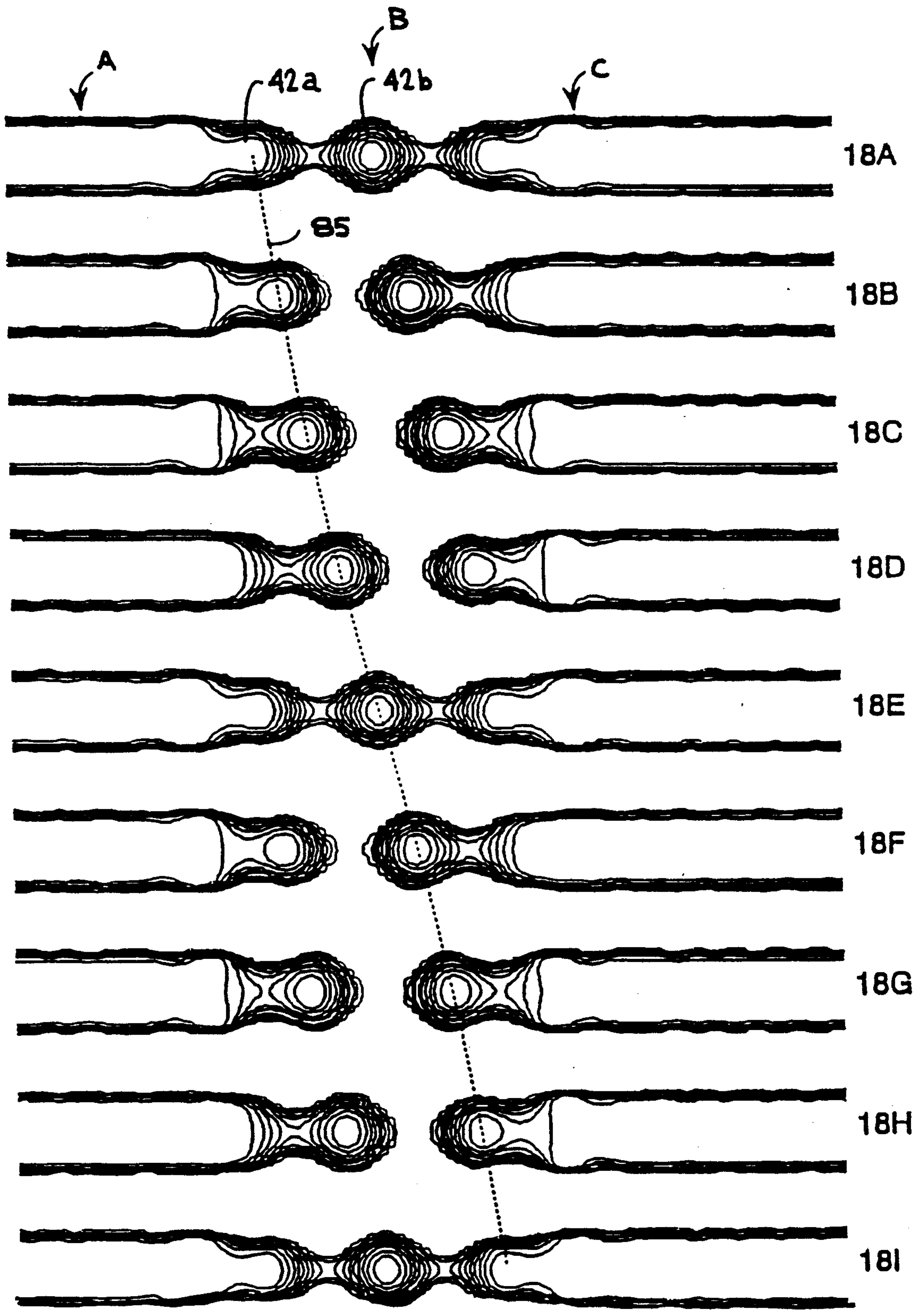
FIGS. 18A through 18I shows a series of topographical mappings, illustrating a complete transfer cycle, as excerpted in FIGS. 17A through 17D.

Because the processes described in FIGS. 17 through 19 can be reversed in time, the same parameters can be used to cause multiple independent wells to coalesce into a combined new effective potential well. In fact, the merging of a transfer effective potential well **42*b* with the second large chamber area C (which of course itself comprises an effective potential well) is shown in FIGS. 17 and 18. Both the merging and separation shown in FIGS. 17 through 19** represent only one possibility for similar operations of the present invention.

The ability to create both stationary and translating potential wells within each processing channel allows relatively large densities of ions to be stored in a relatively small space. The apparatus is well-suited for storing antimatter. As antimatter is produced, groups of positronium or other charged antimatter can be introduced into each processing channel 26 and held confined to an individual effective potential well. These wells can be translated as was shown in FIGS. 12A through 12J. Large amounts of antimatter could thereby be "clocked" in just as a electronic buffer clocks in a digital signal. The adaptive fields of the present invention allow long-term storage of the antimatter in a kind of electrode sponge. If the antimatter were used for space propulsion, the ion processing unit 10, filled with antimatter, could be stored as a fuel tank. When needed, antimatter could be released from each processing channel and guided to an annihilation chamber for craft propulsion. This example presents just one use of the present invention for the handling of different forms of matter.

Mass Analysis

As discussed above, a single trapping well can emulate a conventional ion trap by applying graduated potentials as described in the Arnold patent. Thus, mass selection can be accomplished at any point along the longitudinal path of the electrode array 12. Conventional periodic potentials could therefore selectively destabilize certain ions. By appropriately shifting the applied potentials along the electrode array, the processing of a particular packet of ions could proceed with a general translation of the trapping potential along the processing channel path.

An additional method for analyzing different ion species within the processing channel takes advantage of the fact that energy absorbed or given off by an ion during a heating or cooling process must enter or exit the system through the electrodynamic field. The change in the field due to energy exchange with trapped ions induces an electric current in the nearby electrodes. This induced current increases the current required to drive the electrode array in the absence of any ions. The induced current carries implicit information on the number, mass and structure of ions exchanging energy with the field. Because heating and cooling of ions occurs during normal ion processing within the array, induced current information can be extracted continually.

Figure 20:
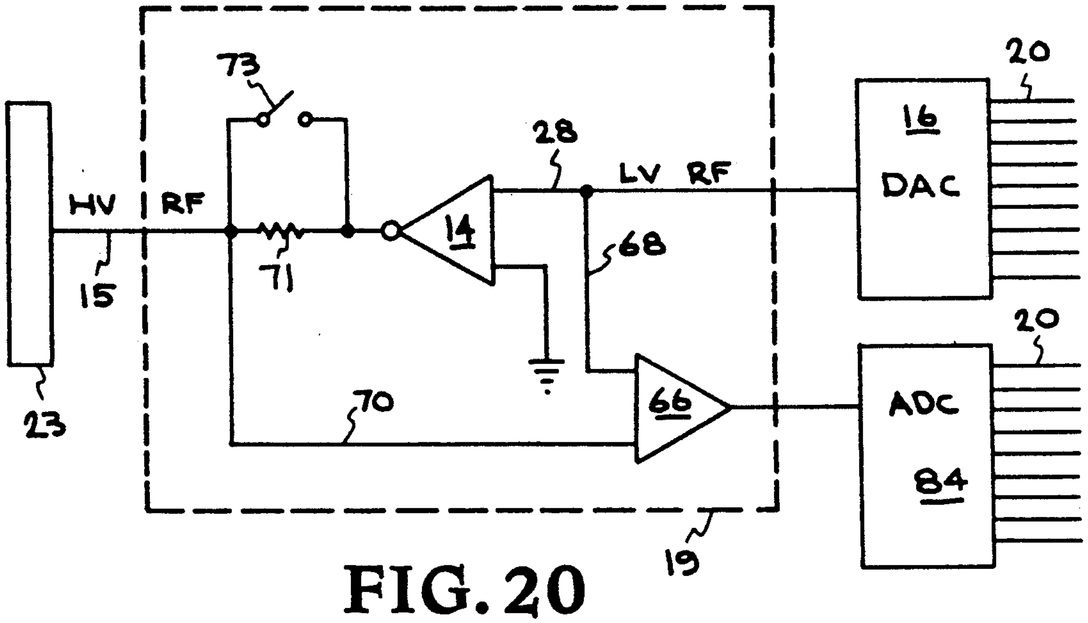
FIG. 20 illustrates an electrical circuit that may be used for driving an electrode and for measuring induced currents in the electrode, in accordance with the invention.

FIG. 20 presents additional circuitry for extracting induced current information from the electrode array. Electrical module 19 represents the driving and measuring circuitry for the electrodes, while digital-to-analog (DAC) 16 and analog-to-digital (ADC) 84 converters provide and carry away appropriate signals. Bus lines 20 provide digital signals to DAC 16. DAC 16 drives the operational amplifier 14 through low voltage RF line 28. The high voltage output signal from the op amp 14 drives a corresponding electrode by sending a potential voltage over a high-voltage RF line 15 to an electrode frame 23. A switch 73 allows induced current to be sent through resistor 71, dissipating energy and increasing the cooling efficiency of the invention, or, alternatively, through a resistanceless line, both attached to the output terminal of the operational amplifier 14. A differential amplifier 66 samples the low-voltage and high-voltage RF lines through a first line 68 connected between the input terminal of the operational amplifier 14 and a first input terminal of the amplifier 66 and a second line 70 connected between the output terminal of the operational amplifier 14 and a second input terminal of the amplifier 66. This produces an output signal from the amplifier 66 that characterizes the current induced in the electrode, which signal can be converted by an analog-to-digital converter 84. Typically, each ion species induces different characteristic frequencies in the electrode array. A Fourier transform of the induced current frequencies can provide a spectrum for cataloging trapped ions, using a method analogous to ICR techniques. See for example the methods discussed in *Gaseous Ion Chemistry and Mass Spectrometry*, Ed. J. H. Futrell, John Wiley & Sons, New York, 1986, and the references therein. Induced current methods would often be superior to ion trap emulation, because no loss of ions would be required and the process would therefore be non-destructive.

Parallel Mass Spectrometry

The present invention provides methods of mass control and analysis that can be massively parallel, similar to the operation of massively parallel computer architectures. Mass spectrographs in themselves provide a type of simple parallelism, in that all masses are collected at once. The calulatrons used during World War II for the separation of uranium isotopes also exploited a simple parallelism, whereby many mass spectrographic channels operated side-by-side to enhance the extraction process.

In addition, the Paul et al. U.S. Pat. No. 2,939,952 illustrates in FIG. 10 another method of simple parallelism for mass spectrometry, using an array of rods defining a plurality of parallel channels. Similar devices have been constructed, including four-fold monopoles, but driving such large capacitive devices with a single RF source greatly increases power demands, and they are not widely used. In addition, this simple parallel approach provides only modest improvements at the expense of increased instrumental complexity.

Figure 21:
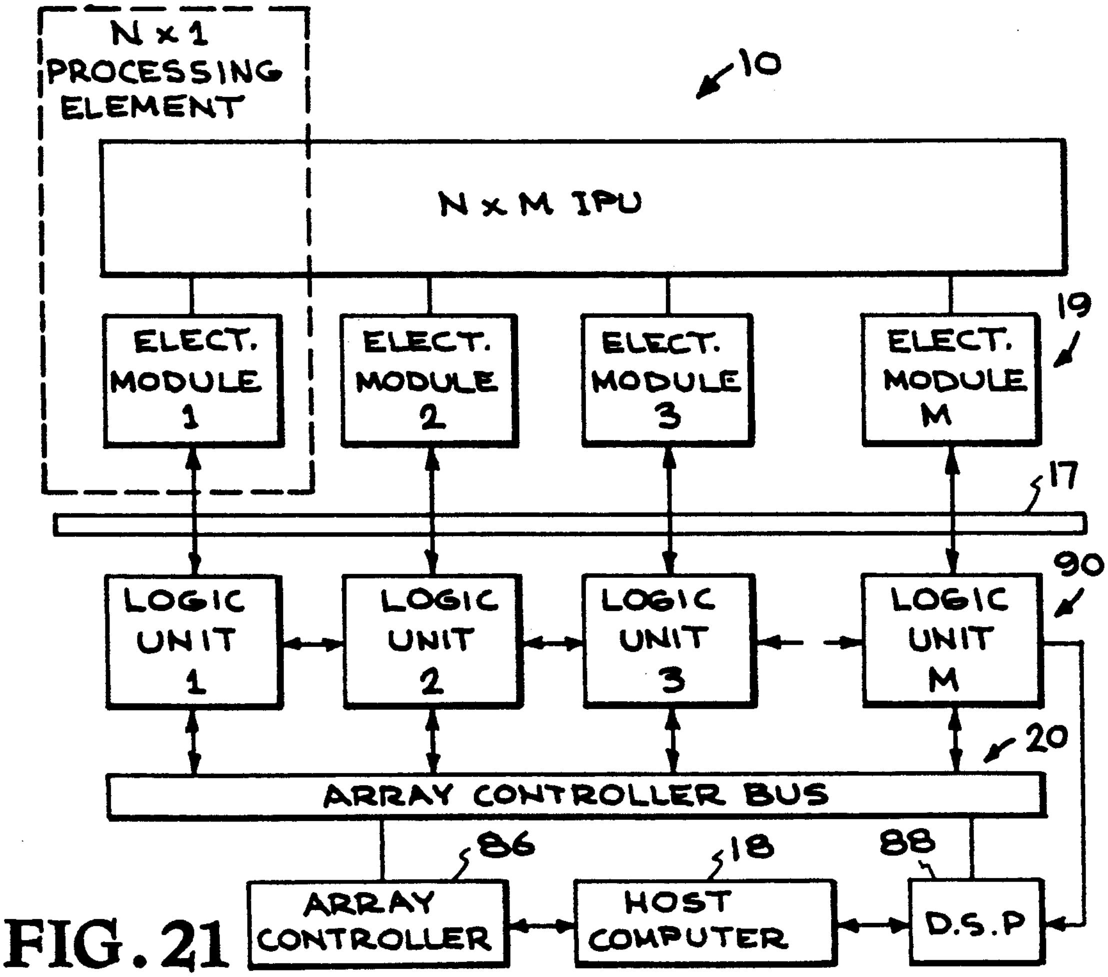
FIG. 21 illustrates a block diagram of the present invention as an N×M massively parallel ion processor.

The present invention provides a much more sophisticated parallel mass spectrometer. The present invention can be conceived as an N by M massively parallel ion processing unit (IPU) 10 as shown in FIG. 21. Each electrode sheet 12 is an independent site of ion control, including trapping, translation and cooling, and also of information gathering, through induced currents as discussed above and as registered in the electrical module circuitry 19 shown in FIG. 20. If N is the number of local hexagonal perforations 22 in an electrode 12, then the present invention has N ion processing channels 26. Each electrode would therefore have N by 1 processing sites for concurrent ion processing. If there are M electrode grids 12 orthogonal to each ion processing channel axis, the invention as a whole would have N by M processing sites (each electrode ring 22) and M control and information accumulation locations (each electrode 12). The massive parallelism of the present invention, where M and N are greater than one, allows for the sophisticated and efficient control of ion species and the ability to simultaneously collect vast amounts of information. In one embodiment, the massively parallel ion processor could include a host computer 18 that sends general program information to an array controller 86 which in turn governs the instantaneous operation of the IPU 10 through an array controller bus 20. The array controller manages the overall goals of the M independent, self-contained computers or logic units 90. These separate logic units 90 subsume the DAC 16 and ADC 84 functions for sending information to and receiving information from the analog electrode module circuitry 19. The separate logic units 90 can be each similarly programmed, governed by a common clock. Each electrode module 19 can handle local signal processing and accumulation for its portion of the electrode array 10. As effective potential wells are translated down the processing unit 10, the data corresponding to a local ion packet (trapped within a well) transfers to the next logic unit 90. The system thereby provides a correspondence of information and control between the separate electrode logic units 90, the electrode modules 19, and the trapped charge packets. The host computer 18 retrieves information as does a dedicated Digital Signal Processor (DSP) 88, to process information on a real-time basis. Feedback from information accumulated by the host computer 18 to the array controller 86 allows immediate responses to sample information, and the array controller can update or adjust the program sequencing of the M logic units 90 to achieve more efficient operation or optimize processing parameters. The processing of ion groups in the present invention is adaptive to instantaneous changes in the analyzed sample and can flexibly react to many processing conditions.

The present invention provides a simple yet powerful system for processing charged particles in a flexible manner. The present invention, by providing multiple processing channels, allows for orders-of-magnitude higher experimental through-put than available by conventional means by significantly increasing the available ion volume. The present invention furnishes methods and apparatus for performing all required ion processing maneuvers, including buffering of high-volume, high-speed bursts of ion samples, sampling and splitting off portions of buffered samples, translating trapped ion samples along the processing path, cooling trapped particles to uniform energy levels through field interaction alone, multiple methods of mass determination (including ion trap emulation and/or measurement of induced image currents), and finally ion acceleration and detection. The present invention provides a relatively simple, readily manufactured and flexible system for ion processing, analysis and control.

Although the present invention has been described with reference to preferred embodiments, those skilled in the art will recognize that various modifications may be provided. For example, the particular honeycomb cavities combine to provide parallel processing channels can be replaced by other geometries. In fact, only one cavity might be used, with different electrode structures and placements. Different materials, including conductive plastics, can be used for electrodes. It should be understood that two electrode surfaces, electrically connected and hence given the same potentials at all times, can be considered one electrode. Various equivalent electrical driver devices exist for applying voltages to conductors. Different formalisms for applying time-varying potentials to each electrode can be adopted, without altering the basic effect of allowing the time-averaged effective potential to be changed. While the preferred embodiment uses a digital computer as a control means for controlling the applied electrode potentials, other means including analog computers, or analog waveform memory devices, are available. The methods and apparatus of the present invention may be superimposed upon other ion processing techniques to achieve further novel results. For example, a time-variant effective potential may be superimposed upon charges confined by magnetic fields. The effective potential can then be used to cool ion groups confined by other methods. These and other variations upon and modifications to the described embodiments are provided for by the present invention, the scope of which is limited only by the following claims.

LIST of REFERENCE NUMERALS

FIG. 1

10: Ion processing unit
12: Electrode Sheet
14: High Voltage Amplifier
15: Amplifier-to-Electrode Connection
16: Digital to Analog Converters
17: Vacuum Housing
18: Central Processing Unit
20: Data bus line
22: Hexagonal Electrode Ring or Element
23: Electrode Frame
24: Electrode Spacer
26: Ion Processing Channel
28: High Vacuum Feed-Through Lines

FIG. 2

30: High-Volume Ion Source
32: Ion Injection Vestibule
33: Deflected ion
34: Diffusion Pump
**36*a***: Injection Region of Ion processing unit
**36*b***: Bulk Cooling and Temporary Storage Region
**36*c***: Mass Selection Region
**36*d***: Acceleration Region
38: Ion detector screen
40: CCD Array Detector

FIG. 4

400A: Three-dimensional Effective Potential Surface
400B: Two-Dimensional Topographical map of Effective Potential Surface
42: Effective Potential Well
**50*a,b***: Longitudinal Effective Potential Barriers.

FIG. 5

500A: Electric Field Lines.

FIG. 6

600A: Three-Dimensional Map of electrical potential
600B: Two-Dimensional Topographic map of electric potential
44: Potential Saddle
**46*a***: Low point on electric potential
**48*a***: High point on electric potential.

FIG. 7

700A: Three-Dimensional Map of electrical potential
700B: Two-Dimensional Topographic map of electric potential
44: Potential Saddle
**46*b***: High point on electric potential
**48*b***: Low point on electric potential.

FIG. 8

800A: Three-Dimensional Map of electrical potential
800B: Two-Dimensional Topographic map of electric potential.

FIG. 9

900A: Three-Dimensional Map of effective potential surface
900B: Two-Dimensional Topographic map of effective potential surface
42: Effective Potential Wells
50: Longitudinal Barriers.

FIG. 10

1000A: Three-Dimensional Map of electrical potential
1000B: Two-Dimensional Topographic map of electric potential.

FIG. 11

1100A: Three-Dimensional Map of effective potential surface

1100B: Two-Dimensional Topographic map of effective potential surface
42*a*: Effective Potential Wells
50*a*: Longitudinal Barriers
51: Transverse Barrier

FIG. 12

1200A: Three-Dimensional Map of effective potential surface
1200B: Two-Dimensional Topographic map of effective potential surface
42: Effective Potential Wells
50: Longitudinal Barriers

FIG. 13

54: Trapping Areas
56: Steepening of the Effective Potential Barrier
58: New Longitudinal Barrier

FIG. 14

60: Time-lapsed trajectory of charged particle
62: Time-lapsed portion of trajectory during stationary confinement
1400B: Two-Dimensional Topographic map of effective potential surface.

FIG. 15

74: Approaching Ion
76: Induced image current
78: Induced circulation current
80: Induced Inter-electrode circulation current
82: Current load or measuring device.

FIG. 17

1700A: Three-Dimensional Map of effective potential surface
1700B: Two-Dimensional Topographic map of effective potential surface.

FIG. 18

85: Line of Transfer of Effective Potential Well.

FIG. 20

66: Differential Amplifier
68: Low Voltage Sampling Electrical Line
70: High-Voltage RF Sampling Electrical Line
71: Resistive Load
72: Output
73: Switch
84: Analog-To-Digital Device.

FIG. 21

17: Vacuum Housing
19: Electrical module
86: Array controller
88: Digital Signal Processor
90: Logic Unit.

What is claimed is:

1. Charged particle processor apparatus for manipulating charged particles that have an energy and a mass, the apparatus comprising:

an electrode array (10), said electrode array including a of transversely extending, substantially planar electrode sheets (12), each of said electrode sheets having at least one perforation therein;

a plurality of spacer means (24), each of said electrode sheets being separated from adjacent electrode sheets by said spacer means, said electrode sheets being aligned relative to one another such that respective perforations of each of said electrode sheets align to form at least one charged particle channel (26);

a vacuum enclosure (17) enclosing said plurality of electrode sheets;

a plurality of electric potential drivers (14), each of said drivers being coupled to a respective electrode sheet;

digital-to-analog converter means (16) coupled to said plurality of drivers;

a data bus (20), said data bus being coupled to said digital-to-analog converter means; and a computer (18) coupled to said digital-to-analog converter means through said data bus, whereby data from said computer is converted by said digital-to-analog converter means to analog data and causes at least one of said drivers to apply an electric potential to at least one of said electrode sheets.

2. An apparatus as claimed in claim 1, further comprising a charged particle source (30) that produces at least one charged particle, said charged particle source being located in relation to said plurality of electrode sheets such that said charged particle produced by said charged particle source can enter one of said charged particle processing channels.

3. An apparatus as claimed in claim 1, further comprising a charged particle detector (38,40), said detector being located in relation to said electrode array such that said charged particle that exits from one of said charged particle processing channels can be detected.

4. An apparatus as claimed in claim 1, wherein said electric potentials are applied to said electrode sheets by an array of amplifiers (14*a*, 14*b*, 14*c*).

5. An apparatus as claimed in claim 1, wherein each of said perforations has a hexagonal shape and has a diameter of approximately $2R_0$, and any two consecutive electrode sheets (12) are spaced apart by a distance of approximately $R_0/13$.

6. An apparatus as claimed in claim 1, wherein said electrode sheets (12) are numbered consecutively $j=1,2,\ldots,J(J\geqq 2)$ and said electric potential applied to said electrode sheet number j has the form $P(j,t)=\phi_0\,\mathrm{Sign}[A(j,t)]\,|A(j,t)|^{s(j,t)}\,\sin(\omega t)$, where $A(j,t)=\cos[2\pi f(j,t)\,w(j,t)-k(j,t)]$, where t is a time variable, $\omega$ is a selected angular frequency, $\phi_0$ is a selected electric potential amplitude, and f(j,t), s(j,t), w(j,t) and k(j,t) are time-dependent functions selected for said electrode sheet number j.

7. An apparatus as claimed in claim 6, wherein said functions f(j,t), s(j,t), w(j,t) and k(j,t) for at least one of said integers j are chosen so that said charged particles lose net energy when said charged particles are adjacent to said electrode sheet number j.

8. An apparatus as claimed in claim 1, wherein at least one of said electrode sheets is electrically connected to a source of ground potential through a path that has a selected electrical resistance (77).

9. An apparatus as claimed in claim 1, wherein at least two adjacent electrode sheets are electrically connected to each other through a path that has a selected electrical resistance (82).

10. An apparatus as claimed in claim 1, further comprising a low pressure gas of neutral particles that surround said electrode sheets (12) and undergo collisions with said charged particles, thereby reducing kinetic energy of said charged particles.

11. A method for processing charged particles having particle energy and particle mass, the method comprising the steps of:

(a) applying electric potentials to an electrode array (10) to create an electric potential field (600A) within a selected volume of space through which said charged particles can propagate;

(b) introducing said charged particles into said selected volume of space;

(c) controlling said applied electric potentials to establish an effective potential field (400A) within said selected volume of space for said charged particles, said effective potential field including a plurality of first effective potential wells (42), each being capable of confining said charged particles within a portion of said selected volume; and (d) varying said applied electric potentials to combine at least two of said first effective potential wells into a single new effective potential well that allows a transfer of charged particles confined to said combined first effective potential wells to said new effective potential well.

12. A method as recited in claim 11, further comprising the step of providing said electrode array as a plurality of electrode sheets that are spaced apart from one another along a selected longitudinal direction, with each electrode extending transversely relative to the selected longitudinal direction.

13. A method as recited in claim 11, further comprising the step of applying said electric potentials to said electrode array by an array of amplifiers (14).

14. A method as recited in claim 11, further comprising the step of providing a computer to control, application of said electric potentials to said electrode array.

15. Charged particle processor apparatus for controlling the motion of charged particles having particle energy and particle mass, the apparatus comprising:

a plurality (10) of J electrodes (12) with $J \geqq 3$, numbered consecutively $j=1,2, \ldots, J$ and spaced apart from each other by electrically insulating means (24) in a selected longitudinal direction, for creating substantially independent electrical potentials (600A) in the volume between and defined by any two consecutive electrodes, each electrode having a plurality of perforations therein that are arranged so that a sequence comprising one such perforation from each electrode forms a channel (26) through which the charged particles can propagate;

a vacuum enclosure (17) enclosing the plurality of electrodes;

a plurality of electrical potential drivers (14), one such driver being electrically connected to each electrode, to apply an independent electrical potential to each electrode; and computer control means (18, 20) for controlling and varying with time the electrical potential applied by each driver to the corresponding electrode to establish an effective potential, including a potential well (42) with a well center, in the volume between any two consecutive electrodes, where a potential well is capable of confining a charged particle within the well, the computer control means varying the electrical potentials applied to the electrodes with time so that the potential well center is translated with time from the volume between electrodes number m and m+1 to the volume between electrodes m+1 and $m+2 (1 \leqq m \leqq J-2)$ so that a charged particle confined in this potential well is also translated in the selected longitudinal direction with time.

16. The apparatus of claim 15, wherein said electric potentials are applied to said electrodes by an array of amplifiers (14*a*, 14*b*, 14*c*).

17. The apparatus of claim 15, wherein each of said electrodes (12) is a substantially planar sheet and extends transversely relative to said selected longitudinal direction and each electrode has a plurality of longitudinally oriented perforations therein.

18. The apparatus of claim 17, wherein said perforations have hexagonal shapes.

19. The apparatus of claim 17, wherein said electric potentials applied by said drivers to said electrodes are non-conservative to allow a transfer of energy between said charged particle confined within said potential well and an environment external to said electric potential.

20. The apparatus of claim 15, wherein each of said perforations is hexagonal and has a selected diameter of approximately $2R_0$ and any two consecutive electrode sheets (12) are spaced apart by a distance of approximately $R_0/13$.

21. The apparatus of claim 15, wherein said electric potential applied to said electrode sheet number j has the form $P(j,t)=\phi_0 \, \mathrm{Sign}[A(j,t)]|A(j,t)|^{s(j,t)} \sin(\omega t)$, where $A(j,t)=\cos[2\pi f(j,t)\, w(j,t)-k(j,t)]$, where t is a time variable, $\omega$ is a selected angular frequency, $\phi_0$ is a selected electric potential amplitude, and f(j,t), s(j,t), w(j,t) and k(j,t) are time-dependent functions selected for said electrode sheet number j.

22. The apparatus of claim 21, wherein said functions f(j,t), s(j,t), w(j,t) and k(j,t) are chosen so that, for at least one of said integers j, said charged particles lose net energy when said charged particles are adjacent to said electrode sheet number j.

23. The apparatus of claim 15, wherein at least one of said electrode sheets is electrically connected to a source of ground potential through a path that has a selected electrical resistance (77).

24. The apparatus of claim 15, wherein at least two adjacent electrode sheets are electrically connected to each other through a path that has a selected electrical resistance (82).

25. The apparatus of claim 15, further comprising a low pressure gas of neutral particles that surround said electrode sheets (12) and undergo collisions with said charged particles, thereby reducing kinetic energy of said charged particles.

26. A method for processing a stream of charged particles that have particle energy and particle mass, the method comprising the steps of:

providing a plurality (10) of J electrodes (12) with $J \geqq 3$, numbered consecutively $j=1,2, \ldots, J$ and spaced apart from each other by electrically insulating means (24) in selected longitudinal direction, for creating substantially independent electrical potentials (600A) in the volume between and defined by any two consecutive electrodes;

providing each electrode with a plurality of perforations therein that are arranged so that a sequence comprising one such perforation from each electrode forms a channel (26) through which the charged particles can propagate;

providing a plurality of electrical potential drivers (14), one such driver being electrically connected to each electrode, to apply an independent electrical potential to each electrode; and controlling and varying with time the electrical potential applied by each driver to the corresponding electrode to establish an effective potential, including a potential well (42) with a well center, in the volume between any two consecutive electrodes, where a potential well is capable of confining a charged particle within the well, the applied electrical potentials being varied with time so that the potential well center is translated with time from the volume between electrodes number m and m+1 to the volume between electrodes m+1and $m+2(1 \leqq m \leqq J-2)$ so that a charged particle confined in this potential well is also translated in the selected longitudinal direction with time.

27. The method of claim 26, further comprising the step of providing said electrical potentials applied to each of said electrodes by an array of amplifiers (14_a_, 14_b_, 14_c_).

28. The method of claim 26, further comprising the step of choosing each of said electrodes (12) to be substantially planar sheets and to extend transversely relative to said selected longitudinal direction.

29. The method of claim 28, further comprising the step of choosing said perforations to have hexagonal shapes.

30. The method of claim 28, further comprising the step of choosing said electric potentials (600A) applied by said drivers (14) to said electrodes (12) to be nonconservative to allow a transfer of energy between said charged particles confined within said potential well and an environment external to said electric potential.

31. The method of claim 26, further comprising the step of choosing each of said perforations to have a hexagonal shape of a selected diameter of approximately $2R_0$ and spacing any two consecutive electrode sheets apart by a distance of approximately $R_0/13$.

32. The method of claim 26, further comprising the step of choosing said electric potential (600 A) applied to said electrode sheet number j (12) to have the form $P(j,t)=\phi_0 \, \mathrm{Sign}[A(j,t)]\,|A(j,t)|^{s(j,t)} \sin(\omega t)$, where $A(j,t)=\cos[2\pi f(j,t)\, w(j,t)-k(j,t)]$, where t is a time variable, $\omega$ is a selected angular frequency, $\phi_0$ is a selected electric potential amplitude, and f(j,t), s(j,t), w(j,t) and k(j,t) are time-dependent functions selected for said electrode sheet number j.

33. The method of claim 32, further comprising the step of choosing said functions f(j,t), s(j,t), w(j,t) and k(j,t) so that, for at least one of said integers j, said charged particles lose net energy when said charged particles are adjacent to said electrode sheet number j.

34. The method of claim 26, further comprising the step of connecting at least one of said electrode sheets (12) to a source of ground potential through a path that has a selected electrical resistance (77).

35. The method of claim 26, further comprising the step of connecting at least two electrode sheets to each other through a path that has a selected electrical resistance (82).

36. The method of claim 26, further comprising the step of providing a low pressure gas of neutral particles surrounding said electrode sheets (12) and allowing particles of this gas to undergo collisions with said charged particles, to thereby reduce kinetic energy of said charged particles.

* * * * *

UNITED STATES PATENT AND TRADEMARK OFFICE

CERTIFICATE OF CORRECTION

PATENT NO. : 5,206,506

DATED : April 27, 1993

INVENTOR(S) : Nicholas J. Kirchner

It is certified that error appears in the above-indentified patent and that said Letters Patent is hereby corrected as shown below:

TITLE PAGE

[56] References Cited: Under "OTHER PUBLICATIONS", third reference (Dehmelt), "Advances in Atomic and Molecualr" should read -- Advances in Atomic and Molecular --.

Column 4, line 10, "time" should read -- times --.

Column 8, line 9, "charge antimatter" should read -- charged antimatter --.

Column 12, line 35, "shows" should read -- show --.

Column 13, line 60, "photomultiplier channel tube" should read -- photomultiplier tube --.

Column 15, line 59, "$\phi(x(i),y(i),z(i)$" should read -- $\phi(x(i),y(i),z(i))$ --.

Column 17, line 1, "$(i,j,k) \equiv (x_n/\Delta, Y_n/\Delta, Z_n/\Delta)$" should read -- $(i,j,k) \equiv (x_n/\Delta, y_n/\Delta, z_n/\Delta)$ --.

Column 17, line 31, "$\Phi_j(x(i),y(i),z(i)$" should read -- $\Phi_j(x(i),y(i),z(i))$ --.

Column 17, line 34, "$(x(i),y(i),z(i)$" should read -- $(x(i),y(i),z(i))$ --.

Column 18, line 37, "of the stable ion, irrespective of the ion's" should read -- of the ion, irrespective of the stable ion's --.

Column 22, line 16, a new paragraph should begin with -- Translation of the --.

UNITED STATES PATENT AND TRADEMARK OFFICE
CERTIFICATE OF CORRECTION

PATENT NO. : 5,206,506

DATED : April 27, 1993

INVENTOR(S) : Nicholas J. Kirchner

It is certified that error appears in the above-indentified patent and that said Letters Patent is hereby corrected as shown below:

Column 25, line 31, "i.e. in the in the y-z" should read - - i.e. in the y-z - -.

Column 26, line 43, "$U_1(x)U_1$" should read - - $U_1(x)$ - -.

Column 27, lines 62-64, "employing an equation (Equation (11)) of completely general form. Piecewise or" should read --employing Equation (11), which is of general form. Incremental--.

Claim 1, column 33, line 63, "a of transversely extending," should read - - a plurality of transversely extending, - -.

Claim 11, column 35, lines 14-15, "each being capable of" should read - - each well being capable of - -.

Claim 26, column 36, line 56, "in selected longitudinal direction" should read - - in a selected longitudinal direction - -.

Signed and Sealed this

Twenty-first Day of June, 1994

Attest:

BRUCE LEHMAN

Attesting Officer

Commissioner of Patents and Trademarks